(12) United States Patent
Lerman et al.

(10) Patent No.: US 7,809,802 B2
(45) Date of Patent: *Oct. 5, 2010

(54) BROWSER BASED VIDEO EDITING

(75) Inventors: David Ross Lerman, San Francisco, CA (US); Matthew Allen Sanchez, San Francisco, CA (US); Kevin Walker Sladek, San Francisco, CA (US)

(73) Assignee: VideoEgg, Inc., San Francisco, CA (US)

( * ) Notice: Subject to any disclaimer, the term of this patent is extended or adjusted under 35 U.S.C. 154(b) by 636 days.

This patent is subject to a terminal disclaimer.

(21) Appl. No.: 11/620,783

(22) Filed: Jan. 8, 2007

(65) Prior Publication Data

US 2007/0183741 A1    Aug. 9, 2007

Related U.S. Application Data

(63) Continuation-in-part of application No. 11/409,502, filed on Apr. 20, 2006, now abandoned, and a continuation-in-part of application No. 11/409,507, filed on Apr. 20, 2006, now abandoned, and a continuation-in-part of application No. 11/408,790, filed on Apr. 20, 2006, now abandoned.

(60) Provisional application No. 60/673,445, filed on Apr. 20, 2005, provisional application No. 60/732,548, filed on Nov. 2, 2005.

(51) Int. Cl.
  *G06F 15/16* (2006.01)

(52) U.S. Cl. ................... 709/217; 709/203; 715/723

(58) Field of Classification Search ......... 709/203–204, 709/217; 715/723
See application file for complete search history.

(56) References Cited

U.S. PATENT DOCUMENTS

| | | | |
|---|---|---|---|
| 5,237,648 A | 8/1993 | Mills et al. | |
| 5,353,391 A | 10/1994 | Cohen et al. | |
| 5,513,306 A | 4/1996 | Mills et al. | |
| 6,154,600 A * | 11/2000 | Newman et al. | 386/4 |
| 6,239,793 B1 * | 5/2001 | Barnert et al. | 715/201 |
| 6,760,885 B1 | 7/2004 | Hyman et al. | |
| 7,055,100 B2 * | 5/2006 | Moriwake et al. | 715/723 |
| 7,197,544 B2 | 3/2007 | Wang et al. | |
| 7,617,299 B2 | 11/2009 | Yoshimine | |
| 2002/0056123 A1 | 5/2002 | Liwerant et al. | |
| 2002/0116716 A1 | 8/2002 | Sideman | |
| 2005/0091186 A1 * | 4/2005 | Elish | 707/1 |
| 2005/0246752 A1 | 11/2005 | Liwerant et al. | |
| 2006/0236221 A1 * | 10/2006 | McCausland et al. | 715/500.1 |
| 2007/0081094 A1 * | 4/2007 | Ciudad et al. | 348/371 |
| 2008/0256583 A1 | 10/2008 | Liwerant | |

FOREIGN PATENT DOCUMENTS

WO    099008 A1    9/2006

* cited by examiner

*Primary Examiner*—William C Vaughn, Jr.
*Assistant Examiner*—Mohamed Ibrahim
(74) *Attorney, Agent, or Firm*—SilverSky Group, LLC

(57) ABSTRACT

Embodiments of the present invention provide for a clip manipulation facility within a browser environment. Without limitation, the clip may be a video clip. An editing tool may be adapted to alter the appearance of a clip associated with the manipulation facility.

16 Claims, 8 Drawing Sheets

BROWSER BASED VIDEO EDITING

CROSS-REFERENCE TO RELATED APPLICATIONS

This application is a continuation-in-part of each of the following co-pending, commonly-owned, patent applications: U.S. application Ser. No. 11/409,502 filed on Apr. 20, 2006; U.S. application Ser. No. 11/409,507 filed on Apr. 20, 2006; and U.S. application Ser. No. 11/408,790 filed on Apr. 20, 2006.

Each of the foregoing applications further claims the benefit of the following commonly-owned provisional applications: U.S. Provisional App. No. 60/673,445, filed on Apr. 20, 2005; and U.S. Provisional App. No. 60/732,548, filed on Nov. 2, 2005.

This application is also related to commonly-owned U.S. application Ser. No. 11/620,779 and U.S. application Ser. No. 11/620,785, both filed on even date herewith.

Each of the preceding patent applications is hereby incorporated by reference in its entirety.

BACKGROUND

As more people gain access to broadband Internet connections, wireless broadband Internet connections, and video-enabled digital cameras and cell phones, they will want to incorporate Internet-based, rich media into their lives. While today's Internet users are uploading still photos, future Internet users may upload home videos to share with friends, walking tours to accompany their real estate listings, videos to augment their online dating profiles, and the like.

One of the principal barriers to such an Internet-based, rich-media future is the complexity of putting digital video on the web. Uploading video requires a technical understanding of video formats, codecs, players, streaming servers, and so on. The average Internet user simply does not understand the intricacies of preparing a video for the web, posting a video to the web, and the like. There exists a need to improve a user's ability to post and view video.

SUMMARY

Provided herein are methods and systems for a manipulation facility within a browser environment, where an editing tool may be adapted to alter the appearance of a clip associated with the manipulation facility. The clip may be a video clip, an audio clip, a multimedia clip, a podcast clip, an advertisement clip, an interactive clip, or the like, and the element may be a video element.

The manipulation facility may include a plurality of components, such as a timeline, a time-line slide bar, a start slider, a end slider, a modified indicator, a deleted indicator, an addition indicator, a viewing area, a viewing control, or the like. In addition, the viewing control may be play, rewind, forward, fast forward, frame forward, frame back, pause, slow motion forward, slow motion backward, or the like. The plurality of components may also include components such as an audio time-line slider, an audio start slider, an audio end slider, an audio modified indicator, an audio deleted indicator, an audio addition indicator, an audio editing controller, a file management controller, a file naming facility, a storage location facility, a menu bar, or the like.

The browser environment may be hosted by a computing facility, such as a personal computer, a mobile computing facility, a mobile phone, a PDA, or the like. The clip may be associated with a format such as a video camera, a mobile phone, a still camera, a web-cam, or the like. Additionally, the clip may be stored in memory, such as in local memory, main memory, a mass storage facility, a removable media, a flash drive, associated with a storage location at a network location, on a server, on a client, on a database, or the like.

The clip may be dragged into the manipulation facility with a mouse and moved into the manipulation facility by moving the mouse, with the mouse and moved in the manipulation facility by using the arrow keys on a keyboard, by selecting the clip using the keyboard, or the like.

The at least one editing tool may provide an editing function, such as deleting, adding, inserting, a file insertion, an advertisement insertion, blending, blanking, fading, appearing (opposite of fading), a layover, a contrast, a brightness, a color, an appearance, a shading, a focus, a sharpen, a transform, a graininess, an erase, a cut, cut frames, a paste, pasting frames, painting, patterning, airbrushing, a crop, a copy, adding text, adding audio, a rotate, an annotation, inversion, or the like. Wherein the clip may be altered, such as concatenation of clips, deletion of portions of clips, a transition between clips, a cropping of clips, insertion of clips, insertion of advertisement, a change of color character, a change of focus character, a change of luminance, an addition of text, an annotation, a change of audio.

Two clips may be associated by an editing tool, where the association may be a transition from one clip to the other, such as a splice, a segue, a concatenation, a blend, a fade, a jump cut, a match cut a geometric shape wipe, an image file wipe, a pattern wipe, a pixelate, or the like. Further, a transition may alter an image characteristic, such as a change in chroma, a change in luminance, a change in focus, or the like. The transition may also set the two clips in juxtaposition.

BRIEF DESCRIPTION OF THE FIGURES

The invention and the following detailed description of certain embodiments thereof may be understood by reference to the following figures.

DETAILED DESCRIPTION

Figure 1:
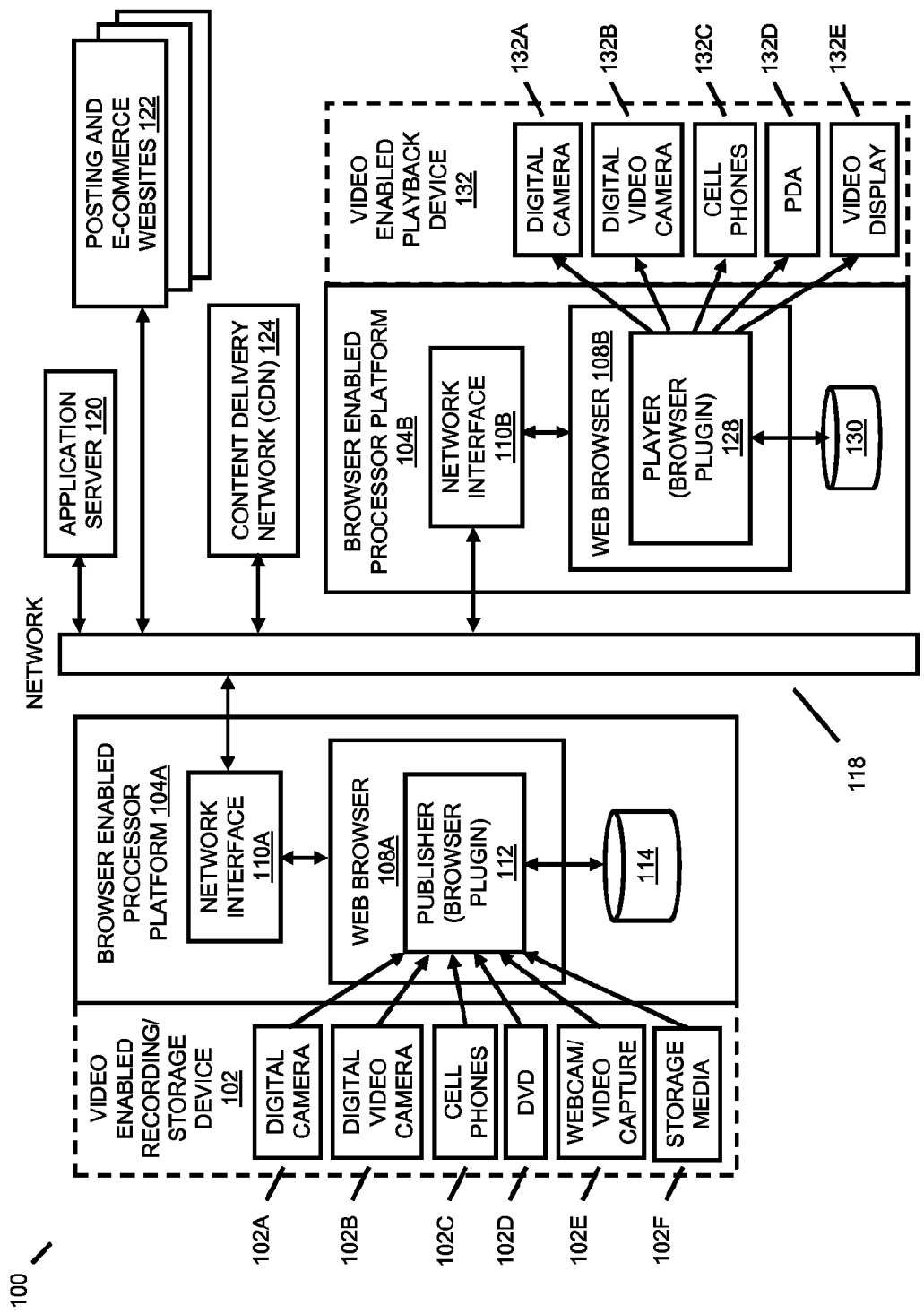
FIG. 1 depicts the functional blocks of a browser-enabled video manipulation and posting facility according to aspects of the present invention.

Throughout this disclosure, reference is made to systems, methods, applications, embodiments, et cetera that are directed at extracting, manipulating, posting, or otherwise acting in association with a video clip. It will be appreciated, however, that embodiments of the present invention may additionally or alternatively be directed at extracting, manipulating, posting, or otherwise acting in association with any and all kinds of clip such as and without limitation an audio clip, a multimedia clip, a podcast clip, an advertisement clip, an interactive clip, and so on.

An aspect of the present invention involves providing video extraction, manipulation, posting and other related functions through a network user interface (e.g., browser 108) application. The integration of the video functions into the network user interface provides many advantages to a user who wants to ultimately post his videos onto websites 122. The invention described herein provides a simple means of posting a video file to the Internet to anyone familiar with the use of a browser 108. No knowledge of video file formats or Internet protocols is required. In embodiments, the user merely performs a one-time installation of plug-in software to their browser 108, enabling them to drag-and-drop video files for immediate extraction, or edit and post a video file to a website 122 or other location accessible through the network user interface.

Aspects of the invention include a user segment and a network segment. The user segment may take the form of a browser plug-in that is downloaded, or otherwise made available to be associated with the browser 108, onto the user's processor-based device, henceforth referred to as a browser enabled processor platform 104. In embodiments, the browser plug-in may be directly associated with a browser style application provided by an OEM, or the like, so that the user does not have to make the association. In other embodiments, a website may associate a plug-in with a browser, a user may load and install the browser plug-in such that it becomes associated with the browser 108, or a third party, or other entity may associate a plug-in with a browser. The association may result in the plug-in functionality being made available directly through the browser 108 to provide a seamless network style environment for a user wanting to post the video to a website 122 or other network location. Embodiments of the invention use separate browser plug-ins for a user wanting to post a video file to the Internet, referred to as the publisher 112, and another for a user wanting to view a video file, referred to as the player 128. Users may perform a one-time download of a browser plug-in which thereafter acts as an extension of the familiar browser environment. In other embodiments, the two segments of functionality may be offered through one plug-in or other form of associated software.

In embodiments, the user's browser enabled processor platform 104 may be separate from the actual video enabled recording/storage device video enabled recording/storage device 102 (e.g., a digital video camera 102B linkable to a personal computer, an integral part of the actual video capture device, such as a video enabled cell phone 102B, or video storage device such as a form of memory). In other embodiments, the browser enabled processor platform 104 may be integrated into a video enabled recording/storage device 102.

In embodiments, a system according to the present invention may involve a network 118 segment. The network 118 segment may be transparent to the user 602 and may take the form of an application server 120 for central control of the certain processes and content delivery networks 124 for the storage of video files. It will be appreciated that one or more application servers may be provided in embodiments of the present invention.

Aspects of the present invention relate to providing a browser-enabled video extraction, editing and posting facility to facilitate the posting of video files on personal, professional, enterprise, e-commerce, auction, reverse auction, classified advertisement, real estate, auto, or other types of networked user resource locations.

The publisher 112 and player 128 browser plug-ins (e.g., either integrated as a unified software component or as separate software components) may provide the user 602 many DVR-type record and playback functions such as play, stop, rewind, and fast-forward. In addition, the publisher 112 may provide video editing functions such as video and audio splicing, segment concatenation, and titling. Transparent to the user are the automatic features of video file format transcoding and automatic technology updates. File formats are great in number, and the invention may transform the user's file format to a common format to ease distribution and playback. In order to provide transcoding for multiple devices, the user may have a system according to the present invention that may provide automatic updates from an application server 120 for future device technologies that become available. In this manner, the system may provide the user 602 with a facility to upload a manipulated video-clip to a network location 122 (e.g., a webpage or website) with only a general understanding of browser operability.

FIG. 1 depicts the major functional blocks of a browser-enabled video manipulation and posting facility 100 according to aspects of the present invention. In embodiments, the browser-enabled video manipulation and posting facility 100 may include a browser enabled processor platform 104A (e.g., a personal computer or laptop computer) and the browser enabled processor platform 104A may be operating a web browser facility 108A. With this configuration, the user of the browser enabled processor platform 104A may interact with a variety of networks 118, network locations 122 (e.g., websites), and local applications (e.g. the publisher 112). A video manipulation and posting publisher 112 may be directly associated with a network browser facility 108A and these software components may operate on the browser enabled processor platform 104A. The publisher 112 may be configured as a browser plug-in or other form of software component that is adapted to be directly associated with a browser application 108A. The publisher 112 may be a downloadable software component or it may be delivered to the user of the browser enabled processor platform 104A in any number of other ways (e.g., delivered from a CD, DVD, memory stick, portable memory, FTP transfer, etc.). Once the publisher 112 is presented on the browser enabled processor platform 104A, it may be installed in such a way that its functionalities (e.g., extracting video files from video sources, editing video, converting video files to playback formats, posting video to network locations, and other such functionality as described herein) are presented to a user through a user interface 110 associated with the browser 108A. This configuration allows a user 602 to interact with network locations 122 through the browser interface and then interact with any of the publisher's 112 functionalities through the same user interface. In embodiments, the publisher 112 may also access a hard drive, database 114, or other storage facility for the storing of video files or the retrieval of video files.

While the browser enabled processor platform 104A may be a standalone facility, with respect to some of the other facilities in the manipulation and posting facility, in embodiments, the browser enabled processor platform 104A may be directly associated with a video enabled recording/storage device 102. For example, the browser enabled processor platform 104A may be integrated into a digital camera 102A such that a user of the digital camera 102A can interact with a network 118 for the purpose of manipulating and posting a video file.

The publisher 112 may be adapted to interact with one or more types of video enabled recording/storage devices 102.

The publisher 112 may be adapted to extract video files from video enabled recording/storage devices 102, and/or the publisher 112 may be adapted to perform functions associated with the video enabled recording/storage devices 102. A user of the browser enabled processor platform 104A may make a data connection between a video enabled recording/storage device 102 and the publisher 112 to extract a video file, manipulate the video file, control the video enabled recording/storage device 102, or other video transfer process.

Once the publisher 112 has extracted a video file from a video enabled recording/storage device 102, the publisher 112 may be used to edit the video file, manipulate the video file, convert the video file to an acceptable format (e.g., a streaming format) for posting to a network location 122, or otherwise prepare the file for posting to a network location 122. The publisher 112 may then connect to a network 118 through a network interface 110A that is associated with the browser enabled processor facility 104A to connect to a network 118. The publisher 112 may then post the video file to a network location 122 (e.g., a website or webpage).

The browser enabled processor platform 104A may enable an interconnection to a video enabled recording/storage device 102 that may or may not be an integral part of the browser enabled processor platform 104A. The user, through a drag-and-drop interface within publisher 112, may transfer video files to the publisher 112. The publisher 112 may then automatically transcode the video files into a common file format for network posting (e.g., a streaming format), which readies the video file for posting to a network location 122 (e.g., the Internet). The user may choose to edit the video file prior to posting to the Internet where the user would utilize familiar VCR/DVR-type controls, and video editing tools. For uplink to the network location 122, the publisher 112 interfaces with a network 118 through the web browser 108 via the network interface 110A. Video files are then passed from the publisher 112 to the content delivery network 124 across the network 118. An application server(s) 120 may assist the data transfer between the user's 602 publisher 112 and the content delivery network 124 where the video files will be stored. In other embodiments, the data transfer may occur without the use of an application server(s) 120. Video files stored on the content delivery network 124 may be linked to a network location 122 (e.g., a personal website, professional website, enterprise website, myspace.com website, auction website, reverse auction website, advertisement website, classified advertisement website, auto website, rental website, real estate web site, other forms of e-commerce websites, or other networked user resource locations) to provide access, viewing and streaming/downloading to other people desiring to interact with the linked video.

A user interested in interacting with the linked video may interact with the video files on the content delivery network 124 and view the video file through the player 128. In embodiments, the 'viewing' user 602 may view the video through a streaming video player, a sequenced video player, a progressive download video player or other video player. In embodiments, the 'viewing' user may interact with the video file posted on the content delivery network 124 by downloading or copying the file to the user's computing/viewing platform. In embodiments, the application server(s) 120 may offer a download of the player 128 for users that have not previously viewed a video.

A user choosing to interact with a video file that was posted on the content delivery network 124 may use his own browser enabled processor platform 104B equipped with a network browsing facility 108B, network interface 110B and player 128 to connect to the video file by interacting with a link or other such connection facility associated with a network location 122 (e.g., a website or page as described elsewhere herein). The player 128 may be adapted as a browser plug-in that is adapted to become directly associated or integrated with the browser application 108B. In embodiments, the player 128 plug-in may be downloaded from the content delivery network 124. In embodiments, the downloading of the publisher 112 may occur as a result of the user attempting to interact with a posted video. The user's 602 browser enabled processor platform 104B may be checked to see if it already has the proper player 128 installed and if it does not, the user may be provided an option to install one, or it may occur automatically or in some of fashion.

While the browser enabled processor platform 104B may be a standalone computing system such as a desktop, laptop computer, or the like. In embodiments, the browser enabled processor platform 104B may be integrated into a video enabled playback device 132. For example, a digital camera 132A, digital video camera 132B, cell phone 132C, PDA 132D, or other video display facility 132E may be directly associated with (e.g., integrated with) the browser enabled processor platform 104B. A user 602 may use a video enabled playback device 132 to view, download, copy, manipulate, control or otherwise interact with a video file posted on the content delivery network 124 by connecting to it through the linked network location 122.

While embodiments of the present invention illustrate various processes being performed by the application server(s) 120, the network locations (e.g. posted websites) 122 and the content delivery network 124, it should be understood these embodiments are illustrative in nature and the functions are not limited to the specific structures. For example, some or all of the applications server and content network functions may be performed through the posting network location servers.

Figure 2:
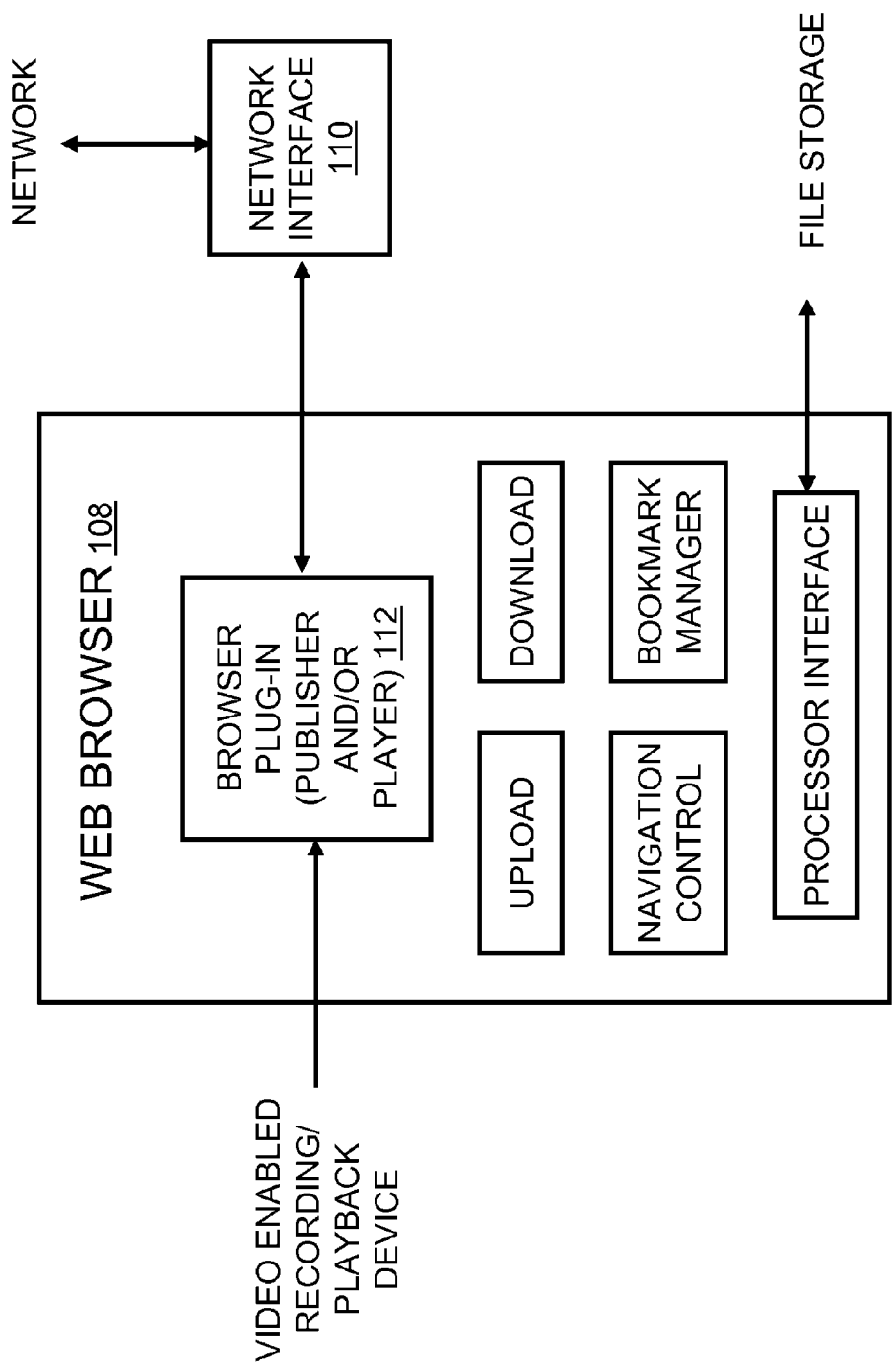
FIG. 2 depicts aspects of a web browser in an embodiment of the invention.

FIG. 2 depicts certain functionality of a web browser 108 in an embodiment of the invention. The web browser 108 may host the publisher 112 and/or player 128 (e.g., as an integrated browser plug-in) and may provide for the interconnection of the publisher 112 with external components such as video enabled recording device(s) 132, the network 118, file storage (e.g., local storage such as database 114 and database 130, or network storage such as on the content delivery network 124) within a browser enabled processor platform 104. The browser 108 may provide upload and download functions through the network interface, for transfer of files to and from the browser enabled processor platform 104, provide user interface network navigation tools and provide other such network user interface tools. The web browser 108 may also provide for a web interface to the user with functions that include navigation control within web pages, bookmark management, favorite page storage and the like.

Figure 3:
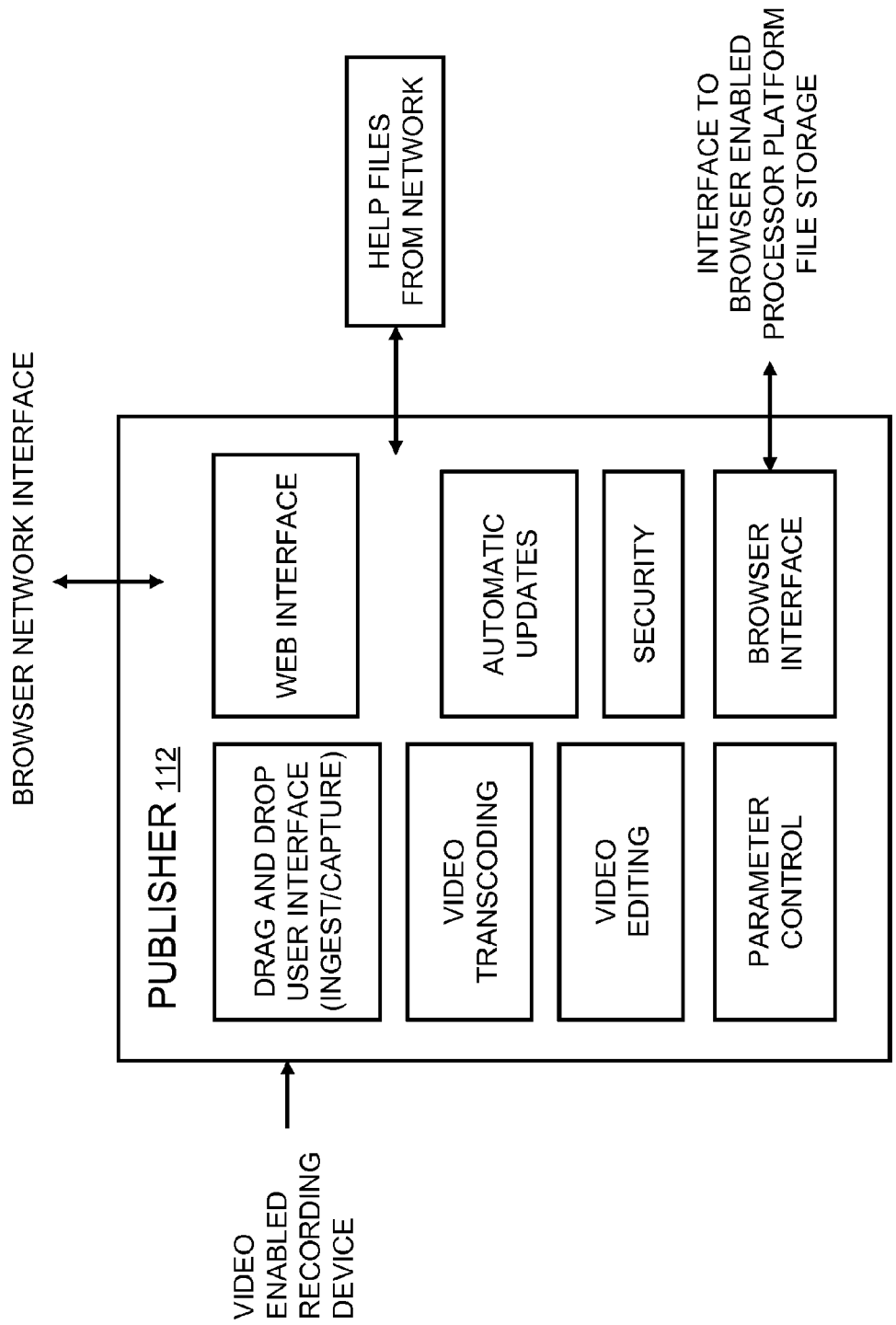
FIG. 3 depicts aspects of a publisher in an embodiment of the invention.

FIG. 3 depicts certain functionality of the publisher 112 in an embodiment of the invention. The publisher 112 may provide for a 'drag-and-drop' style user interface through which video files from a video enabled recording/storage device 102 may be transferred to the publisher 112. Video files may then be transcoded into a format compatible with network posting and viewing where the user may utilize editing features of publisher 112 to modify the video file prior to uploading. The edited, transcoded or otherwise manipulated video file may then be transferred to the content delivery network 124 through the network interface 110A. Video files may also be transferred into the file storage 114 of the browser enabled processor platform 104 through the browser interface. The user 602 may also control parameters that customize the user interface, receive interactive help from a publisher's help software module, and receive automatic updates to publisher 112 software modules. Security software modules may be incorporated to protect the system from disallowed activity.

Figure 4:
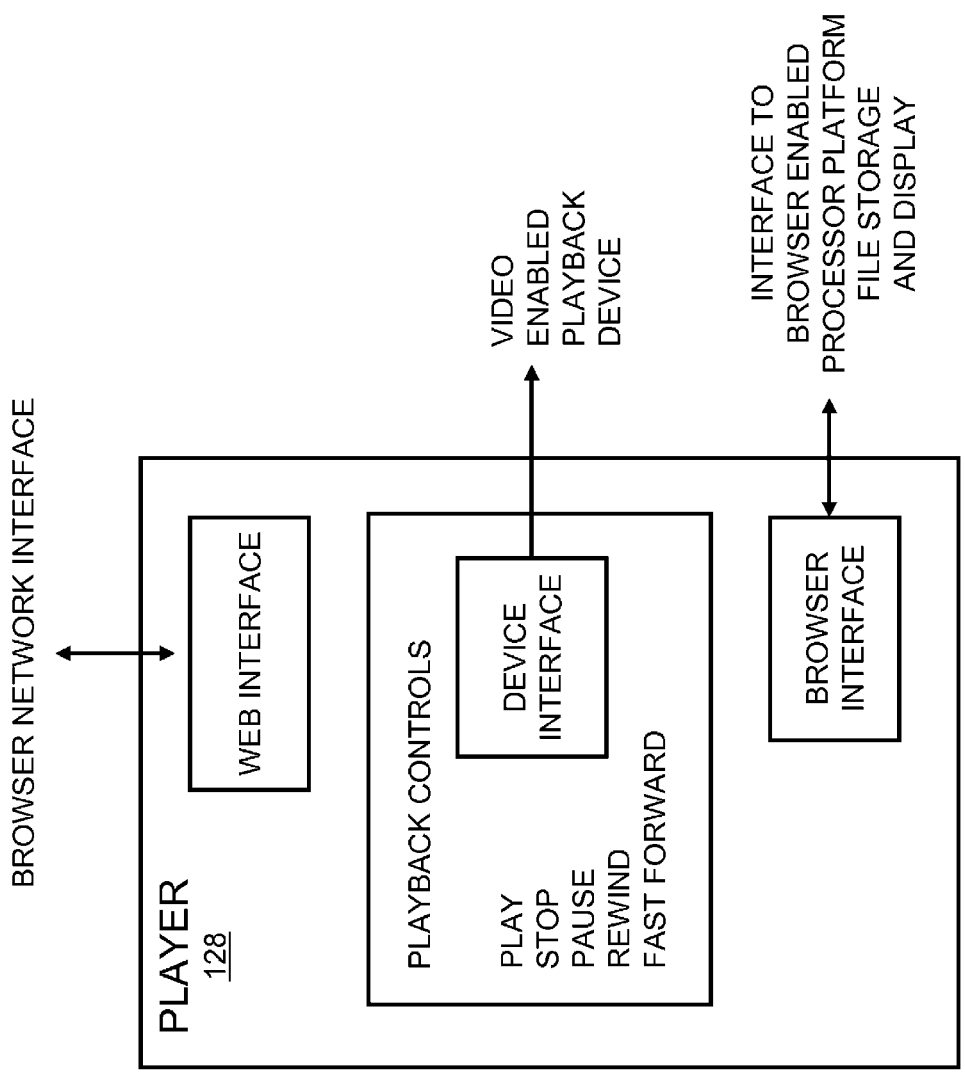
FIG. 4 depicts aspects of a player in an embodiment of the invention.

FIG. 4 depicts certain functionality of the player 128 in an embodiment of the invention. The player 128 provides a user interface that allows the download, copying, viewing and interaction of video files previously stored on the content delivery network 124. Downloading of video files, or otherwise interacting with the files as described herein, is enabled through the player's web interface to the browser network interface. Video files may also be stored in the browser enabled processor platform 104 through the player's browser interface. Playback controls may be made available though typical VCR/DVR-type controls such as play, stop, pause, rewind, fast forward, copy, paste, cut, save, and other such control features.

Figure 5:
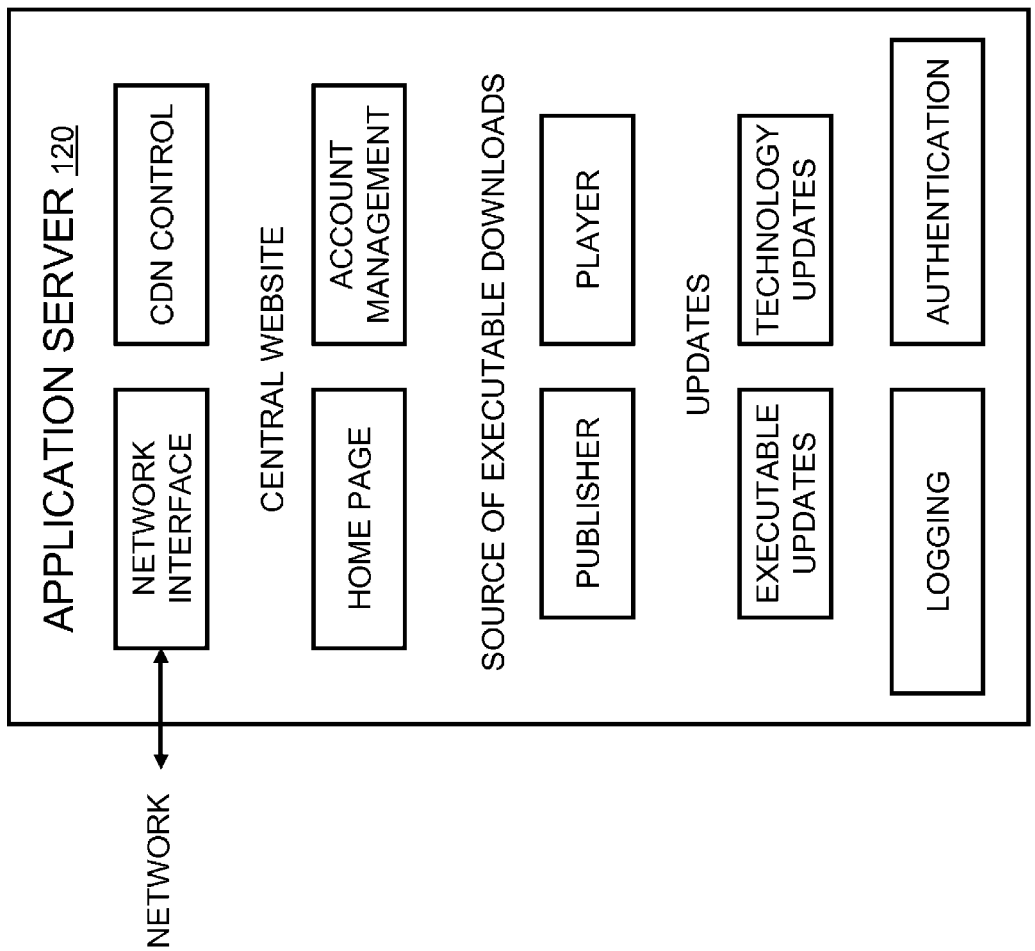
FIG. 5 depicts aspects of an application server in an embodiment of the invention.

FIG. 5 depicts certain functionality of the application server(s) 120 in an embodiment of the invention. The application server(s) 120 may provide central control of the certain system platform functions such as providing content deliver network 124 control, providing a central website for the a publisher's home page, providing account management, providing a source of executable downloads for the publisher 112 and player 128 browser plug-ins, providing automatic updates to publisher 112 and player 128 sites, providing logging of data flow and usage, providing authorization for use of the components of the system (such as uploading videos to the content deliver network 124), and providing other controls to facilitate the posting, editing, manipulating, and viewing of video files.

Figure 6:
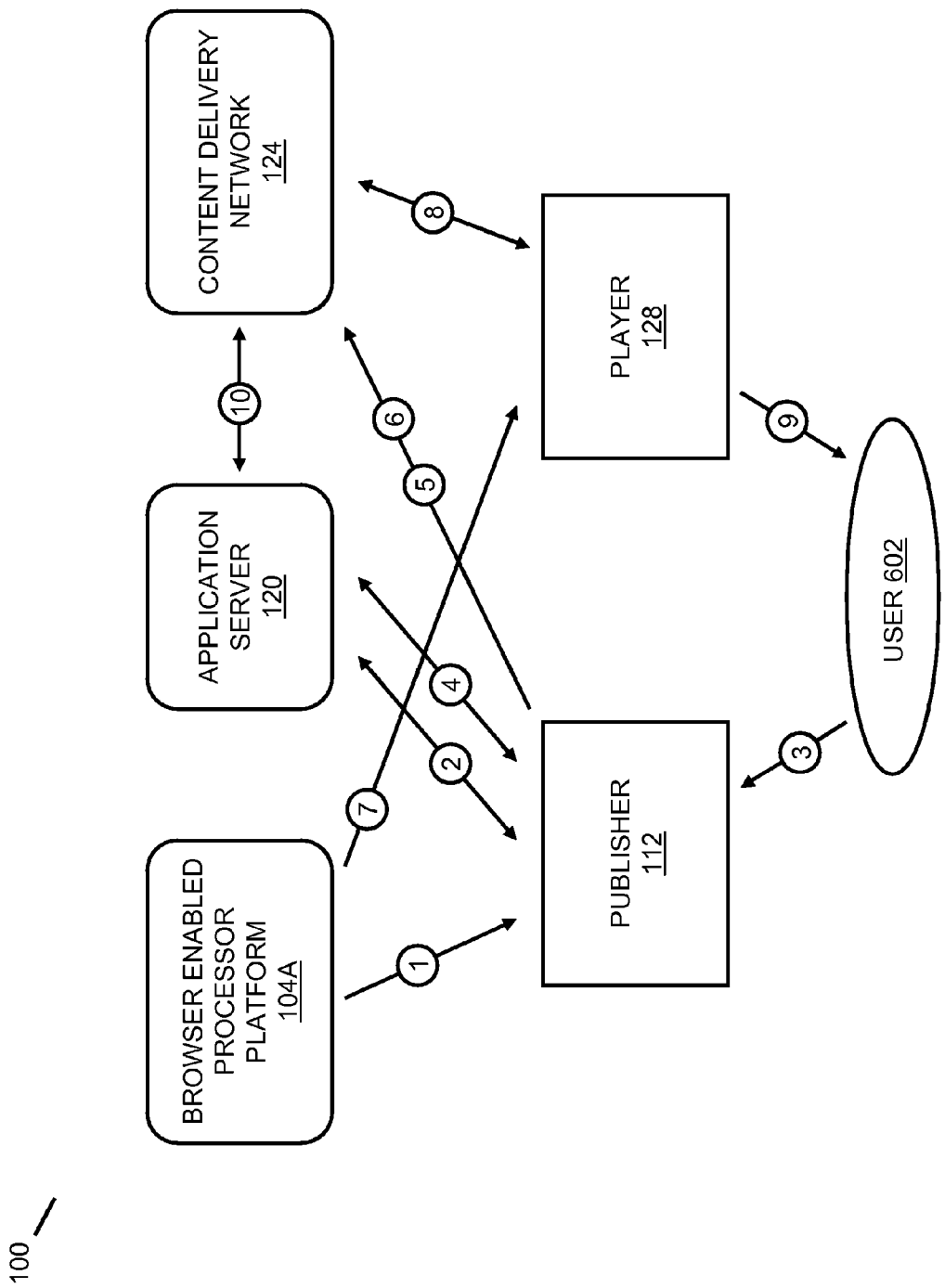
FIG. 6 depicts a workflow diagram for the browser-enabled video manipulation and posting facility according to aspects of the present invention.

FIG. 6 depicts a workflow diagram for the browser-enabled video manipulation and posting facility 100 according to aspects of the present invention. The diagram illustrates interactions that may take place during the operation of the facility. (1) First, the browser enabled processor platform 104A, acting as client, may embed the publisher 112 in the browser enabled processor platform 104A using, for example, standard object/embed html tags. The browser enabled processor platform 104A may pass parameters in the html that control the appearance and functionality of the publisher 112. (2) The publisher 112 may check for new modules for installation from an application server 120 and perform any updates. (3) The user 602 may interact with the publisher 112 to select a source device and/or source file. (4) The publisher 112 may perform another round of updates to check for updates required to use a specific file or device. If the device or file is unsupported, the publisher 112 may report the error to an application server 120. (5) The publisher 112 may open a connection to the content delivery network 124 and authorize itself. (6) The publisher 112 may transcode the source movie file and upload it to the content delivery network 124, where it may be immediately available for viewing via the player 128. (7) The browser enabled processor platform 104A may embed the player 128 in a webpage using html. (8) The player 128 may request the file from the content delivery network 124 and (9) begin playing back the video. (10) The application server 120 may monitor traffic to the content delivery network 124, disable files when they are no longer needed, and generate reporting data for users 602.

Figure 7:
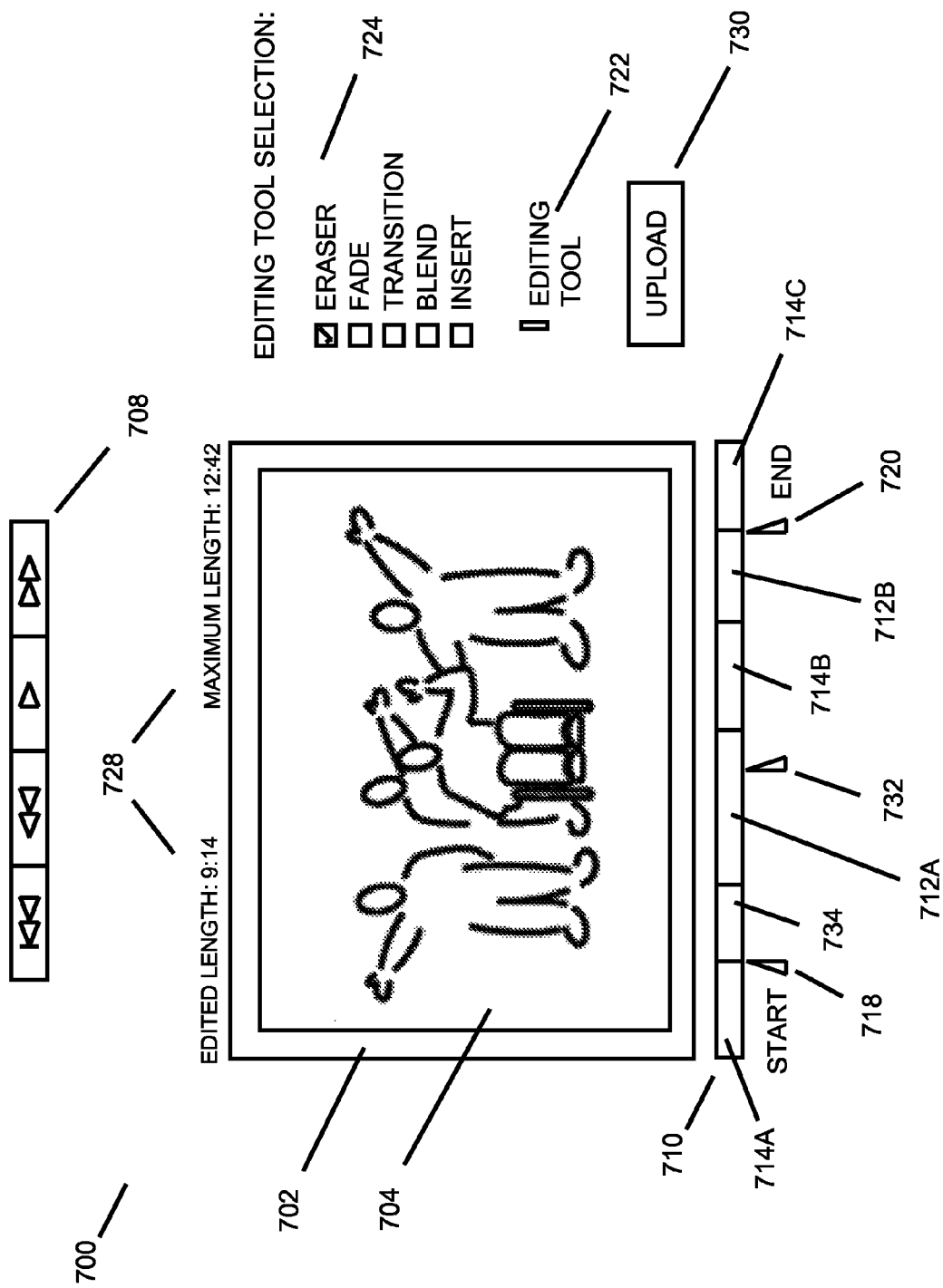
FIG. 7 depicts certain functionality of the video manipulation facility in an embodiment of the invention.

FIG. 7 depicts certain functionality of the video manipulation facility 700 in an embodiment of the invention, which may be implemented within a browser enabled processor platform 104. In embodiments, a video clip 704 may be played back and edited in a viewing and editing frame 702 within the video manipulation facility 700. The video manipulation facility 700 may include a playback control bar 708. The playback control bar 708 may include VCR like functions such as play, fast forward, rewind, or the like. The video manipulation facility 700 may include a timeline slide bar 710 that may provide a visual representation of the edited state of the video clip 704, including indications of percentage edited, segments available for editing 712, portions deleted 714, segments inserted 734 or the like. The video manipulation facility 700 may also provide edit or viewing function sliders, such as a start slider 718, an end slider 720, a slider to indicate what video clip 704 image frame is currently being viewed 732, or the like. For instance, the timeline start slider 718 may allow a user to slide the indicator to where they want the edited video to begin, thereby selecting preceding video for deletion. Likewise, the timeline end slider 720 may allow the user to define where the video should end, thereby selecting subsequent video for deletion.

In embodiments, the video manipulation facility 700 may provide a general editing tool 722 that allows the user 602 to edit the video clip 704, or segments of the video clip 704, by using the mouse to select portions of the video clip 704 to be modified. In embodiments, the editing tool 722 may provide for selection of frames, segments, or video clips 704 for editing; selection of a duration of time within the video clip 704 for editing; simultaneous selection and editing of frames, segments, or video clips 704; continuous editing across a video clip 704 or video segment; or the like. The user 602 may have various editing functions available to them through an editing tool selection palette 724 that may include an eraser, a fade, a transition, a blend, or the like. During editing, the video manipulation facility 700 may also have video clip 704 length indictors 728, such as for the time length of segments, combined segments vs. the length of the original video clip 704, or the like. Once editing is complete, and the user 602 performs a save, the video manipulation facility 700 may concatenate the remaining sections back together to form a continuous stream of video that may be played through the playback control bar 708. This new video clip 704 may then be saved to memory as a video file by selecting the upload button 730.

Figure 8:
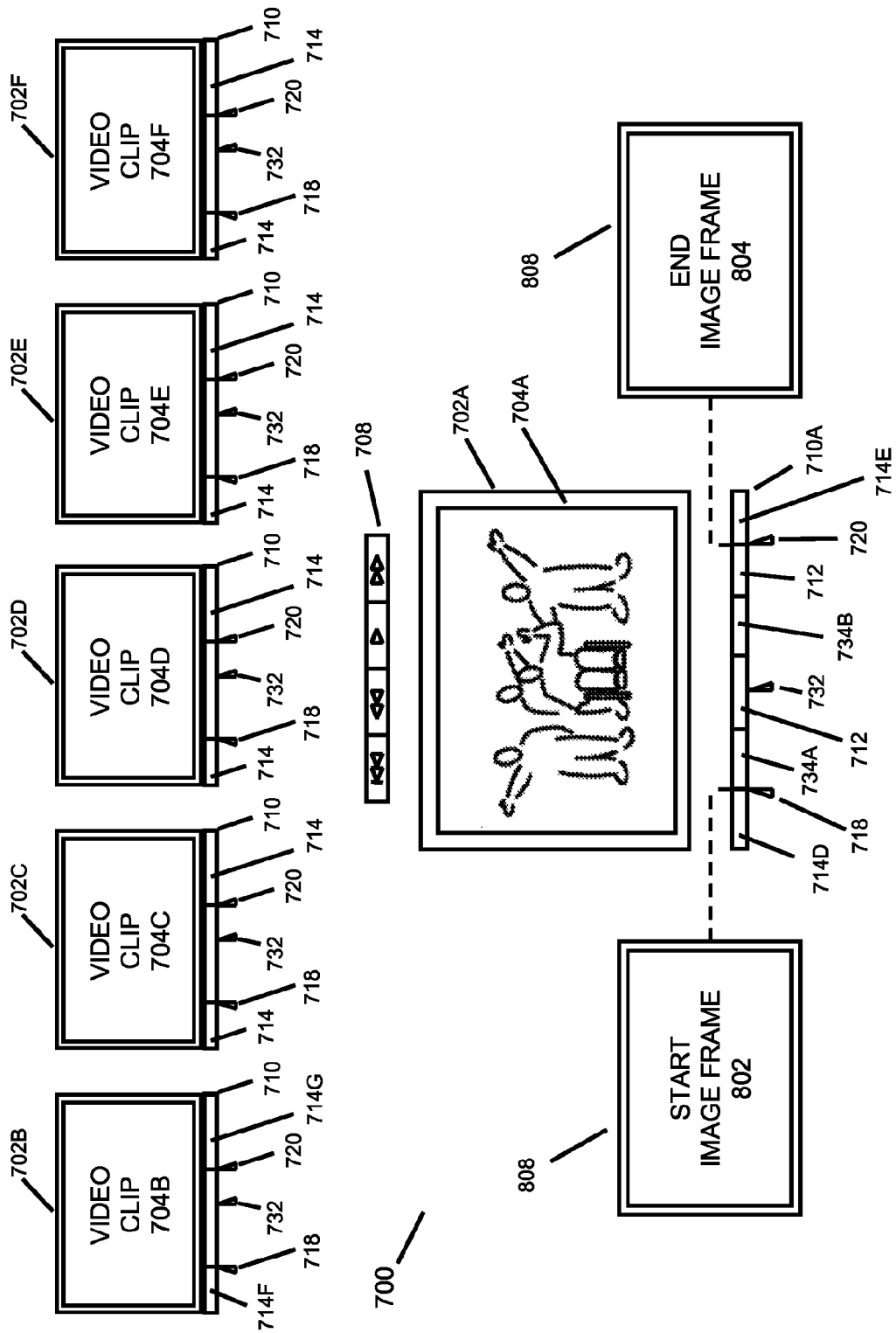
FIG. 8 depicts certain functionality of a multiple video clip viewing and editing embodiment of the video manipulation facility.

FIG. 8 depicts certain functionality of a multiple video clip 704 viewing and editing embodiment of the video manipulation facility 700. In embodiments the video manipulation facility 700 may be used to view, play, edit, and concatenate a plurality of video clips 704A-F. For instance, FIG. 8 shows what may be a primary viewing and editing frame 702A, providing viewing and editing capabilities of what may become the final edited video clip 704A. In addition, the timeline slider 710 associated with the primary viewing and editing frame 702A may be associated with pull out viewing frames 808 that pull off from specified positions on the timeline slider 710, such as a start frame 802, end frame 804, intermediate frame, or the like. For example, the start frame 802 may provide the current start of the edited product, that is, the first frame for the non-deleted material currently included in the video clip 704A being edited. In embodiments, as the user 602 moves the start slider 718, the image displayed in the start frame 802 may also change to correspond to the new start point. Similarly, the end frame 804 may provide the current end of the edited product, that is, the last frame for the non-deleted material currently included in the video clip 704A being edited. In embodiments, displayed frames, such as the start frame 802, the end frame 804, the current frame 702A, or the like, may provide the user 602 an improved view of the work currently being edited. In embodiments, a plurality of pull out viewing frames 808 may be implemented within the video manipulation facility 700.

In embodiments, FIG. 8 illustrates that a plurality of additional video clip 704B-F viewing frames 702B-F may be utilized in association with the video manipulation facility 700. These additional viewing frames 702B-F may be used to view imported video clips 704B-F that may be selected, in whole or in part, to be integrated into the video clip 704A currently under edit. For instance, the video clip 704A currently under edit may be a video clip 704A shot by the user 602. The user 602, after deleting unwanted portions of the video clip 704 at the beginning 714D and end 710E, may download a video clip 704B, say from a posting website 122, an e-commerce website 122, from local memory, or like, to one of the viewing frames 702B. In embodiments, the user may view the video clip 704B, and select the desirable segment by deleting portions at the beginning 714F and end 714G. In embodiments, the user 602 may drag the selected segment of video clip 704B to the timeline slider 710 for placement into the video clip 704A, creating an insertion 734 into the video clip 704A currently under edit. In this way, the user 602 may have a simple interface for viewing, organizing, and including segments from outside sources into the video clip 704A currently under edit.

In embodiments, the systems disclosed herein allow companies to add easy-to-use video encoding and posting capabilities to their existing web sites 122 with reduced effort and cost. The system may be configured as an encoding, uploading, hosting, and streaming solution that can be incorporated into a web site 122. Once installed, the system may reduce the complex video encoding and posting process typically required for a simple User Interface, which includes, in embodiments, a "drag-and-drop" interface.

In embodiments, the user may drag-and-drop standard video files into the VideoEgg publisher 112, or may capture video from a webcam 102E, camcorder, cell phone 102C, or any other video capture device. In embodiments, using the interface, the user may remove sections of a video and add publishing information such as beginning and end points, as well as a title frame, and other publication information. In embodiments, the publisher 112 software may transcode the user's video file to an optimized playback format and upload the file to a playback server. In embodiments, the encoded video may be made immediately available for viewing from the playback server via a Java-based player, a Flash-base player, or other playback option that does not require external players like Windows Media and QuickTime. In embodiments, the playback format may be streaming, a non-streaming format, for example, the images may be provided in a sequential format, or some other download and or viewing format. In embodiments, the video, or other media, may be encoded to play in a Windows Media, QuickTime or other like player.

Until now, uploading video has typically required a highly technical understanding of formats, encoders, players, and streaming servers. By providing an upload system that employs a drag-and-drop web interface, direct capture from camcorders, and other simplifying features and workflows, this system may allow Internet users with reduced technical expertise, to capture, encode, upload, and distribute video over the world wide web or other network.

By giving Internet users the ability to post video on the web, the disclosed systems may enhance the way people communicate online. The systems described herein may enable video-enhanced online classifieds of real estate, cars, boats, etc.; improve personal profiles for dating and social-networking services; enrich online auction postings with product demonstrations; facilitate sharing home videos with friends and family; enable submission of multi-media projects and reports for school and work; augment applications to schools, jobs, and programs; enliven personal web sites, social network sites (e.g., myspace.com), emails, and blogs; and provide a variety of other features.

The publisher 112 may be configured as a browser extension which adds device interfacing, video capture, encoding, simple editing, upload capabilities and other functionality as described herein to a standard Internet browser 108. When a user connects a video-enabled recording/storage device 102, such as through a USB port or other hardware connection, or selects a video file, the publisher 112 may be configured to read the media, allow the user to make edits, and extract and re-encode each video frame and audio sample into a high quality compressed format optimized for playback on the web.

After authorizing transmission through a secure handshake protocol, the publisher 112 may upload the file to the content delivery network 124; a digital delivery network specifically tailored to handle large-scale uploads and downloads. The video is now ready for viewing via the player. By streaming, progressively downloading, or otherwise presenting the video directly to a Java-based, Flash-based, or other player, VideoEgg may provide embedded video on the web, often without the need for an external player such as Windows Media or QuickTime. In embodiments, the player 128 loads without requiring any download or installation for users with Java and/or Flash installed. For users that do not have Java or Flash, the system may automatically download a small plug-in version of a player 128, or other embodiment, of the player 128, allowing playback on users' 602 machines.

In embodiments, the products and services described herein may be used to service an Internet Listing Service, Dating and Social Networking, Online Media Sharing, Auction markets, and other applications as described herein.

In embodiments, the publisher 112 may accept videos, transcode them for streaming and uploads them to the content deliver network 124, where they are available for streaming to the player 128. The application server(s) 120 provide support services such as installation, updates, authorization and logging.

An embodiment of a process according to aspects of the present invention shall now be described. A client device may embed the publisher 112 directly in a client site using standard object/embed HTML tags. The client passes parameters in the HTML that control the appearance and functionality of the publisher. The publisher 112 checks for new modules that should be installed from the application server 120 and performs any necessary or desired updates. A user may interact with the publisher 112 to select a source device and/or source file. The publisher 112 performs another round of updates, this time looking for updates required to use the specific file or device. If the device or file is unsupported, the publisher 112 may report the error to the application server 120. The publisher 112 opens a connection to the content delivery network and authorizes itself. The publisher 112 transcodes the source video file and uploads it to the content delivery network 124, where it is made available for viewing via the player 128. The client embeds the player 128 directly into the document using HTML. The player 128 requests the file from the content delivery network 124 and begins playing back the video. The application server 120 may monitor traffic to the content delivery network 124, disabling files when they are no longer needed and generating reporting data for Clients.

In embodiments, certain clients may want to host a service internally. In this scenario, the client may pass an alternative content delivery network 124 address and application server 120 address to the publisher 112 as HTML parameters. The publisher 112 may upload the video file to this alternative content delivery network 124, and may use the alternative application server 124 for updates. The application server 124 may still be used for non-critical services such as logging. The self-hosted application sever 124 may mirror files on the application server. If the client wishes to use a different upload or authorization mechanism, this new mechanism can be incorporated into the publisher 112 as an optional pluggable module.

Self-hosting may create a potential security risk since an unauthorized site could use the publisher 112 by passing its own content delivery network and bypassing the security check at the content delivery network 124. To overcome this, the Client may be given a special key that authorizes self-hosting and an ID number associated with this key. The client may use this key to encode a pass phrase that is sent along with the ID as part of the publisher 112 parameters. When the publisher 112 receives a request for self-hosting, it first tries to verify that the content delivery network address and application server 120 address are authorized by downloading a list of authorized content delivery network's 124 from the application server 120. If the application server 120 cannot be reached, the publisher 112 can use the ID to look up a copy of the secret key which is hard-coded in the publisher, and then tries to decode the passkey to authorize the client.

In embodiments, a browser enabled processor platform 104 may be a microprocessor or microcontroller-based electronic device capable of supporting a browser application. The browser enabled processor platform 104 may have a CPU that executes software code for the basic operation of the device. The executable code may include an Operating System, programs, device drivers and other software components. Device drivers may include I/O device drivers and network interface drivers. A device driver may interface to a keypad or to a USB port. A network interface driver may execute protocols for the Internet, or an intranet, Wide Area Network (WAN), Local Area Network (LAN), Personal Area Network (PAN), extranet, or other network.

In embodiments, the browser enabled processor platform 104 may include a memory facility. The memory facility may contain transactional memory and/or long-term storage memory facilities. The memory facility may function as file or document storage, program storage, or working memory. A working memory facility may include, but is not limited to, static random access memory, dynamic random access memory, read-only memory, cache or Flash memory. A working memory facility may, for example, process temporally-based instructions, in part, by temporarily storing code relating to an action of a device and purging the information from the working memory facility in close temporal proximity to the completion of the action. A long-term memory facility may include, but is not limited to, a hard drive, portable drive, portable disk (e.g., a CD-ROM, DVD, etc.), tape facility, or other storage facility. A hardware memory facility may store a fixed information set (e.g., software code) including, but not limited to, a file, program, application, source code, object code, and the like.

In embodiments, the browser enabled processor platform 104 may contain hardware for converting analog signals to digital data, or for converting digital signals into analog signals. An example of converting an analog signal to digital data may be the conversion of an analog audio or video source into digital data for the storage of the audio or video information for subsequent storage, playback, conversion, transfer of the original audio to a digital, microprocessor-based system or to perform another function as described herein. Another example of converting an analog signal to digital data may be the conversion of analog signals from a light sensor device into digital data for the storage of visual information for subsequent storage, playback, or transfer of the original audio to a digital, microprocessor-based system. Visual information may be in the form of still images, icons, graphics, video images, or audio-video images, and the like.

The browser enabled processor platform 104 may have I/O interfaces. I/O interfaces may include a hardware network interface, displays, CD/DVD, video enabled recording/storage device video enabled recording/storage device 102, keypads/keyboards, printer, or other standard interfaces. An example of a hardware network interface may be a broadband connection, a dial-up connection, wireless, or other connection. An example of a display may be a monitor, plasma screen, or a liquid crystal display. An example of a video enabled recording/storage device video enabled recording/storage device 102 may be a digital camera 102A, digital video camera 102B, webcam/video capture board 102E, a cell phone 102C, personal digital assistant, pocket pc, notebook, and the like. An example of other standard interfaces may include, but is not limited to, a USB port, parallel port, serial port, microphone, or speaker.

A browser 108 may be a software application for navigating a network 118, such as the Internet, intranet, extranet, a private network, and or content in file systems. A browser 108 may be a software application that enables a user 602 to display and interact with text, images, videos, audio and other content accessible through the network 118 (e.g., information typically located on a web page 122 at a website on the world wide web or a local area network). Text, images, video and other content (e.g., on a web page) may contain hyperlinks to navigate to other web pages at the same or different websites 122. Web browsers 108 may allow a user to navigate and access information provided on many web pages at many websites 122 by traversing these links. Web browsers 108 may also provide other features such as storing the address for a favorite website utilizing the browser's Bookmark Manager. Examples of book-marked websites 122 may be hyperlinks to other personal sites, e-commerce sites, government sites, or educational sites. Another feature of web browsers 108 may be caching, where recently visited websites 122 are transferred through the processor interface and stored in processor memory to decrease retrieval time for subsequent calls for the website 122. Examples of web browsers 108 may be Microsoft Internet Explorer, Mozilla Firefox, Opera, Netscape, or Apple Safari. Although browsers 108 may typically be used to access the world wide web, they may also be used to access information provided by web servers in private networks or content in file systems.

Web browsers 108 may communicate with web servers through the network interface primarily using Hyper-Text Transfer Protocol (HTTP) to fetch web pages. HTTP may allow a web browser 108 to upload information across the network interface to web servers as well as download web pages from them. Web pages are located by means of a Uniform Resource Locator (URL), which may be treated as an address, beginning with http: for HTTP access. Many browsers 108 may support a variety of other URL types and their corresponding protocols. Examples of other URL types may be ftp: for File Transfer Protocol (FTP), rtsp: for Real-Time Streaming Protocol (RTSP), and https: for HTTPS (an SSL encrypted version of HTTP). The file format for a web page may be Hyper-Text Markup Language (HTML). Browsers may also support formats in addition to HTML. Examples of other support formats may be JPEG, PNG and GIF image formats, and can be extended to support more through the use of browser plug-ins. An example of a browser plug-in may be Macromedia's Flash or Apple's QuickTime. The combination of HTTP and URL protocol specification may allow web pages to have embedded images, animations, video, sound, and streaming media into the web page, or make them accessible through the web page.

A publisher 112 may be provided in association with a browser enabled processor platform 104 and the publisher 112 may be designed as a browser plug-in or other integrated software component. The embedded software component may be adapted to 'plug-into' the browser 108 in such a way that the publisher 112 functionality is presented as functions within the browser 108. This may allow a user to launch or otherwise interface with a browser style application, which he may be very familiar with, and deploy the publisher 112 functionality without leaving the browser user interface. In embodiments, this may provide a consistent web style experience for the user 602. The user 602 may be using the publisher 112 to convert a video file to a streaming format, edit the file, and post the file to a website 122 or other associated network location. Using systems and methods according to the present invention, the user may feel as if he is interacting with the Internet or other network 118 through a browser application, and manipulating the video files as desired all while interacting with the same familiar web browser style program. In embodiments, the user may ultimately intend to extract a video file from a video source or storage facility for editing and posting to a website 122 (as further described herein). The user may get the impression that he is accomplishing all or many of the functions while connected to and interfacing with the network 118. This may provide a seamless network experience because the user opens his interface to the network 118 (e.g., his browser application) and then works within that interface environment to manipulate and post his video on an intended website 122.

In embodiments, the publisher 112 may be an embedded browser plug-in. A plug-in may be a program that is designed to interact with another program to provide certain functions. The browser plug-in may be adapted to plug into, or otherwise interface with, a browser-style software application. In embodiments, the browser plug-in may be delivered through a CD, DVD, or portable drive, downloaded from an application server 120, provided with hardware, or otherwise provided. Examples of functions that plug-ins may provide include, but is not limited to, adding the capability of displaying specific graphic formats (e.g., SVG if the program doesn't support this format as apart of its standard functionality), to play multimedia files, to encrypt/decrypt email (e.g., PGP), or to filter images in graphic programs. A primary program, such as a web browser 108 or an email client, for example, may provide a way for plug-ins to register themselves with the program, and a protocol by which data is exchanged with plug-ins.

The functions that the publisher 112 plug-in may add to the standard browser functionality may include a user interface for receiving video from multiple sources, editing the video, encoding the video into a new format, and posting the video to a website 118. The publisher's web interface may be facilitated by the browser's network interface made through the browser enabled processor platform's 104 network connection. The publisher 112 may open a connection to a content deliver network 124 to upload the transcoded files to streaming servers. The publisher 112 browser plug-in may provide secure handshake protocols and authentication with the application server 120. Publisher 112 may also store files locally on the browser enabled processor platform 104 through the browser's interface.

The publisher 112 browser plug-in may supply a drag-and-drop interface to the browser's functionality that allows for simplified video encoding and posting of video files to a network 118. The drag-and-drop interface may provide for the receiving of video from a variety of sources. An example of a video source may be a webcam/video capture card 102E. The webcam/video capture card 102E may use start and stop capture buttons to control captures from these video devices. Since these devices do not provide integrated audio sources, publisher 112 may allow for the selection of an audio source from a dropdown list, and set audio record volume using a slider and an audio level meter. A preview window may display the live video stream. Another example of a video source may be a digital video camera 102B. The publisher 112 may capture video and audio directly from digital video cameras 102B, either capturing the live feed from the camera, or reading a stored video off a tape, for example. In the latter case, the publisher 112 may provide VCR/DVR-style controls that allow the user to queue up the tape. A "StartCapture" button may begin capturing video and audio from the device, and a 'stop capture' button may end the capture. A preview window may display the video feed from the device. Another example of a video source may be a video enabled cellular phone 102C. Publisher 112 may also capture Email, MMS, SMS or other messaging from the cell phone 102C. A user may upload a video via a video message, downloaded video, video accessed via a browser 104, etc. from a video-enabled cell phone 102C. The user may be provided a unique numerical email, or other messaging code, or other address (e.g. 1234@videoegg.com) to which to send the video message. The end user may send a video message to this address, where an SMTP server, and/or other configuration of server, will receive the message, parse the video file, and store it. The server may also store the association between the ID number (1234) and the path on the server of the stored video file. Once the email is received, the publisher 112 may automatically download the video file from the mail server. Other examples of a video and/or audio source may be a CD, DVD 102D, a cell phone 102C, personal digital assistant, pocket pc, notebook, and the like. The publisher 112 may read audio and video directly from a CD or DVD 102D, and read video files from still cameras, or other devices, that support video. The publisher 112 may also provide the ability to direct capture video from the source.

In embodiments, sources of video may use a wide variety of file formats, which may complicate the process of posting video files onto a network 118. The publisher 112 browser plug-in may allow for the translation of one file format to another file format. Publisher 112 may choose a common file format to translate into in order to establish a standard for the service. The translation of code from one format to another is referred to as transcoding. Publisher 112 may transcode into a common format from a plurality of file formats. Some examples of these formats are: WMV, ASF, MPEG, 3GPP, 3GPP2, A-GIF, DV, FLIC, AMC, MPET1, MPEG2, MP4, MOV, VDU, WMV7, WMV8, MPG1, MPG4, CinPak, MSM45, MSM41, MSM42, MSM43, RVU9, ACLEP, MJPEG, Apl Ani, Apl Vid, MJPGA, MJPGB, H.261, H.263, comp V, DV-N, DV-Pal, DVCP-N, DVCP-P, MSVid1, SrVid2, SrVid3, Indeo3, Indeo5, and Flash 5.

Publisher 112 may retrieve automatic updates to provide transcoding for newly emerging file formats as they become available. Publisher 112 may provide for automatic updates to the publisher 112 software modules as the plug-in source code is updated. Error generation for unsupported devices or functions may be provided to the application server 120, which logs them for action. Actions may include the installation of a new module, the installation or update to an external dependency such as QuickTime or DirectX, display of the error message, or the running of a diagnostic tool.

The publisher 112 browser plug-in may provide a video editing function through the video manipulation facility 700 for the modification of video files after download from the source. In embodiments, the video manipulation facility 700 may be provided within any browser enabled processor platform 104. The video manipulation facility 700 may include a plurality of video editing and video manipulation functions, such as deleting segments, adding segments, modifying segments, utilizing a graphical video timeline 710 for editing video, providing an editing tool 722 in association with the video timeline slide bar 710, importing video clips 704, organizing video clips 704, saving edited work as a new video clip 704, simultaneously viewing multiple video clips 704, dragging video clips 704 between different viewing frames, editing multiple video clips 704 in association with one another, or the like. In embodiments, the video manipulation facility 700 may provide the user 602 with a graphical user interface that allows an intuitive and powerful tool for the creation of personalized video products.

In embodiments, the video manipulation facility 700 may provide for the editing and/or manipulation of video clips 704 or video segments of video clips 704. For the purposes of this document, the term video clip 704 refers to images produced from a video file, where a video file may be a computer file that includes data relating to video images, progressive images, audio, audio tracks, metadata or other such data. For example, a video file may be formatted as an .asf, .asx, .avi, .mov, .mp4, .mpg, .qt, .rm, .swf, .wmv, or the like. In embodiments, the video file format may be sourced from a plurality of facilities, such as a video camera, a mobile phone, a still camera, a web-cam, a previously stored file, a previously modified file, or the like. The video clip 704 may be a continuous sequence of images; a previously edited sequence of images; a mixture of still images, audio, sequenced images, and edited effects; or the like, presented to a user interface such as the video manipulation facility 700. The video segment may be a portion of a video clip 704 that is the result of editorial dividing of a video clip 704. This portion of the video clip 704 may be referred to as a segment until it is saved as a separate video file. For example, when a user 602 divides a video clip 704, such as by deleting various portions of the video clip 704 as a part of an editing process, each new portion of the sequence may be referred to as a video segment. The term video segment may be useful for describing the editing process, and may be applicable until the file is saved. When the concatenation of the various segments and editorial effects is complete, and the file is saved, the file may again be referred to as a video file. When the new video file is opened for viewing, the resulting images may be referred to as a video clip 704 again.

In embodiments, the video manipulation facility 700 may provide for a plurality of components, such as a timeline, a timeline slide bar 710, a timeline start slider 718, a timeline end slider 720, a current view slider 732, a modified indicator, an indicator of deleted portions of video sequence 714, an indicator of areas that have not been deleted and may be selected for editing 712, an indicator of areas that have been inserted 734, a viewing and editing frame 702, an audio timeline slider, an audio start slider, an audio end slider, an audio modified indicator, an audio deleted indicator, an audio addition indicator, an audio editing control facility, file management facility, a menu bar, a playback control bar 708, or the like. In embodiments, the playback control bar 708 may include a plurality of viewing controls, such as play, rewind, forward, fast forward, back, pause, slow motion forward, slow motion reverse, or the like.

In embodiments, the video manipulation facility 700 may be associated with a computer facility, such as a personal computer, a mobile computing facility, a mobile phone, a PDA, or the like. Where the video file may be stored in memory, such as local memory, main memory, a mass storage facility, a removable media, a flash drive, a storage location on the network 118, on a server, on a client, in a database, or the like. In embodiments, the video manipulation facility's 700 timeline slide bar may be associated with a physical manipulation facility, such as a keyboard, a keypad, a touch pad, a mouse, a drawing tablet with a pen, or the like. In embodiments, the video clip 704 may be dragged into the video manipulation facility 700, where the video clip 704 may be dragged with a mouse and moved into the video manipulation facility 700 by moving the mouse, where the video clip 704 may be dragged by selecting the video clip 704 with the mouse and moved by using the arrow keys on a keyboard or keypad, where the video clip 704 may be dragged by selecting the video clip 704 using the keyboard, or the like.

In embodiments, the video clip 704 may be presented in association with at least one other visual element, such as another video clip 704 frame 702, a start frame 802, an end frame 804, an intermediate frame 702, a point of insertion for a video clip 704, an edited version of a video clip 704, an unedited version of a video clip 704, a frame 702 that shows the video clip 704 prior to application of a visual effect, a frame 702 that shows the video clip 704 after an application of a visual effect, or the like. In an embodiment of the invention, FIG. 8 shows one possible configuration of viewing and editing frames 702, including what may be a primary viewing and editing frame 702A, a plurality of additional viewing frames 702B-F, and two possible pullout frames 808, the start image frame 802 and the end image frame 804, in which video clips 704 may be presented.

In embodiments, the editing of a video clip 704 may include a plurality of operations, such as deleting a portion of a video clip 704, adding a portion of a video clip 704, inserting a portion of a video clip 704, dividing a video clip 704 into segments, altering a video clip 704, and the like. In embodiments, the alteration of a video clip 704 may include cropping of video clips 704, insertion of video clips 704, insertion of advertisement, insertion of an image frame, insertion of animation, concatenation of video clips 704, deletion of portions of video clips 704, changing the color character, changing the focus character, changing the luminance, adding text, annotation, changing the audio, or the like. In an embodiment of the invention, FIG. 7 shows the editing tool 722 in association with an editing tool selection palette 724. For the sake of illustration, only a limited number of edit operations are depicted in the editing tool selection palette 724 of FIG. 7, and does not limit the editing operations included in the invention.

In embodiments, the plurality of operations may also include deleting, adding, inserting, file insertion, advertisement insertion, blending, blanking, shading, fading, appearing (the opposite of fading), layover, a change in contrast, a change in brightness, and change in color, and change in graininess, a change in appearance, a change in focus, sharpening, transforming, erasing, cutting, cutting frames, pasting, pasting frames, painting, patterning, airbrushing, cropping, copying, adding text, adding audio, image rotation, frame rotation, annotation, inversion, or the like.

In embodiments, the plurality of operations may also include a transition from one video clip 704 to another video clip 704, such as a splice, a segue, a concatenation, a blend, a fade, a jump cut, a match cut, a geometric shape wipe, an image file wipe, a pattern wipe, a pixelation, a change in chroma, a change in luminance, a change in focus, transitioning from a first image to a second image set in juxtaposition with the first, or the like.

In embodiments, at least one of the plurality of operations may include dividing the video clip 704 into more than one video segment, where one of the video segments may be deleted, edited, saved as a video file, saved as a video clip 704, or the like. In embodiments, the segment of the video clip 704 or video file may have been previously edited. In an embodiment of the invention, FIG. 7 shows an example of how the timeline slide bar 710 may represent various video segments and the operations that they have been involved in. For instance, the timeline slide bar 710 of FIG. 7 may show that a video segment at the beginning may have been deleted 714A, a video segment at the end may have been deleted 714C, a video segment in the middle has been deleted 714B, a video segment has been inserted 734, and two video segments remain 712A-B from the original video clip 704. The visible indicators shown in FIG. 7 are meant to be illustrative, and should not limit the visual representation of video clips or video segments as presented by the timeline slide bar 710, the visual depiction of the timeline slide bar 710, the editing tool 722, the editing tool selection palette 724, or the like.

In embodiments, the timeline slide bar 710 associated with the video manipulation facility may include a plurality of functions. The timeline slide bar 710 functions may be presented as a palette, such as vertical list of functions, a horizontal list of functions, a drop-down menu of functions, a pull-up menu of functions, or the like. Functions presented as a palette may be located anywhere on the screen, chosen from a timeline area to be edited, chosen from the viewing area, or the like. Functions may be selected by clicking on the linked text, selected by choosing from a menu, selected by command line, or the like. The timeline slide bar 710 functions may be organized on an editing template, such as window, a pop-up list, a drop-down menu, a two-dimensional selection space, a slider, as buttons, or the like, where the organizational facility may be moveable, slideable, rotateable, clickable, or the like.

In embodiments, functions of the timeline slide bar 710 may be associated with a video timeline, an audio timeline, a linear timeline, a curvilinear timeline, a circular timeline, a two-dimensional timeline, or the like. Timeline slide bar 710 functions may also be associated with a visual element, such as a blank area, as a patterned area, as an image, as a video image, as a faded area, as a blended area, as a leader, as a trailer, as an interstitial, as a temporal image, as a video, as a label, or the like. In embodiments, the visual representation of the video slide bar 710 may be presented in a plurality of configurations, and may aid in the viewing and/or editing of video clips 704.

In embodiments, the display of video clips 704 may be presented within a viewing frame 702 that may be associated with the video clip 704 currently being edited, currently being viewed, imported from an external source, or the like. The viewing frame 702 may be in coordination with the timeline slide bar 710, such as displaying an image frame indicated by the timeline start slider 718, timeline end slider 720, an intermediate time slider, a current view time slider 732, or the like. In embodiments, a plurality of viewing frames 702 may be associated with the viewing and editing of the video clip 704. For instance, FIG. 8 shows one of a plurality of different viewing frame 702 configurations, where the viewing frames 702B-F at the top of the figure may show video clips 704B-F that have been imported from external sources, previously edited video clips 704B-F, previously selected video segments, or the like. These video clips 704B-F may be associated with the on going editing of a video clip 704A. In embodiments, the video clip 704A currently being edited may be presented in a separate viewing frame 702A. In embodiments, viewing frames 702 may be associated with the timeline slide bar 710, where each viewing frame may have its own timeline slide bar 710, where a timeline slide bar 710 may be associated with a plurality of viewing frames 702, where a viewing frame may be associated with an editing function such as a time line slider, where a viewing frame changes in response to changes in the time line slider, or the like.

The viewing frame 702 may be associated with a timeline slide bar 710 indicator. In embodiments, this viewing frame 702 may be a pullout frame 808 that may be created by selecting a location or slide indicator on the timeline, and dragging out a pullout frame 808. For instance, FIG. 8 shows a pull-out viewing frame 808 that may have been dragged out from the timeline start slider 718, displaying a start image frame 802 in association with the timeline start slider 718 of the video clip 704A currently being edited. Similarly, FIG. 8 shows a pullout frame 808 that is associated with the timeline end slider 720, displaying the end image frame 804. In embodiments, the number of pull out viewing frames 808 may be configurable by the user 602.

In embodiments, FIG. 8 provides only one of a plurality of different configurations for the visual display of the video manipulation facility 700. The layout of viewing frames within the video manipulation facility 700 may be displayed in various configurations, such as viewing frames configured side by side in a horizontal orientation, side by side in a vertical orientation, arranged in a diagonal orientation, or the like. The layout of viewing frames may also be in a variety of geometric patterns, such as in a square, a rectangle, a triangle, a circle, or the like. In embodiments, the arrangement of viewing frames 702, editing tool selection palette 724, timeline slider bars 710, playback control bar 708, or the like, may be configurable by the user 602.

In embodiments, the video manipulation facility 700 may be used to create personalized video products from a combination of user 602 video recordings; outside sources such as friends, the internet, e-commerce websites; the editing, viewing, and organizational features of the video manipulation facility 700, and the like. Examples of video products may include advertisements, announcements, personals postings, social network postings, virtual tours, visual blog, news summary, video wedding album, auctions, or the like.

In embodiments, the video manipulation facility 700 may be used to create an advertisement to sell an item. For instance, say a user 602 wants to sell an elliptical workout trainer on e-bay. They may want to create an exciting and informative video that presents the elliptical trainer in a way that portrays the benefits of using an elliptical trainer in general, as well as showing that this particular elliptical trainer is a quality product, in good shape and worth the asking price. The first thing our user 602 might do is to record a video of their elliptical trainer in use, perhaps with an attractive and healthy person exercising on the equipment. The user 602 may record enough video to insure that when they go to edit, they have plenty of material to choose from.

The user 602 may then connect their video enabled recording and storage device 102 to their browser enabled processor 104, and opening the publisher 112, drag the video file into the video manipulation facility 700. As presented in FIG. 8, the user 602 may drag the video file to any of a plurality of available viewing frames 702 within the visual display of the video manipulation facility 700, say for instance into the viewing and editing frame 702A, which may be associated with a timeline slide bar 710 with full editing capabilities. The user 602 may now begin the process of editing and augmenting their video clip 704, with the end goal of producing a finished product to be posted, perhaps onto an e-commerce site such as e-bay.

The user 602 may begin the editing by evaluating their raw video file and determining what segments they what to keep, and what segments they what to delete. As shown in FIG. 7, the user 602 may utilize the timeline slide bar for this initial editing. In an embodiment, the user 602 may move the timeline start slider 718 to select the beginning of the first segment to keep, and then move the timeline end slider 720 to select the end of the last segment to keep. In this way, the user 602 may conveniently mark unwanted segments of the video clip 704 at the beginning and the end of the video clip 704, for deletion. The user 602 may then utilize the editing tool 722, and selecting the eraser function from the editing tool selection pallet 724, to delete additional segments 714B of the video clip 704. In embodiments, the action of selecting the segment and deleting may be made in two steps, that is to select the area and then subsequently choose to delete or erase that segment, or in one step, that is to drag the editing-eraser tool 722 over the area to be deleted, thus erasing in one step.

In embodiments, the beginning and end points of the erased segments may be adjusted as many times as the user 602 wants. As segments are marked deleted, the playback control bar 708 may be utilized to play the remaining undeleted segments back as a single concatenated video sequence. The user 602 may continue to adjust the positions of timeline sliders, and end-points of erased segments, until satisfied with the sequence. In addition, various video clip 704 and/or video segment times 728 may be displayed for the convenience of the user 602, for instance, the edited length of time vs. the maximum length of time (the original video clip's 704 length). These time indicators may be used to better enable the user 602 to monitor the length of the final video sequence. The user 602 may then save the final sequence as a new video file, either saving to local memory, or uploading 730 to a site on the network 118.

In embodiments, the user 602 may also utilize a plurality of editing functions, as previously discussed, to modify the video clip 704. One example of this may be to utilize a transition tool to modify the transitions created during deleting. Again, in embodiments, the editing tool may allow for these edits to be executed in a two-step, select then execute implementation, or in a one-step drag/execute implementation. The user 602 may also utilize multiple viewing frames 702 and pullout frames 808 to help keep track of the editing process, as shown in FIG. 8. For instance, in addition to the current view frame 702A, the user 602 may utilize a number of pullout frames 808 that are associated with points on the timeline slider 710. Examples of pullout frames 808 may be the start image frame 802, the end image frame 804, an intermediate image frame, a transition point, or the like. In embodiments, the use of multiple viewing frames may better enable the user 602 to keep track of the editing process.

In embodiments, the user 602 may want to augment their own video of the elliptical trainer with video clips 704 from an outside source, such as from the product website for the elliptical trainer, from public video archives such as Googlevideo or U-Tube, from video shot by a friend, or the like. The user 602 may want to search the Internet for video clips 704 that could be added to their own footage. In embodiments, as the user 602 finds video clips 704 that may be useful, the user 602 may drag those video clips 704 into viewing frames 702B-F in the video manipulation facility 700. These viewing frames 702B-F may be associated with timeline slide bars 710 that enable the user 602 to select the desired segment from the original video clip 704. In embodiments, the number, arrangement, and timeline slide bar functionality of these viewing frames 702B-F may be user 602 configurable.

In embodiments, the user 602 may now combine the segments acquired from external sources with their own previously edited video of the elliptical trainer. For instance, the user 602 may now have a satisfactory initial video sequence, edited from their original recording from their video enabled recording and storage device. The user 602 may also have downloaded a variety of video clips 704B-F from the Internet, and subsequently trimmed them to a desired length. The user 602 may now want to insert some of these video clips 704B-F into their edited video clip 704A. In embodiments, the user 602 may be able to drag the video clip 702B to a location on the timeline slide bar 710A, which may insert the video clip 704 into the user's 602 video clip 704A sequence. For example, if the user 602 wanted to insert the product introduction video clip 704B from the product website, right at the timeline start slider 718, the user 602 may drag the video clip 704A to the location of the timeline start slider 718 on the timeline slide bar 710A, and insert. In embodiments, when the drag/insert was complete, there may be a visual indication of insertion 734A at that location. The user 602 may repeat this routine, say, by inserting another video clip 704C to an intermediate location along the timeline slide bar 710A, and the video clip 704C would be inserted with another visual indication of insertion 734B. In this way, the user 602 may have an intuitive graphical interface for the concatenation of a plurality of video clips 704 from a plurality of sources.

In this example, the final concatenated video sequence, for the purpose of selling an elliptical trainer, may consist of a first segment taken from the product website that introduces the product and its effectiveness, a second sequence shot by the user 602 showing an individual using the specific product, a third sequence from the internet, and finally a forth user 602 segment panning around the item for sale. The user 602 may now continue to add effects, transitions, audio, text contact information, animations, or the like, to produce the final video clip 704. This final video clip 704 may be saved and uploaded to the target Internet site, e-bay for instance, to be available for interested users 602 to view with player 128 on their browser enabled processor platform 104B.

In embodiments, the user 602 may utilize the video manipulation facility 700 to create personal video projects, such as a video wedding album. Video clips 704 may be taken from a plurality of different guests, on a plurality of different video enabled recording and storage devices 102. In an embodiment, a single user 602 may what to create a single edited video clip 704 from the plurality of sources, as a video wedding album for the bride and groom. First, the user 602 may need to collect the plurality of video clips 704 from a plurality of sources. For instance, guests may have recorded video clips 704 from a digital camera 102A, a digital video camera 102B, a cell phone 102C, a web cam 102E, or the like. Guests may save these video clips 704 to a personal website, an e-commerce website 122, onto a personal computer, or the like. Guests may also e-mail their video clips 704 to the user 602, provide the user 602 with the video clip 704 on portable memory media, provide the user 602 with a direct connection from their video enabled recording and storage device 102, or the like. The browser-enabled video manipulation and posting facility 100 may provide a straightforward and intuitive way for the user 602 to collect and organize these video clips 704 from a plurality of external sources.

In embodiments, the user 602 may utilize the multiple viewing frame 702B-F capabilities of the video manipulation facility 700 to collect and display all the video clips 704 as downloaded from their source locations. With the timeline slide bars 710 associated with each of the view frames 702B-F, the user 602 may select the desired video segment that is to be inserted 734 into the video clip 704A currently under edit. In embodiments, this video clip 704A currently under edit may be blank until the first video clip 704B-F is inserted. In embodiments, multiple viewing frames 702B-F may contain the same video clip 704 in order to facilitate the selection of multiple video segments from the same video clip 704. In addition, the user 602 may also search the Internet for video clips 704 that might complement the video clips 704 provided by guests, such as music video clips 704, other wedding scenes, video segments from TV shows, video clips 704 from the banquet hall's website, or the like. Once the user 602 has assembled the video clips 704 for inclusion, and used the timeline slide bar 710 to select the desired video segment from these video clips 704, the user 602 may assemble and edit the final product, in a manner as previously described. The video manipulation facility 700 may better enable a user 602 to more easily pull together a final edited video product, like a video photo album, from disparate sources.

In embodiments, the present invention may enable a user 602 to more easily create their own video blog from video clips 704 available on the Internet. For instance, the video websites 122 such as U-tube and Google currently provide access to videos on a plurality of topics; many in near real-time. These videos may provide the raw material for the public concatenation of available video clips 704. This current video access may only be the first wave of global video usage, that is, people may now be watching videos from many different and independent sources. But they may not have started to inject themselves into the process, their own opinions, views, disgust, activism, and individual expression. People may react when they see these images and video clips 704, but currently, their only reaction medium may be limited to talk, writing, blogging, or the like. The present invention may allow people to produce their own news-moment, by collecting a theme-based set of video clips 704B-F, and concatenating and editing them together into a finished product. This final product may serve as an artistic reflection, a political statement, a pubic announcement, an activism, or the like.

In this way, the user 602 may be able to freely pull in multiple video clips 704B-F and produce a final or ongoing piece, a video blog-like product, adding their own video clips 704 and inserting their own views through video, text, animation, or the like. The present invention may enable users 602 to do with videos, what they've been doing with text blogs. Blogs may be a form of journalism, or rather, ordinary people becoming journalists of the time, reporting in words what they've seen and how they feel. But a visual blog, a visual vehicle for delivering their own views of the current times, may provide significantly more impact, than mere words. The present invention may enable users 602 to become mini documentary moviemakers, collecting the video clips 704B-F of the day and creating their own near instant, interpretive creations of what is going on in the world, in school, in town, with their family, or the like. The user 602 may be making a movie/video file, from public domain video clips 704, their own video clips 704, a friend's video clips 704, that reflect something they feel, see, want to promote, send to friends, politicians, schools, the news networks, or just out onto the Internet.

In embodiments, in order to facilitate this sort of new medium of exchange, the user 602 may want to quickly drag and drop video clips 704 they find on the Internet into one or more viewing frames 702B-F. The present invention may give the user 602 a facility to pull in everything they find on their subject into a palette of video clips 704B-F from which to produce a final product. The user 602 may record their own video clip 704 opinions to add in, simply dragging them in off the video enabled recording and storage device 102. Then the user 602 may begin to produce the product. Using one editing and viewing frame 702A as their production space, they may insert the segments they what from all the viewing frames 702B-F they've collected, into their own order and configuration. The user 602 may edit and modify the concatenated sequence, adding effects and text, cutting in still frames, freezing frames, fading, or the like.

In embodiments, the user 602 may pull in audio tracks onto an edit-slider parallel to their video timeline slide bar 710. The user 602 may utilize pullout frames 808 from any part of the video sequence. This may allow the user 602 to more easily track what they've put together as they edit, which may be especially important for when the user 602 starts adding audio tracks. These pullout frames 808 may more easily allow the user 602 to see the entire production sequence. In the end, the user 602 may have a quick and simple means for producing a short interpretive 'film' from, and then back into, the public video domain. In embodiments, the present invention may allow the user 602 to become a part of the local/national/global discourse, able to blog video-opinions-reactions, rather than just words.

In embodiments, the video manipulation facility 700 may provide an improved facility for the posting to an on-line personals website. Traditionally a personals website may have a number of still images of the individual being introduced. The present invention may enable an improved way to present the individual through the creation of a personalized video clip 704. For instance, the user 602 may utilize the video manipulation facility 700 to enhance a video clip 704 recorded by the user 602. This video clip 704 may have the purpose of introducing the personal side of the user 602, including preferences, hobbies, activities, and the like. The video clip 704 may have been recorded by a friend and require editing, including selecting segments to be deleted, segments to be modified, transitions between segments, or the like, that may be provided through the video manipulation facility 700 as previously described. As shown in FIG. 8, the video manipulation facility 700 may enable the user 602 to download other video clips 704B-F from external sources such as the Internet, to insert into the user's 602 video clip 704A currently under edit.

As an example of how the video manipulation facility 700 may help improve the user's 602 final edited video clip 704A for their submission to an on-line personals website, suppose the user 602 enjoys hiking in the mountains. The user 602 may search and download from the Internet, video clips 704B-F of mountains and hikers. The user 602 may then use the timeline slide bar 710 associated with the viewing frames 702 to select the desired segment from the video clips 704B-F. The user 602 may determine which segments from the downloaded video clips 704B-F they may want to insert into their video clip 704A currently under edit. Perhaps one of the video clips 704C shows hikers climbing one of the user's 602 favorite mountains, and the user 602 decides to insert 734 the video segment into their own video clip 704A just after the user 602 has talked about how much they like to hike in the mountains. Transition effects and other editing functions may now be applied through the video manipulation facility 700. In this way, the present invention may provide a more intuitive and efficient way to assemble and edit a video clip 704 that utilizes a combination of the user's 602 recorded video clip 704, editing functions of the video manipulation facility 700, video clips 704B-F from external sources, the multi-clip handling capabilities of the video manipulation facility 700, or the like.

In embodiments, the video manipulation facility 700 may better enable the production of a video tour of the items for sale at an auction, such as an estate sale. The user 602 responsible for producing an on-line preview of the items for sale may use the present invention as an intuitive facility for quickly getting the job done. For instance, the user 602 may walk the auction site, recording each item with their video enabled recording and storage device 102, and download the recording to their browser enabled processor platform 104. The recorded video clip 704 may then be dragged into the editing and viewing frame 702A for detailed editing. In addition, the user 602 may easily import video clips 704B-F that are standard headers and trailers for the auction site, to be inserted into the video clip 704A currently being edited. The user 602 may use the timeline slide bar 710, editing functions of the editing tool selection palette 724, and the editing tool 722 to methodically select and editorially enhance the video sequences for each of the items for sale. In embodiments, as the user 602 is editing the video sequence for each item for sale, they may utilize a pull-out frame 808 to select a single frame image of that item to be used as a thumbnail image on the auction site website. These thumbnails may be linked to the video segment of that item, a separate video clip 704 for that item, an information description of the item, or the like. The use of timeline slide bar 710, and associated pullout frames 808, may provide an easier and more effective way for the auction site to produce an interactive website for the auction.

In embodiments, the video manipulation facility 700 may provide an intuitive graphical interface for the creation of a virtual tour of a facility or site. For instance, say the National park service what's to crate a virtual tour of Minute Man National Historical Park, where the first battle of the American Revolution took place. The user 602 assigned to the task may create a script for a monolog, and a list of historical sites and scenes to be included. The user 602 may then record the video monolog against some historical backdrop. This video clip 704 may be the primary video clip 704A into which other video segments may be inserted, and overall editing may take place. The user 602 may record new footage of the historical scenes to be included, use existing video files in local memory, search and download video clips 704 from the Internet, or the like.

These video files 704B-F may be dragged into and viewed by the video manipulation facility 700. The desired video segment from each video clip 704B-F may be selected utilizing the timeline slide bar associated with each viewing frame 702B-F, and inserted 734 into the appropriate place along the timeline slide bar 710A of the recorded video clip 704A from the original monolog. The editing tool may be used to apply editing functions as previously described, such as adding in text information on the history of each site, providing transition effects between concatenated video sequences, adding editing effects to enhance the video sequences to create a historical feel, or the like. In embodiments, the present invention may provide an improved way to create a virtual tour from a combination of new video clips 704, existing local video clips 704, video clips 704 from the Internet, or the like. The present invention may also provide a graphical interface for implementing the editing of the virtual tour that enables the user 602 to more quickly produce the finished product.

In embodiments, the present invention may enable a quick and simple way to create video announcements for professional or personal use, such as a new product or new employee announcement to be e-mailed to all employees of a company, a township announcement to be posted on a the town's website, a family announcement to be e-mailed to everyone in the family, or the like. For example, a company may want to have a campaign that better acquaints employees with the products of the company, but doesn't want the cost of a professional video production team. In embodiments, the present invention may provide a quick and simple way for a user 602, who is not a professional in video production, to create these product announcements. Say the product is a new digital camera. The user 602 assigned to the task may want to create a very simple three-minute video that highlights the camera, and explains its features as compared with other similar cameras. The user 602 may start by recording a close-up of the digital camera, panning around the camera to show all sides of the product. Next, the user 602 may drag the video file into the editing and viewing frame 702A for editing, insert other available video clips 704B-F, add overall editing and transition effects, or the like, as previously described.

In embodiments, the video manipulation facility 700 may provide a way to record audio as a separate track, with a separate timeline slide bar 710, to enhance the product announcement. The audio and video timeline slide bars 710 may be associated with one another through the graphical interface of the video manipulation facility 700. In embodiments, the user 602 may be able to create a plurality of audio timeline slide bars 710 in association with the video clip 704A currently under edit. For example, the user 602 may record a voice-over for the video clip 704 to provide the description of the product. Further, the user 602 may insert a music track that that may provide a background mood for the production piece. In embodiments, the video clip 704 length indicators may provide a way for the user 602 to cut the video clip 704 to match the length of the selected music track. In this way, a user 602 may be able to quickly and inexpensively produce a product announcement from multiple video and audio sources. In embodiments, there may be a plurality of announcement types that may utilize the present invention to quickly and cost effectively produce a final audio-video product.

In embodiments, publisher 112 may provide a help function through a help icon. The publisher 112 may provide contextual help, guiding the user through the process by layering explanations. Help text may be triggered for an unsupported device which will walk the user through the issue. Unexpected errors may trigger diagnostic tools which will walk the user through self-diagnosing the problem.

Publisher 112 may be platform and browser independent. For example, the plug-in may be packaged as an ActiveX component for Internet Explore, a Netscape Plug-in API, or a browser plug-in for non IE browsers. However the plug-in is packaged, it may be bundled in a single archive, allowing a quick and automatic installation the first time a user attempts a file upload. As part of the installation process, the component will check for software such as QuickTime or Direct-Show, needed components and/or filters and/or of said software, and/or other software components on the system, and will download them and install them if necessary. Platform independence may be made through different graphics libraries such as Direct Show on Windows (which may be extendable through adding filters), or QuickTime on Macintosh (which may be extendable by adding custom components). Extendibility may allow support for importing and exporting additional file types and integrating with additional cameras and other video devices. This may allow on-going support for new file types, codecs, and devices as they enter usage.

In embodiments, publisher 112 may be downloaded from an application server. Publisher 112 may consist of one or more separate libraries of dynamically linked code, henceforth called modules. The publisher 112 may utilize two main modules, (1) the publisher 112 itself and (2) an Updater module. Other modules may be the QT Decoder Component Module which may add support for reading a specific file type or codec on a Macintosh, DirectShow Decoder Filter Module which may add support for reading a specific file type or codec on Windows, QT Encoder Component Module which may add support for writing a specific file type or codec on a Macintosh, DirectShow Encoder Module which may add support for writing a specific file type or codec on Windows, Macintosh Device Reader Module which may add support for reading from a specific device on a Macintosh, and Device Reader Module which may add support for reading from a specific device on Windows. The addition of modules like these may allow the extending of functionality to new file types, codecs and devices without requiring any updates to the core software by simply plugging in the appropriate module.

Publisher 112 may provide control of the browser plug-in parameters such as appearance and functionality parameters. Examples of parameters that may be controlled include a Client ID, Db ID content delivery network 124 control parameters, authorization parameters, file selector, and other parameters. A client ID may be given to each client and provided actions such as billing and authorization. A Db ID may be an ID number that the client may assign to each video, and that may be used to link to the video once it is uploaded. A content delivery network 124 control parameter may be used by a client to control how long a video stays on the content delivery network 124 and what to do when it expires. A content delivery network 124 control parameter may also be used to control the appearance and feature customization which the client may use to control the appearance of the publisher, such as background color, icons, and brandings, and the publisher's functionality, such as whether a title frame should be uploaded. Authorization parameters may provide additional data to ensure that the upload originated from an authorized client and that no parameters have been changed between when the client sent them and when the application server 120 received them. A file selector may select a video file from the hard disk by dragging and dropping it on a designated 'drop zone', or by clicking a 'browse' button and using a standard system file chooser to locate a file.

In embodiments, publisher 112 may provide security against the following attacks: (1) Use of the decoder or encoder modules for personal use outside of the publisher. This may be prevented by a security mechanism built into each module which ensures that only the publisher 112 is calling it. (2) Use of the product without paying. This may be prevented by requiring authorization with the content delivery network 124 prior to transcoding the FLV, so a user can only encode an FLV if they can authorize with the content delivery network 124. (3) Breaking into the internal system back-end. This may be prevented by having all internal applications and databases use standard SSL encryption to prevent external access form unauthorized users. (4) Attack from other computers. This may be prevented by distributing modules as a signed code, allowing the user to determine that all modules originated from VideoEgg and are unmodified. Additionally, the publisher 112 may check the signatures of all modules when it is first loaded.

In embodiments, the publisher 112 may be delivered as a plug-in browser extension which adds encoding, editing, and upload capabilities to a standard Internet browser. The publisher 112 may be packaged, for example, as an ActiveX component for Internet Explorer, or a browser plug-in for non-IE browsers. In either form, it may be bundled in a single archive, allowing a quick and automatic installation the first time a user attempts a file upload. As part of the installation process, the component will check for software such as QuickTime, DirectShow, needed components and/or filters and/or of said software, and/or other software components on the system, and will download them and install them if necessary.

For example, when the user selects a file, the publisher 112 may attempt to read the media using QuickTime and/or DirectShow. If QuickTime and/or DirectShow cannot read the file, the publisher 112 contacts a server to request a QuickTime extension module and/or DirectShow filter module. These modules are components that extend the QuickTime and/or DirectShow architectures to provide support for additional file formats and codecs. If an appropriate module cannot be located, the failure is logged so that VideoEgg can implement an appropriate extension module and/or DirectShow filter. In embodiments, the user is directed to help content which walks him or her through converting the file to an accepted format.

In embodiments, the media file may then be transcoded by another custom-written QuickTime extension, standard QuickTime extension, custom DirectShow filter module, standard DirectShow filter module and/or other software extension or module, into a media file or set of media files for various bandwidths. The transcoding may use, for example, a format based on the new H.264 standard or an advanced implementation of MPEG-4 using a custom encoder and player to provide sufficient flexibility to vary this format as more advanced codecs and formats are developed. In embodiments, the publisher 112 may authenticate itself with the content servers and/or other servers using an MD5 hash, based on a shared secret, and/or other authentication scheme, and uploads the files.

In embodiments, the publisher 112 may be a browser plug-in which provides a user interface for obtaining a video, transcoding it for streaming and uploading it. The video may come from a number of sources including a file, digital camera 102A, webcam/video capture card 102E, email, MMS, SMS, IM, DVD, converted analog storage files, CD, VCD, video enabled digital cameras 102A and other such video recording, playback, editing and/or storage facilities. In embodiments, a video file may be selected from the hard disk by dragging and dropping it on a designated "drop zone", or clicking a "Browse" button and using a standard system file chooser to locate a file. In embodiments, the publisher 112 may capture directly from digital video cameras 102B, either capturing the live feed from the camera, or reading a stored video off a tape, for example. In the latter case, the publisher 112 may provide VCR/DVD-style controls that allow the user to queue up the tape. A "Start Capture" button may begin capturing video from the device, and a "Stop Capture" button may end the capture. A preview window may display the video feed from the device. In embodiments, start and stop capture buttons may control capture form these webcam 102E or other video devices. Since many devices do not provide integrated audio sources, the user may select an audio source from a dropdown list, and set audio record volume using a slider and an audio level meter. A preview window displays the live video stream. In embodiments, the publisher 112 may capture the video from email, MMS, SMS or other messaging systems or from a cell phone 102C. A user may upload a video via a video message from a video-enabled cell phone 102C. The user is provided with a unique numerical email, or other messaging code, or other address (e.g. 1234@videoegg.com) to send the video message to. Once the email is received, the publisher 112 may automatically download the video file from the mail server. In embodiments, the publisher 112 may be able to read videos directly from Video DVDs and VCDs, and other video storage formats. In embodiments, the publisher 112 may read video files from still cameras supporting video functionality.

Once a source video is selected, the user may be provided with editing tools. A video controller bar may provide sliders to set in and out points. Additional in and out points may be added using an eraser tool to crop segments from the middle of the video. As the sliders are moved, a video display may scrub through the video. The resulting video may cut directly from segment to segment. A user may also choose between a set of predefined transitions. Other editing tools may be provided, including tools that allow concatenation of multiple clips, addition and/or mixing of audio, production of slide shows (with or without audio) from still images, image alteration, image rotation, image translation, video and/or audio transitions, image compositing, and/or template-based editing.

In embodiments, from a user's point of view, the application may show a timeline with a start and end slider and a playhead indicating the current frame being displayed, as well as a preview screen where the video is displayed, and standard VCR or other video controls such as rewind, rewind to beginning, fast forward, play, pause, step to next frame, playback speed, and the like. A user may drag the start and end sliders along the timeline to determine at what point playback will begin and end. When the user moves a mouse over the timeline, the cursor may turn into an eraser icon with which the user can erase a section of the video by dragging over it, causing a new pair of sliders to appear indicating the start and end of the cut region. Like the start and end sliders, these new sliders may be configured to be dragged along the timeline to change their location, causing the video display to "scrub" along with the slider, showing the frame at the current position of the active slider. When the user plays the video back, the erased regions are not played, and the playhead may jump over erased regions of the timeline.

The editing tool may be realized in a number of platform-specific manners, but at a high-level, in certain embodiments, it can be described as follows. As a user drags a slider, the frame from the source video corresponding to the current slider position is displayed in the preview screen. When the user then starts playback by pushing the play, rewind, or fast forward button, the application may use the current sliders' positions to generate a video in memory that represents the source video with the selected edits. The current position in the edited video is set to the frame that corresponds to the frame in the source video currently being displayed, and then the edited video is played. As the video proceeds, the playhead may be continually positioned on the timeline at the location in the source video that corresponds to the matching frame in the edited video. In this way, the playhead may jump across the erased regions.

In QuickTime, this functionality may be realized by building a second QuickTime Movie in memory to represent the edited video. In DirectShow, the edited video may be constructed by creating a new Timeline using DirectShow Editing Services.

After editing, the user may optionally select a title frame, again using a simple slider. The frame number may be recorded to be displayed in the player when the video is inactive. The publisher 112 may also export the title frame as a JPEG or other image and upload it separately to be used in the client site as a link to the full video. This functionality may be turned on and off by a client using HTML parameters for example.

The publisher 112 may transcode the edited video into a suitable format for streaming, progressive download, sequential feed or other suitable format, and may simultaneously or subsequently begin uploading the transcoded video to the content deliver network 124. During this process, the frame currently being encoded and uploaded may be displayed along with a progress bar. When the video is uploaded, it may be provided immediately for viewing by the VideoEgg player 128.

In embodiments, the publisher 112 may be written in C++ as a platform and browser independent implementation of the application. The publisher 112 may use a custom graphics library, which provides a thin wrapper to the underlying system graphics API. A simple ActiveX or Netscape plug-in may instantiate the publisher 112 and pass system events such as paint calls and mouse events to the publisher 112 for handling. In this way, the same publisher 112 code base can run in Internet Explorer using ActiveX and other browsers using the Netscape Plug-in API simply by providing the two different wrappers to the same core code. Likewise, the publisher 112 may run on Windows machines and Macintosh machines simply by providing two different implementations of the graphics library.

In embodiments, the plug-in may use a custom-written media library to handle video capture, transcoding, video editing, media display and system device interaction. The media library provides a thin wrapper to DirectShow on Windows machines, and QuickTime on Macintosh machines. Both DirectShow and QuickTime are extendable, DirectShow by adding custom filters and QuickTime with custom components, to add support for importing and exporting additional file type and integrating with additional cameras and devices. VideoEgg may use a suitable extensibility mechanism to continually add support for new file types, codecs, and devices.

The publisher 112 may call one or more separate libraries of dynamically linked code, henceforth called modules. The publisher 112 may use two core modules, the publisher 112 itself and an updater module which is responsible for updating the publisher 112 module. The software architecture may also allow for additional core or supplemental modules to accommodate new product releases (through module updates) or enhancements (through additional modules).

In addition, in embodiments, the publisher's 112 capabilities may be extended by adding extra modules, for example modules of the following types: QT Decoder Component Module that adds support for reading a specific file type or codec on a Macintosh; DirectShow Decoder Filter Module that adds support for reading a specific file type or codec on Windows; QT Encoder Component Module that adds support for writing a specific file type or codec on a Macintosh; DirectShow Encoder Module that adds support for writing a specific file type or codec on Windows; Macintosh Device Reader Module that adds support for reading from a specific device on a Macintosh; Windows Device Reader Module that adds support for reading from a specific device on Windows. These additional functionalities may allow the platform to extend its functionality to new file types, codecs and devices without requiring any updates to the core software by simply plugging in the appropriate module.

In embodiments, methods and systems may provide the ability to capture videos directly from a cell phone to the publisher 112. To accomplish this, the publisher 112 may provide the user with a unique automatically generated email address, e.g. 12934@videoegg.com, or other address. The end user may send a video message to this address, where an SMTP server, and/or other configuration of server, will receive the message, parse out the video file, and store it. This server will also store the association between the id number (12934) and the path on the server of the stored video file.

The publisher 112 may continually poll a CGI script on the server, passing the id number as a request parameter (e.g. www.videoegg.com/checkForVideo.cgi?id=12934). The CGI script may return 404 responses until the file is stored by the server, at which point the script may use the id number to locate the video, send the video to the user, and delete the video file off the server. At this point, the file may be stored on the local machine and can be edited, transcoded, and uploaded to the VideoEgg using the normal process.

Additionally, in embodiments, methods and systems may provide the ability to capture videos directly from a cell phone to the publisher 112. To accomplish this, the publisher 112 will provide the user with an address, e.g. video partner.com or, or other address. The end user will send a video message to an email address, or other address (e.g. video@partner.com or 12345) where an SMTP server, and/or other configuration of server, will receive the message, parse out the video file, and store it. Meta-data associated with the video, which may include the telephone number of the sending phone, the email address of the sender, information entered into the text field of the message and/or other information, will be used to index the video for retrieval, either directly as a part of the path name or by associating the video with an appropriate and unique identifying code.

The publisher 112 may continually poll a CGI script on the server, passing the meta-data or identifying code as a request parameter (e.g. www.videoegg.com/checkForVideo.cgi?id=user21312mov36912). The CGI script may return 404 responses until the file is stored by the server, at which point the script may use the id number to locate the video, send the video to the user, and delete the video file off the server. At this point, the file may be stored on the local machine and can be edited, transcoded, and uploaded to the publisher 112 using processes disclosed herein.

In embodiments, the client controls the appearance and functionality of the publisher 112 by passing the publisher 112 data via HTML parameters or other applicable parameters. Each client may be given an ID number which is used for billing and authorization. The client may assign each video an ID number, which it uses to later link to the uploaded video. The client passes a set of parameters which control how long a video should stay on the content delivery network 124 and what to do when it expires. The client may control the appearance of the publisher 112, such as background color, icons, and brandings, and the publisher's 112 functionality, such as whether a title frame should be uploaded. Additional data may be sent to ensure that the upload originated from an authorized client and that no parameters have been changed between when the client sends them and when they are received by a servicing host.

In embodiments, as part of the publisher 112 parameters, the client passes data to the publisher 112 which specifies the terms of the upload, such as how long a file should remain on the content delivery network 124 and what to do when it expires. The exact contents of these parameters will differ from client to client, but may generally include one or more of the following: limit type: determines how the video file will expire; unlimited: the video will never expire; time limited: the video will expire after L days; view limited: the video will expire after L views; bandwidth limited: the video will expire after L bytes of download; limit parameter: L in above formulation, ignored for unlimited downloads; warning parameter: W<L indicating when a warning of a pending expiration should be sent, ignored for unlimited downloads; ceiling: maximum bandwidth allowed before the video is blocked, used for unlimited downloads and time limited downloads to prevent virals; expiration action: the action to take upon expiration; block until reauthorized; delete; notify user (specify user email address and user message); notify client (specify client callback address and format); warning action: the action to take upon warnings; notify user; notify client; and group: an optional group id chosen by the client which specifies a group of files which all share content delivery network 124 control parameters, allowing limits to be set on a group of files rather than individual files.

The publisher 112 may upload the content delivery network 124 control data to the content deliver network 124 along with the video file. The application server 120 may periodically collect this data and parse it into a database. A regular process examines the content delivery networks 124 logs for videos that have reached their warning or limit thresholds and takes appropriate actions.

A client may change the content delivery network 124 control data associated with a video or group by sending a new set of content delivery network 124 control parameters directly to the application server 120 as an HTTP request, where it gets logged and then stored to the database. This mechanism may be used to immediately deactivate a file, or to reauthorize a file that is about to or has already expired.

In embodiments, an authorized client may be the only one permitted to use the publisher 112 to upload video files to the content deliver network 124, and the correct client may be required to be associated with each video file to ensure that the right client is billed for the upload. This may be handled with a set of authorization data that is sent as part of the publisher 112 parameters such as a user IP (the IP address of the user that will be running the publisher 112) and/or a timestamp (e.g. a current time).

In embodiments, the publisher 112 parameters may be encoded with a secret key known only to a hosting service and the client. The publisher 112 may send this data along with an unencoded client ID to the content delivery network 124 as part of the content delivery network authorization process. In one embodiment, the content delivery network may then decode the parameters using its own copy of the secret key for the given client, then checks to make sure that the upload is coming from the correct IP address and that the timestamp is recent. This may ensure that the request originated from the client, since the parameters could only have been encoded using the client's copy of the secret key, and ensures that none of the publisher 112 parameters have been changed, since they cannot be decoded without the secret key. A number of other security and encryption techniques having various degrees of reliability and security are known, and may be used instead of, or in combination with, the techniques described herein.

In embodiments, the publisher 112 may provide support for new devices, file types and codecs without requiring a new release of the core product. In addition, the publisher 112 may supply informative error messages and diagnostic tools in the event of an incompatibility that help a user diagnose and work around the issue. This error handling may be continuously updated to provide better and more specific messages and solutions. In embodiments, this functionality may be provided by a separate updater module which keeps the publisher 112 up to date with the latest modules and error handling. When the publisher 112 is loaded, it may first check the application server for a new version of the updater module. If a new version is available, it may be downloaded via HTTP, FTP, or some other file or content transfer protocol, and installed. The publisher 112 may use the updater to keep itself up to date with the latest modules and functionality. The publisher 112 may, for example, perform the following queries on the updater. Given the current installed modules, an inquiry may be made pertaining to any actions that should be taken. This query may be performed immediately after the publisher 112 loads to update to the latest version of the product. Given a specific device or file and the current installed modules, an inquiry may be made pertaining to any actions that should be taken. This query may be performed after the source file and/or device is selected. This may allow certain updates to be performed when they are required for a specific device or file type. Given a specific device or file and the current installed modules, an inquiry may be made pertaining to any known issues and what actions should be taken as a result. This may allow the publisher 112 to anticipate known problems and take appropriate actions. Given a specific error, an inquiry may be made pertaining to what is the appropriate action to be performed. In embodiments, the updater may respond to any one of the inquiries by taking actions including one or more of the following: install or update a new module; install or update an external dependency such as QuickTime or DirectX; display an error message; run a diagnostic tool which walks the user through fixing the problem or other appropriate action.

In embodiments, when the updater is loaded, it may download a binary data file from the application servers. This file may contain data on all versions of each module including module dependencies, external dependencies such as Quick-Time and DirectX, and known errors in modules, all supported devices and file types and the required modules to support them, and error messages for known issues. The publisher 112 may parse this data and uses it to perform the above actions.

In embodiments, logs may be provided. For example, logs may be provided in the following scenarios. A log may be provided when the system reports a successful transcode and upload; when the system reports an unsupported device or file, used to prioritize when new devices or files should be supported and/or when the system reports usage that should have worked and didn't, which might be used to determine when bugs need fixing as well. Logs may include the following data: machine data: OS, processor, etc.; installed modules; file/device data: indicating what was the user trying to do; type: success report, known error report, unknown error report; and/or error data which may only be relevant for errors or unknown errors. In embodiments, the log may be uploaded to the application server 120 as a binary request parameter, where it will be recorded into the HTTP server logs. These logs may then be periodically parsed and loaded into a database by the VideoEgg application server 120.

A video enabled recording/storage device 102 may be an electronic device designed to record and/or store video images. The video enabled recording/storage device 102 may provide an electro-optical system for the imaging of scenes onto a focal plane optical sensor. The video enabled recording/storage device 102 may record images as an analog signal and subsequently convert the image to digital data, or record the images directly as digital data. The video enabled recording/storage device 102 may have local data storage, I/O ports for portable memory devices, and/or I/O ports for the transmission of digital data files to other devices. A video enabled recording/storage device 102 may be a stand-alone device or be an integral function within another device such as a browser-enabled video manipulation and posting facility. Examples of video enabled recording/storage devices 102 may include, but are not limited to, a digital camera 102A, digital video camera 102B, cell phone 102C, DVD 102D recorder, webcam/videocapture 102E device, or the like.

In embodiments, player 128 may be an embedded browser plug-in, web-based player, client based player or other software component adapted to playback a video segment according to the present invention. A plug-in is a program that may interact with another program to provide certain functions. The player 128 browser plug-in may be downloaded from an application server 120 by a user who may want to play back a video file that may have been previously stored on the network 118. The player 128 may function to retrieve video files from a content deliver network 124 for the viewing or storage of video files. The player's 128 user interface may provide video display and control with standard VCR/DVR-type controls. Examples of these controls may be play, stop, pause, rewind, fast-forward, and loop. Playback of video may utilize available web video players such as a Java-based player or a Flash-based player. For example, the player may be deployed as a small Macromedia Flash SWF file which downloads and plays a Flash FLV file. Flash 6 and 7 FLV and Srenson H.263 code may be taken from the open source libavodec library. MP3 encoder code may be taken from the open source LAME project. Newer versions of player (e.g. Flash 8) may be added to existing products through module updates. Other solutions such as Windows media and Quick-Time may also be utilized.

The player 128 may interface with a variety of video enabled playback devices for display of the downloaded or stored video files. Examples of video enabled playback devices include, but is not limited to, a digital video camera 132B, digital video-enabled still camera 132A, video-enabled cellular phones 132C, PDA's 132D, cell phones 132C, pocket pc's, and notebooks. The player 128 may also display the downloaded video file on the browser enabled processor platform 104 through its resident display device, or stored in the browser enabled processor platform 104 in its hardware memory facility.

A video enabled playback device 132 may be an electronic device for the playback and viewing of digital video files. The video enabled playback device 132 may have an interface(s) for the transfer of video files to the device, local data storage for file retention, and a display for viewing the video file. A video enabled playback device 132 may be a stand-alone device or be an integral function with another device such as a browser-enabled video manipulation and posting facility. Examples of video enabled playback device 132 may include a digital camera 132A, digital video camera 132B, cell phone 132C, PDA 132D, other video display facility 132E, or the like.

An application server 120 is a server computer in a computer network 118 dedicated to running certain software applications. The term may also refer to the software installed on such a computer to facilitate the serving (running) of other applications. The application server 120 may host a central website, provide control of data flow and management to/from the content deliver network 124, maintain the executable code for the browser plugins publisher 112 and player 128, provide authorization for use of the system, provide for automatic updates of executable software and source technology formats, and or provide logging of data use.

The application server's 120 central website may provide for a service provider's homepage and client account management. The homepage may provide information and advertisement for a service provider's product, product demonstrations, and contact information. The central website 122 may also support client account management. Examples of functions for the management of client accounts may include the creation and monitoring of accounts, maintenance of detailed usage reports, maintenance of user's control parameters, and billing.

The application server 120 may provide central control and management of data usage across the content deliver network 124. The application server 120 may coordinate uploads from publisher 112 and downloads to player 128. The application may provide database management for the files on the content deliver network 124. The following are some types of database controls that may be utilized. Limit type: determines how the video file may expire such as: unlimited—the video will never expire, time limited—the video will expire after L days, view limited—the video will expire after L views, and bandwidth limited—the video will expire after L bytes of download. Ceiling: maximum bandwidth allowed before the video is blocked, may be used for unlimited downloads and time limited downloads to prevent virals. Expiration action: the action to take upon expiration, such as block until reauthorized, delete, notify user, and notify client. Warning action: the action taken upon warnings, such as notify user or notify client. Group: an optional group ID chosen by the client that specifies a group of files which all share content delivery network 124 control parameters, allowing limits to be set on a group of files rather than individual files.

The application server 120 may include a function for authorization. An authorized client may be the only one permitted to use the publisher 112 to upload video files to the content delivery network 124, and the correct client may be associated with each video file to ensure that the right client is billed for the uploads. This may be handled with a set of authorization data sent as part of the publisher 112 parameters such as User IP, which is the IP address of the user that will be running the publisher 112, and timestamp: the current time.

The application server 120 may provide logging of data for reporting. Examples of logging reports are: Success report: reports a successful transcode and upload; known error report: reports an unsupported device of file, used to prioritize when new devices or files should be supported, and; unknown error report: reports usage that should have worked but didn't, used to determine when bugs need fixing. Data included in reports may include machine data (e.g., OS, processor, etc.), installed modules, file/device data (what was the user trying to do), type of report such as success report, known error report, unknown error report, error data—only relevant for unknown errors. Reports may also include metrics, such as limit threshold warnings, and invoicing for final billing to the client.

In embodiments, the application server(s) 120 may include various server-side functionalities. For example, the application server 120 may provide a static website which presents its technologies to potential clients; provide a dynamic, database driven secure web site which allows clients to create and monitor accounts, with detailed usage reporting; provide a utility that may collect content delivery network 124 control data and record it in a central database, monitor traffic to the content delivery network 124 and enforce any policies set in the control data; provide the latest version of all modules along with the control data used by the updater module to perform upgrades; it may collect success and error logs, and an internal utility may parse the web servers logs and records data to an internal database; and/or it may use data collected from the content delivery network 124 to generate client bills and custom reports.

In embodiments, the application servers may interact with the publisher 112 through an HTTP server serving static files. These files can be served directly off the content delivery network 124, allowing the system to scale without limitation, except for any limitations of the content delivery network 124 itself.

A content deliver network 124 may be a system of computers networked together across the Internet that cooperate to deliver content (especially large media content) to end users. content delivery network 124 nodes may be deployed in multiple locations, often over multiple backbones. These nodes may cooperate with each other to satisfy requests for content by end users, moving content behind the scenes to optimize the delivery process. Optimization may take the form of reducing bandwidth costs, improving end-user performance, or both. The number of nodes and servers making up a content delivery network 124 may vary, depending on the architecture, some reaching thousands of nodes with tens of thousands of servers. Requests for content may be intelligently directed to nodes that are optimal in some way. When optimizing for performance, locations that can serve content quickly to the user may be chosen. This may be measured by choosing locations that are the fewest hops or fewest number of network seconds away from the requestor, so as to optimize delivery across local networks 118. When optimizing for cost, locations that may be less expensive to serve from may be preferentially chosen. Often these two goals are aligned, as servers that are close to the end user may have low serving costs, perhaps because they are located within the same network as the end user.

A service provider may utilized existing content deliver network 124s that may be already set up to support high-traffic, large-scale uploads and downloads. Various methods for upload and download may be utilized such as streaming, progressive downloading, RTP-based streaming, or sequential feed. Examples of functions that may be adapted for use in a content deliver network 124 include, but are not limited to, the following: Upload demand: most content delivery networks 124 are currently set up to handle a central upload of a library of video files which are then distributed to various servers for optimized download. It may be preferred to support a large number of concurrent uploads. Server software may be optimized for this type of traffic and load balancing may be provided for upload servers to support this traffic. Authorization: Instead of the standard preset username and password authorization system, a system may employ a programmatic check as described in the authorization section as described herein. This may be implemented through modifications to standard ftp and http servers. Protected content: To support allowing playback only from within the client's site, content on the content delivery network 124 must be protected. Most content delivery networks 124 already implement an appropriate form of shared key/hash code protection, in which the client site generates a dated one-time use password using a shared key, which is passed as a URL parameter to the content delivery network 124. Scripts and logging: may require direct, programmatic access to the content delivery network 124 origin servers for tasks such as removing expired videos and collecting content delivery network 124 control data, and may require access to logs for monitoring traffic.

In embodiments, methods and systems may use content delivery networks 124 that are set up to support high-traffic download. In embodiments the content deliver network 124 may use progressive download techniques. In other embodiments, the content deliver network 124 may use RTP-based streaming or other streaming technique. In embodiments, the content deliver network 124 may include one or more of the following features. It may include an upload demand feature. Most content delivery networks 124 are currently set up to handle a central upload of a library of video files which are then distributed to various servers for optimized download. In embodiments, it may be preferred to support a large number of concurrent uploads. The server software may be optimized with an upload demand feature for this type of traffic and load balancing may be provided for upload servers to support this traffic. In embodiments, the content deliver network 124 may employ a programmatic check as described in connection with authorization herein. This may be implemented through modifications to standard FTP and HTTP servers. In embodiments, the content deliver network 124 may support allowing playback only from within the client's site to protect the content on the content delivery network 124. In embodiments, the content deliver network 124 may require direct, programmatic access to the content delivery networks 124 origin servers for tasks such as removing expired videos and collecting content delivery network 124 control data, and may require access to logs for monitoring traffic.

A computer network 118 may be a system for communicating between computing devices. These networks 118 may be fixed (e.g., cabled or permanent) or temporary (e.g., via modems or null modems) and generally involve the use of a telecommunications system. Examples of computer networks 118 may be the Local Area Network (LAN), Wide Area Network (WAN), Personal Area Network (PAN), intranets, extranets, or other networks. Networks may operate as client-server, where many client computers are making requests of the server, peer-to-peer, where each computer acts as both a client and a server or other useful configurations. Networks 118 may have different interconnection topologies such as a Bus Network, Star Network, Ring Network, Mesh Network, a Star-Bus Network or other topologies. Networks may have specialized functions such as a Storage Area Network, Server Farms, Process Control Networks, or Wireless Community Network.

In embodiments, the publisher 112 may include a video editing platform. In this embodiment, a video clip may be viewed within a graphic user interface and the graphic user interface may include an editing bar. The editing bar may include a representation of the progress of the video playback including a percentage complete indication. The editing bar may include a begin interface that appears as a slide mechanism to allow a user to slide to where he wants the video to begin in the finished video. Likewise the edit bar may include a stop interface to allow the user to define, by sliding an icon, where the video should end. The editing interface may also be provided with an eraser feature that allows the user to erase portions of the video segment. Once a segment has been edited, the system may paste the remaining sections of the video clip back together to form a continuous stream of video.

An aspect of the present invention relates to capturing video, editing the video and storing the video on a server for later retrieval. In embodiments, a browser plug-in or other embeddable software component may be adapted to perform many of such functions. Embodiments may involve the providing a self contained embeddable software component adapted to be deployed from a server application where the self contained embedded software component may be further adapted to capture a video file and where the self contained embedded software component may be further adapted with a user interface to facilitate editing the video file. The adaptation to be deployed may be an adaptation to be delivered. The software component may be adapted to embed in a browser application.

The software component may be adapted to be embedded in a browser application from a server application. The server application may be an auction site, an on-line e-commerce site, a real-estate site, a travel site, a journal site, a blog, a classified advertisement site, a personal advertisement site, or other server application. The classified advertisement site may contain a real estate advertisement site, an automotive advertisement site, a boat advertisement site, an apartment advertisement site, an employment advertisement site, or the like. The server application may include an advertisement and the self contained embeddable software component may be associated with the advertisement.

The embedded software component may be further adapted to capture video from a client source. The client source may contain a mobile computing facility, laptop computing facility, personal digital assistant, phone, cell phone, mobile phone, desktop computing facility, or the like. The client source may capture the video from a file, camcorder, webcam, mobile device, video capture card, TV tuner, flash memory, DVD, VCD, TiVo, digital cable TV source, streaming video file, on-line TV, on-line video, mobile phone, personal digital assistant, or the like.

The user interface may be further adapted to edit the video in real-time or edit a portion of the video, where the portion may be the start time of the video, the end time of the video, or a midpoint of the video. The user interface may be further adapted to provide transitions between scenes, where the transitions may be applied to the beginning, the end of a video segment, or other part in the video.

The video file may be a file containing a plurality of images, where the images may be sequentially arranged. The video file may further contain audio information.

The user interface may contain an API adapted to facilitate user communications.

An aspect of the present invention relates to editing video through a server application. Embodiments involve providing a self contained embeddable software component adapted to be deployed from a server application where the self contained embedded software component may be adapted with a user interface to facilitate editing the video file. The adaptation to be deployed may be an adaptation to be delivered. The self contained embeddable software component may be further adapted to be embedded in a browser application.

The self contained embeddable software component may be further adapted to be embedded in a browser application from a server application. The server application may be an auction site, an on-line e-commerce site, a real-estate site, a travel site, a journal site, a blog, a classified advertisement site, a personal advertisement site, or other server application. The classified advertisement site may be a real estate advertisement site, an automotive advertisement site, a boat advertisement site, an apartment advertisement site, an employment advertisement site, or the like. The server application may include an advertisement and the self contained embeddable software component may be associated with the advertisement The embedded software component may be further adapted to capture video from a client source. The client source may be a mobile computing facility, laptop computing facility, personal digital assistant, phone, cell phone, mobile phone, desktop computing facility, or the like. The client source may capture the video from a file, camcorder, webcam, mobile device, video capture card, TV tuner, flash memory, DVD, VCD, TiVo, digital cable TV source, streaming video file, on-line TV, on-line video, mobile phone, personal digital assistant, or the like.

The user interface may be further adapted to edit the video in real-time or a portion of the video, where the portion may be the start time of the video, the end time of the video, or a midpoint of the video. The user interface may be further adapted to provide transitions between scenes, where the transitions may be applied to the beginning, the end of a video segment, or other point in the video.

The video file may be a file containing a plurality of images, where the images may be sequentially arranged. The video file may further contain audio information.

The user interface may contain an API adapted to facilitate user communications.

An aspect of the present invention relates to capturing video from a source other than just a web cam and transferring the video to a server application. Embodiments involve providing a self contained embeddable software component adapted to be deployed from a server application where the self contained embedded software component may be adapted to capture a video file from at least one of a video camera, camcorder, DVD, VCD, memory, cell phone video facility, portable phone video facility, digital video camera, flash memory, TV, digital TV, digital TV tuner, digital TV recorder, satellite TV tuner, satellite TV recorder, or other such device. The adaptation to be deployed may be an adaptation to be delivered. The self contained embeddable software component may be further adapted to be embedded in a browser application.

The self contained embeddable software component may be further adapted to be embedded in a browser application from a server application. The server application may be an auction site, an on-line e-commerce site, a real-estate site, a travel site, a journal site, a blog, a classified advertisement site, a personal advertisement site, a real estate advertisement site, an automotive advertisement site, a boat advertisement site, an apartment advertisement site, an employment advertisement site, or other server application. The server application may include an advertisement and the self contained embeddable software component may be associated with the advertisement.

The embeddable software may be further adapted with a user interface to facilitate editing the video file. The user interface may be further adapted to edit the video in real-time or a portion of the video, where the portion may be the start time of the video, the end time of the video, or a midpoint of the video. The user interface may be further adapted to provide transitions between scenes, where the transitions may be applied to the beginning, the end of a video segment, or other point in the video.

The user interface comprises an API adapted to facilitate user communications.

The video file may be a file containing a plurality of images, where the images may be sequentially arranged. The video file may further contain audio information.

An aspect of the present invention relates to uploading videos to a server or other target through the web, facilitated by a mobile phone. Uploading videos to the web with a mobile phone may be accomplished in several ways and may be performed using any of the devices or methods described herein.

In an embodiment, the system may receive a video; the system may assign the video a pin number that may consist of database identifier information plus at least four random digits to assure that valid pin numbers are difficult to guess. The system may store the video with the pin number, an incoming phone number, a host site that may be determined by the address the video was received at (e.g. ebay@videoegg.com), a time received (e.g. GMT), the message subject (if present), and the message body (if present).

The server may send a confirmation SMS response to the user with a host site specific message that may contain the pin number and optional extra fields. For example, eBay may be able to set a custom SMS response, such as "We received a video at <time> and its pin number is <pin>", where the <time> and <pin> fields may be replaced with the appropriate values.

The publisher 112 plug-in may then request the video by its pin number by making an HTTP GET request and may pass the pin number as a parameter or in an URL. The publisher 112 may need to store the video with the correct extension (e.g., 0.3gp, 0.3gp2 etc) so that it may be played back correctly. The video storage may be implemented using at least two methods as follows.

A: In embodiments the publisher, or other such software component, may make a first request using the pin number that may return the URL where the video can be downloaded, this may contain the correct file extension. The publisher 112 may then make a second request to that URL and may store the video file locally using the video filename on the server.

For example, the publisher 112 may request http://mms-.videoegg.com/getVideo?pin=978237, the actual URL could be as described above. The server may respond with a single line of text such as "http://mms.videoegg.com/videos/tempvideo1234.3gp". The publisher 112 may then request http://mms.videoegg.com/videos/tempvideo1234.3gp and may store it locally as tempvideo1234.3gp.

B: In embodiments the publisher, or other software component may make one request using the pin number that may return the video content and may set a header indicating the content type, using either the MIMEType where the publisher 112 then maps that to an extension, or a custom header indicating the extension.

For example, the publisher 112 may request http://mms-.videoegg.com/getVideo?pin=978237 and the server may respond with the video and sets the mimetype to video/3gp. The publisher 112 may store the response locally as video.3gp, having mapped video/3gp to the 0.3gp extension.

Each host site may set an expiration time in days as a configuration variable. For example, each night a maintenance script may delete any video whose time received date may be more than X days before the current date, where X is the expiration time associated with the video's host site.

Another uploading method may be Insta-post. If configured to do so, a certain host site may have its videos posted directly to the web rather than loaded by the publisher. In an example for site X, a video may be received at X@videoegg.com, the publisher 112 may store the database values as discussed above, transcode the stored video to an alternative format using a command line function provided, then POST the video and database information to an address specified in X's configuration using a data format specified in X's configuration.

Another uploading method may be Pin recovery. A user may be able to go to a web site and make a request containing his or her phone number, an optional host site ID, and an optional number of days D. In response, the server may send an SMS message to that phone number containing all the videos received from that phone number from that host site (if specified, otherwise all) within D days (if specified, otherwise all unexpired videos).

Another uploading method may be Index based delivery. The publisher 112 may request an index of all videos for a given pin and may return a list of videos, timestamps, subjects and URLs. The publisher 112 may then select a video and download it at the right URL.

An aspect of the present invention relates to controlling a video source through an embedded software application. Embodiments may involve providing a self contained embeddable software component adapted to be deployed from a server application where the self contained embedded software component may be adapted to capture a video file from a video source and may control at least one aspect of the video source. The adaptation to be deployed may be an adaptation to be delivered. The self contained embeddable software component may be further adapted to be embedded in a browser application. The self contained embeddable software component may be further adapted to be embedded in a browser application from a server application.

The video source may be a local source, where the local source may be proximate to a computer operating the self contained embeddable software component.

The video source may be a generic video source, where one aspect may be a playback control feature. The playback control feature may be a fast-forward feature, a rewind feature, a pause feature, stop feature, a record feature, an on/off feature, a rate feature, a transmission feature, or other playback control feature. The video source may be a video camera, camcorder, DVD, VCD, memory, cell phone video facility, portable phone video facility, digital video camera, flash memory, TV, digital TV, digital TV tuner, digital TV recorder, satellite TV tuner, satellite TV recorder, or the like.

The server application may be an auction site, such as an on-line e-commerce site, a real-estate site, a travel site, a journal site, a blog, a classified advertisement site, a personal advertisement site, a real estate advertisement site, an automotive advertisement site, a boat advertisement site, an apartment advertisement site, an employment advertisement site, or the like. The server application may include an advertisement and the self contained embeddable software component may be associated with the advertisement.

The embeddable software may be further adapted with a user interface to facilitate editing the video file. The user interface may be further adapted to edit the video in real-time or a portion of the video, where the portion is the start time of the video, the end time of the video, or a midpoint of the video. The user interface may be further adapted to provide transitions between scenes, where the transitions may be applied at the beginning, the end of a video segment, or other point in the video.

The user interface may contain an API adapted to facilitate user communications.

The video file may be a file containing a plurality of images, where the images may be sequentially arranged. The video file may further contain audio information.

An aspect of the present invention relates to capturing a video file and converting the file format. Embodiments may involve providing a self contained embeddable software component adapted to be deployed from a server application where the self contained embedded software component may be adapted to capture a video file and convert the file format to a different file format. The different format may be a streaming format or a progressive download format. The adaptation to be deployed may be an adaptation to be delivered. The self contained embeddable software component may be further adapted to be embedded in a browser application. The self contained embeddable software component may be further adapted to be embedded in a browser application from a server application.

The self contained embedded software component may be adapted to capture the video file from a video camera, camcorder, DVD, VCD, memory, cell phone video facility, portable phone video facility, digital video camera, flash memory, TV, digital TV, digital TV tuner, digital TV recorder, satellite TV tuner, satellite TV recorder, or other such device.

The self contained embedded software component may be adapted to dynamically update information relating to the file conversion. The updated information may be a new file converter. The process of dynamically updating the information may involve searching for a converter that is compatible with the video file, where the search may be performed at least in part on the Internet. The conversion may be accomplished through the use of a transcoder or an encoder.

An aspect of the present invention relates to sending a video file from a mobile communication facility. Embodiments may involve sending a video file from a mobile communication facility to an email address, where the email address may be associated with a server application and sending the mobile communication facility a message with a video ID number.

The method may also involve inputting the video ID number into a publisher, where the publisher 112 is operable on a client facility. The client facility may be a computer, laptop computer, desktop computer, PDA, or other such facility.

The method may also involve locating the video file on the server through the video ID number facilitated by publisher.

The message communicated to the mobile communication facility may be an SMS message, an email message, IM, or other such message.

The method may also involve downloading the video file onto a client.

The method may also involve presenting a video file in the publisher.

The method may also involve editing a video file.

The method may also involve encoding, and uploading a video file to a website.

Embodiments may involve providing a self contained embeddable software component adapted to be deployed from a server application wherein the self contained embedded software component may be adapted to receive a video file, communicating a calling code to a user, and transmitting a video file as directed by the calling code. The video file may be stored prior to the transmission. The adaptation to be deployed may be an adaptation to be delivered. The self contained embeddable software component may be further adapted to be embedded in a browser application. The self contained embeddable software component may be further adapted to be embedded in a browser application from a server application. The self contained embedded software component may be further adapted with a user interface to facilitate editing the video file.

The calling code may be a phone number, an SMS message identifier, or generated by an application associated with the server application, for example.

The video file may be transmitted by a portable phone, where the portable phone may be a cell phone, a mobile phone, or the like. The video file may be transmitted by a personal digital assistant.

The calling code may be used to facilitate communication of the video file to the server application, direct communication of the video file to the server application, or direct communication of the video file to a server other than the server containing the server application. The other server may be a video file storage repository or the like.

The server application may contain an auction site, an on-line e-commerce site, a real-estate site, a travel site, a journal site, a blog, a classified advertisement site, a personal advertisement site, a real estate advertisement site, an automotive advertisement site, a boat advertisement site, an apartment advertisement site, an employment advertisement site, or the like. The server application may include an advertisement and the self contained embeddable software component may be associated with the advertisement.

An aspect of the present invention relates to capturing and previewing video. Embodiments may involve providing a self contained embeddable software component adapted to be deployed from a server application where the self contained embedded software component may be adapted to capture a video file and where the self contained embedded software component is further adapted to present a preview of the video file to a user of the server application. The adaptation to be deployed may be an adaptation to be delivered. The self contained embeddable software component may be further adapted to be embedded in a browser application. The self contained embeddable software component may be further adapted to be embedded in a browser application from a server application.

The preview may include presentation of a frame of the video file, where the frame is a first frame, a last frame, or an intermediate frame. The preview may include presentation of a segment of the video file or an index of video segments included in the video file, for example.

The server application may be an auction site, an on-line e-commerce site, a real-estate site, a travel site, a journal site, a blog, a classified advertisement site, a personal advertisement site, a real estate advertisement site, an automotive advertisement site, a boat advertisement site, an apartment advertisement site, an employment advertisement site, or the like. The server application may include an advertisement and the self contained embeddable software component may be associated with the advertisement.

An aspect of the present invention relates to capturing video from two or more sources. Embodiments may involve providing a self contained embeddable software component adapted to be deployed from a server application where the self contained embedded software component may be adapted to provide source options and where the source options provide for the capture of a video file from at least two different types of sources. The adaptation to be deployed may be an adaptation to be delivered. The self contained embeddable software component may be further adapted to be embedded in a browser application. The self contained embeddable software component may be further adapted to be embedded in a browser application from a server application.

The two different types of sources may be selected from the list comprising a file, camcorder, webcam, mobile device, video capture card, TV tuner, flash memory, DVD, VCD, or other such device. The two different types of sources may be a file and a camcorder, a file and a webcam, a file and a mobile device, a file and a video capture card, a file and a TV tuner, a file and flash memory, a file and a DVD, a file and a VCD, a camcorder and a webcam, a camcorder and a mobile device, a camcorder and a video capture card, a camcorder and a TV tuner, a camcorder and flash memory, a camcorder and a DVD, a camcorder and a VCD, a webcam and a mobile device, a webcam and a video capture card, a webcam and a TV tuner, a webcam and flash memory, a webcam and a DVD, a webcam and a VCD, a video capture card and a TV tuner, a video capture card and flash memory, a video capture card and a DVD, a video capture card and a VCD, a TV tuner and flash memory, a TV tuner and a DVD, a TV tuner and a VCD, a flash memory and a DVD, a flash memory and a CVD, or a VCD and a DVD, for example.

The server application may contain an auction site, an on-line e-commerce site, a real-estate site, a travel site, a journal site, a blog, a classified advertisement site, a personal advertisement site, a real estate advertisement site, an automotive advertisement site, a boat advertisement site, an apartment advertisement site, an employment advertisement site, or the like. The server application may include an advertisement and the self contained embeddable software component may be associated with the advertisement.

An aspect of the present invention relates to importing, editing, and uploading video files. The self contained embedded software, that may be a browser plug-in, may be capable of importing, editing, and uploading video videos for multiple computer platforms (e.g., Apple and Windows). For example, the QuickTime and Directshow video formats may be manipulated. The importing, editing, and uploading of the QuickTime and Directshow video formats may be independent of the platform used.

The self contained embedded software may be able to import video by a drag-and-drop method of dragging the video file and dropping it into the publisher. After the video file is dropped into the publisher 112 the video file may be imported. The drag-and-drop importing method may be in addition to a file browsing method of file selection where the file is selected from a browse window for importing into the publisher. The publisher 112 may be a browser plug-in that may be able to transcode and upload video files.

The self contained embedded software editor may be able to edit on Apple, Linux, Windows, or other platforms. Additionally, the self contained embedded software may be able to edit and upload using such platforms as a browser plug-in. A unique feature of the self contained embedded editor may be the editing of video by highlighting portions of the entire video to be cut or remove from the video, therefore taking the whole video and cutting it down to a finished video. The editor may also provide a feature of previewing the finished video prior to the transcode and upload of the finished video.

The self contained embedded software publisher 112 may be able to upload video files from platforms using the QuickTime or Directshow file formats, for example. The uploading of the QuickTime and Directshow file formats may be independent of the platform used. The publisher 112 may be able to transcode and upload the video file in two or fewer clicks of a mouse or other pointing device to the content delivery network. The two or fewer clicks of the mouse or other pointing device may include the drag-and-drop method. The publisher 112 may be able to automatically insert the video file, of any supported format, into a webpage. The automatic inserting of the video file may not require any cutting and/or pasting of HTML code into the webpage in support of the video file.

An aspect of the present invention relates to wizard-based video manipulation. Embodiments may involve providing a self contained embeddable software component adapted to be deployed from a server application and providing a template adapted to guide a user's development of a video segment transition. The template may be a graphical template and the graphical template may include multimedia.

The adaptation to be deployed may be an adaptation to be delivered. The step of providing a template may involve providing a plurality of templates, where the plurality of templates may be provided as choices for the user.

The video file may include a tag associated with a video segment, where the tag may be an XML tag. The tag may be a plurality of tags, where the plurality of tags may be associated with a plurality of video segments.

The step of providing a template may involve providing a template through a series of steps, where the steps may be provided through a question and answer format.

The self contained embeddable software component may be further adapted to capture the video segment.

The self contained embeddable software component may be further adapted to edit the video segment.

An aspect of the present invention relates to playing, uploading, and encoding video. Embodiments may involve providing a browser plug-in adapted to simultaneously perform at least two functions associated with a video file wherein the at least two functions may be selected from a list containing playing, uploading, and encoding. The two functions may be playing and uploading, playing and encoding, or uploading and encoding.

An aspect of the present invention relates to preassigned metadata for video. Embodiments may involve uploading a video file to a server application where the uploaded video file may be associated with metadata prior to the upload. The metadata may be searchable. The video file may contain a plurality of video segments and each of the plurality of video segments may include searchable metadata.

An aspect of the present invention relates to browser-based video publisher 112 for media businesses. Embodiments may involve providing a self contained embeddable software component adapted to be deployed from a server application where the self contained embedded software component may be adapted to interact with the video file and use the embedded software component for an internal business process.

The interaction may be at least one of capturing, editing, transcoding, and uploading. The interaction may be capturing and editing, capturing and transcoding, capturing and uploading, editing and transcoding, editing and uploading, or transcoding and uploading.

The adaptation to be deployed may contain an adaptation to be delivered. The internal business process may be related to a media publishing business, a real estate business, a retail business, law enforcement, government business, a security business, corporate media management, training, meeting minutes, conference proceedings, or product demonstrations.

In embodiments, a person may want capture a video using a video enabled recording device 102 (e.g. a digital camcorder) and the person may want to post the video to a website (e.g. ebay.com). Once the person has captured the video he may connect the video enabled recording device 102 to his personal computing facility (e.g. a client laptop computer). Then the person may go to the website, such as ebay.com, and locate the page where items intended for auction can be added. The person may make an election to upload a video to be displayed during the auction and a webservice associated with the website may initiate an investigation of the person's personal computing facility to check for the existence of a properly loaded publisher 112. The investigation phase may be provided in a number of ways, including, for example, through an instruction provided from the intended posting site or other related site. If the publisher is found, the publisher, or associated software, may be checked for any proper updates. If updates are required or desired, the updates may be automatically downloaded from a related application server 120 to the person's personal computing facility. In the event the personal computing facility does not have a publisher 112 properly loaded, a new publisher may be downloaded from the application server 120 to the personal computing facility. The process of checking and updating and/or downloading of the publisher to the personal computing facility may all or in part happen automatically as a result of the person's election to add a video file to the web posting. Once the publisher is installed/updated/checked on the personal computing facility, the publisher may be initiated (following installation and association with a browser facility if necessary) to facilitate video capture, transcoding, editing, manipulation, uploading or other such functions as described herein in connection with the publisher 112. In embodiments, information may be associated with the uploaded file such that the correct player may be selected for viewing. In embodiments, the editing and transcoding of the video file from the captured format to a posted format may be completely locally on the user's client computing facility.

In embodiments, the downloading of the publisher 112, updating of the publisher 112, or checking the status or condition of the publisher 112 may be initiated when a user has a posting interaction with a website or other network location (e.g. as described elsewhere herein) where the user intends to publish the video file. A posting interaction may be any interaction indicating the desire to post a video file, any interaction in the process of posting, editing, transcoding, or posting the file to the website, or any other interaction relating to the posting of the file to the website. For example, a user may want to post a video file link (e.g. a link associated with a player adapted for viewing the video file) to a website such as ebay.com and when the user makes a posting interaction indicating the desire to post the video link, a process of checking the user's computing facility and/or downloading the publisher may be initiated. Similarly, if a user indicates his desire to capture, edit, transcode or otherwise manipulate a video file, a process of checking the user's computing facility and/or downloading the publisher may be initiated. Similarly, the user may be partially through the process of editing, transcoding, capturing, or posting the file to the website and the process of checking the user's computing facility and/or downloading the publisher may be initiated.

In embodiments, the publisher 112, as a browser plug-in embedded into a browser enabled processor platform 104, may be integral with a video enabled recording/storage device 102. The user 602 may record the video file with the video enabled recording/storage device 102, drag the video file into publisher 112, edit the file as desired, transcode the file and otherwise make it ready to send the file to the content delivery network 124 via publisher 112, the network 118, and the application server(s) 120 when a connection to the network is available. An example of this configuration may be a digital video camera 102B with the publisher 112 hosted locally by a browser enabled processor platform 104. The capturing of the video file, and the capability to edit the video clip by cutting and splicing the video and possibly adding audio, may be completed with the same device. In embodiments, the publisher may be launched or updated when an interaction with the intended posting site is made.

In embodiments, the publisher 112, as a browser plug-in embedded into a browser enabled processor platform 104, may be utilized to post video files on personal websites 122. A user of a browser-enabled video manipulation and posting facility 100 may post video files with little technical knowledge. The user 602 may transfer a video file from a video enabled recording/storage device 102, or from a local database 130, edit the file as desired, transcode, and send to the content delivery network 124 via publisher 112 and the application server(s) 120. To begin the process of posting the video file to the desired page, the user may select the target space on a page and initiate the process. If the publisher is already loaded on the user's client computing facility, the capture, editing, and transcoding processes may take place through the use of the publisher 112 and then the transcoded file may be posted to the target space. In embodiments, the action of posting may involve transferring the video file to a content delivery network and posting an associated link (e.g. a link that is associated with a player) on the target space. The link may also contain a snippet or other representation identifying the video. In embodiments, the application server(s) 120 may send the user 602 a link to the file that the user 602 for his own records or to be referenced or posted. Any user 602 with access to the web site may now select the hyperlink for download of the video file for viewing and/or storage to a database 130. In embodiments, the player is a browser plug-in style player and if the user 602 selecting the file for download does not have a video player 128, the application server(s) 120 may give the user 602 the option of downloading the player 128. The process involving the users 602 downloading the video file may continue within the constraints set up by control parameters set up by the posting user. In embodiments, the 'link' that is supplied on the website may be a media player (e.g. a web enabled video player, a client player, or a browser plug-in style player). In embodiments, the 'link' provides connection to the video file and facilitates playback of the video.

In embodiments, the publisher 112, as a browser plug-in embedded into a browser enabled processor platform 104, may be utilized to post video files on personal networking websites 122 such as MySpace.com, bebo.com, tagged.com, tagwolrd.com, Xanga.com, bolt.com, orkut.com, piczo.com, myyearbook.com, hi5.com or other such sites. These personal networking websites can be generally described as commercial websites 122 through which individuals may post pictures and information about themselves, or of people and things that are a part of their lives, as a part of a personal network of individuals. Amongst the many features of these personal networking websites an individual may profile themselves (e.g. often including linked pictures, etc.), search or browse for other members profiles, and invite others to join a personal network.

A primary feature of the personal profile of personal networking websites is the digital photograph(s) of the individual. Digital still images are very limited in their ability to convey personality, and video images are far superior in this regard. Users 602 of the browser-enabled video manipulation and posting facility 100 may provide a personal networking website 122 (such as MySpace.com) with a link to a personal video that has been previously stored in the content delivery network 124. Again, the link may be associated with a player and one interacting with the link may initiate playback of the associated video file. The user 602 may transfer a video file from a video enabled recording/storage device 102, or from a local database 130, edit the file as desired, and send to the content delivery network 124 via publisher 112 and the application server(s) 120. To begin the process of posting the video file to the desired page (e.g. the MyPlace page), the user may select the target space and initiate the process. If the publisher is already loaded on the user's client computing facility, the capture, editing, and transcoding processes may take place through the use of the publisher and then the transcoded file may be posted to the target space. In embodiments, the posting may involve transferring the video file to a content delivery network and posting an associated link (e.g. possibly associated with a player) on the target space. The link may also contain a snippet or other representation identifying the video. In embodiments, the application server(s) 120 may send the user 602 a link to the file that the user 602 for his own records or to be referenced or posted. Any user 602 with access to the personal networking website 122 may now select the hyperlink for download of the video file for viewing and/or storage to a database 130. If the user 602 selecting the file for download does not have a video player 128, the application server(s) 120 may give the user 602 the option of downloading the player 128. The process of personal networking users 602 downloading the video file may continue within the constraints set up by the posting user's 602 control parameters. In embodiments, the 'link' that is supplied on the website may be a media player (e.g. a web enabled video player, or a browser plug-in style player). In embodiments, the 'link' provides connection to the video file and facilitates playback of the video.

In an alternative embodiment, a user may be provided with a video file submission template to manage the process of delivering the video file and link(s) to the video file to the appropriate places. For example, a template may be provided that automatically directs the location of the video file (e.g. location on the content delivery network) and the location of the link (e.g. the space on the website). The template may also have fields for meta data, personal data or the like. The individual sending a personal networking website a video file may be able to request the template from website that allows them to provide the video, along with information about the video, directly to the personal networking website. The user then utilizes the browser-enabled video manipulation and posting facility 100 to store the video file on the content delivery network 124 and hyperlink it to the file from the individual's personal profile.

In embodiments, the publisher 112, as a browser plug-in embedded into a browser enabled processor platform 104, may be utilized to post video files on personals websites 122 such as Yahoo personals, Match.com, or eHarmony. Personals over a network 118 are commercial websites 122 through which individuals may post pictures and information about themselves for the purpose of developing personal relationships. For instance, in the Yahoo personals, a person entering the website 122 may create a personal profile of themselves and search through the website 122 database for potential matches. Alternate approaches, such as eHarmony, profile an individual through questionnaires, then attempt to match individuals within the database using some compatibility algorithm. Personals websites 122 generally utilize some version of textual information about the individuals entering into the database.

In embodiments, users 602 of the browser-enabled video manipulation and posting facility 100 may provide a personals website 122 with a link to a personal video that has been previously stored in the content delivery network 124. The link may be associated with a player and one interacting with the link may initiate playback of the associated video file. The user 602 may transfer a video file from a video enabled recording/storage device 102, or from a local database 130, edit the file as desired, and send to the content delivery network 124 via publisher 112 and the application server(s) 120. To begin the process of posting the video file to the desired page, the user may select the target space and initiate the process. If the publisher is already loaded on the user's client computing facility, the capture, editing, and transcoding processes may take place through the use of the publisher and then the transcoded file may be posted to the target space. In embodiments, the posting may involve transferring the video file to a content delivery network and posting an associated link (e.g. possibly associated with a player) on the target space. The link may also contain a snippet or other representation identifying the video. In embodiments, the application server(s) 120 may send the user 602 a link to the file that the user 602 for his own records or to be referenced or posted.

Any user 602 with access to the link on the personals website 122 may now select the hyperlink for download of the video file for viewing and/or storage to a database 130. If the user 602 selecting the file for download does not have a video player 128, the application server(s) 120 may give the user 602 the option of downloading the player 128. The process involving the users 602 downloading the video file may continue within the constraints set up by the posting user's 602 control parameters. In embodiments, the 'link' that is supplied on the website may be a media player (e.g. a web enabled video player, or a browser plug-in style player). In embodiments, the 'link' provides connection to the video file and facilitates playback of the video.

In an alternative embodiment, a user may be provided with a video file submission template to manage the process of delivering the video file and link(s) to the video file to the appropriate places. For example, a template may be provided that automatically directs the location of the video file (e.g. location on the content delivery network) and the location of the link (e.g. the space on the website). The template may also have fields for meta data, personal data or the like. The individual sending the personals website 122 a video file may be able to request the template from the website 122 that allows them to provide the video, along with information about the video, directly to the personals website. The personals website then utilizes the browser-enabled video manipulation and posting facility 100 to store the video file on the content delivery network 124 and hyperlink it to the individual's profile.

In embodiments, the publisher 112, as a browser plug-in embedded into a browser enabled processor platform 104, may be utilized to post video files on business websites 122 for internal company use. A company may provide a decentralized means of providing access to the posting of video files linked to the company's public Internet site or restricted intranet site. A user of a browser-enabled video manipulation and posting facility 100 may post video files with little technical knowledge. An employee, as a user 602, transfers a video file from a video enabled recording/storage device 102, or from a local database 130, edit the file as desired, and send to the content delivery network 124 via publisher 112 and the application server(s) 120. To begin the process of posting the video file to the desired page, the user may select the target space and initiate the process. If the publisher is already loaded on the user's client computing facility, the capture, editing, and transcoding processes may take place through the use of the publisher and then the transcoded file may be posted to the target space. In embodiments, the posting may involve transferring the video file to a content delivery network and posting an associated link (e.g. possibly associated with a player) on the target space. The link may also contain a snippet or other representation identifying the video. In embodiments, the application server(s) 120 may send the user 602 a link to the file that the user 602 for his own records or to be referenced or posted. Any user 602 with access to the business web site may now select the hyperlink for download of the video file for viewing and/or storage to a database 130. If the user 602 selecting the file for download does not have a video player 128, the application server(s) 120 may give the user 602 the option of downloading the player 128. The process involving the users 602 downloading the video file may continue within the constraints set up by the posting user's 602 control parameters. In embodiments, the 'link' that is supplied on the website may be a media player (e.g. a web enabled video player, or a browser plug-in style player). In embodiments, the 'link' provides connection to the video file and facilitates playback of the video.

In an alternative embodiment, a user may be provided with a video file submission template to manage the process of delivering the video file and link(s) to the video file to the appropriate places. For example, a template may be provided that automatically directs the location of the video file (e.g. location on the content delivery network) and the location of the link (e.g. the space on the website). The template may also have fields for meta data, personal data or the like. The employee sending the webmaster a video file may be able to request the template from the business website that allows them to provide the video, along with information about the video, directly to the webmaster. The business then utilizes the browser-enabled video manipulation and posting facility 100 to store the video file on the content delivery network 124 and hyperlink to the file from the company's website.

In embodiments, the publisher 112, as a browser plug-in embedded into a browser enabled processor platform 104, may be utilized to post video files for inter-business purposes (e.g. an internet or extranet). A company may provide a decentralized means of conducting company-to-company exchanges for contractual or advertisement purposes. For instance, a business may need to supply video files to satisfy or verify a contractual requirement. A business may also need to supply a video to another business for marketing purposes. Through the use of a browser-enabled video manipulation and posting facility 100 the business may only need to supply another company a link to the previously stored video file. An employee, as a user 602, transfers a video file from a video enabled recording/storage device 102, or from a local database 130, edit the file as desired, and send to the content delivery network 124 via publisher 112 and the application server(s) 120. To begin the process of posting the video file to the desired page, the user may select the target space and initiate the process. If the publisher is already loaded on the user's client computing facility, the capture, editing, and transcoding processes may take place through the use of the publisher and then the transcoded file may be posted to the target space. In embodiments, the posting may involve transferring the video file to a content delivery network and posting an associated link (e.g. possibly associated with a player) on the target space. The link may also contain a snippet or other representation identifying the video. In embodiments, the application server(s) 120 may send the user 602 a link to the file that the user 602 for his own records or to be referenced or posted. The other company may now select the hyperlink for download of the video file for viewing and/or storage to a database 130. If the employee of the other company 602 selecting the file for download does not have a video player 128, the application server(s) 120 may give the user 602 the option of downloading the player 128. Access to the video file continues within the constraints set up by the posting user's 602 control parameters. In embodiments, the 'link' that is supplied on the website may be a media player (e.g. a web enabled video player, or a browser plug-in style player). In embodiments, the 'link' provides connection to the video file and facilitates playback of the video.

In embodiments, the publisher 112, as a browser plug-in embedded into a browser enabled processor platform 104, may be utilized by businesses for the posting of video files for interactions with customers. Video files would be a great improvement over the limited descriptiveness of a digital still image, and it is essential that interactions between companies and customers be clear and concise. A browser-enabled video manipulation and posting facility 100 may provide a business a straightforward, decentralized means of conducting interactions with customers. For instance, a business may need to supply video files to a customer as a part of assistance with a product. When assisting the customer the employee transfers the video file from a video enabled recording/storage device 102, or from a local database 130, edit the file as desired, and send to the content delivery network 124 via publisher 112 and the application server(s) 120. To begin the process of posting the video file to the desired page, the user may select the target space and initiate the process. If the publisher is already loaded on the user's client computing facility, the capture, editing, and transcoding processes may take place through the use of the publisher and then the transcoded file may be posted to the target space. In embodiments, the posting may involve transferring the video file to a content delivery network and posting an associated link (e.g. possibly associated with a player) on the target space. The link may also contain a snippet or other representation identifying the video. In embodiments, the application server(s) 120 may send the user 602 a link to the file that the user 602 for his own records or to be referenced or posted. The customer may now access the business web site to select the hyperlink for download of the video file for viewing and/or storage to a database 130. If the customer selecting the file for download does not have a video player 128, the application server(s) 120 may give the customer the option of downloading the player 128. Customer access to downloading the video file may continue within the constraints set up by the posting user's 602 control parameters. In embodiments, the 'link' that is supplied on the website may be a media player (e.g. a web enabled video player, or a browser plug-in style player). In embodiments, the 'link' provides connection to the video file and facilitates playback of the video.

Alternatively, the customer may wish to supply the business with a video file in support of a product issue. In this case the customer may download a video submission template from the business website 122 that allows the customer to post a video file to the browser-enabled video manipulation and posting facility 100 though the service provided by the business. The customer supplies the video file and associated text in the template submission, which posts the video file to the content delivery network 124 and supplies the business with the link for viewing. Access to the file may continue within the constraints set up by the company through its control parameter.

In embodiments, the publisher 112, as a browser plug-in embedded into a browser enabled processor platform 104, may be utilized to post video files on an e-commerce auction website 122 such as eBay, Yahoo auctions, or Amazon.com auctions. Ebay, for instance, is a commercial website 122 through which individuals buy and sell items such as antiques, art, cameras cars, clothing, collectibles, crafts, movies, home & garden equipment, Jewelry, watches, music, real estate, sporting goods, stamps, toys, travel tickets, and like.

A primary feature in the purchase or sale of something through a network 118 is a visual image of the item. Views of the items, taken with a digital still camera 102A provide a limited projection of the item, and a video file showing the item would be a significant improvement. Users 602 of a browser-enabled video manipulation and posting facility 100 may provide a video file to the item description as provided for each item on eBay or other auction site. The user 602 transfers their video file from a video enabled recording/ storage device 102, or from a local database 130, edit the file as desired, and send to the content delivery network 124 via publisher 112 and the application server(s) 120. To begin the process of posting the video file to the desired page, the user may select the target space and initiate the process. If the publisher is already loaded on the user's client computing facility, the capture, editing, and transcoding processes may take place through the use of the publisher and then the transcoded file may be posted to the target space. In embodiments, the posting may involve transferring the video file to a content delivery network and posting an associated link (e.g. possibly associated with a player) on the target space. The link may also contain a snippet or other representation identifying the video. In embodiments, the application server(s) 120 may send the user 602 a link to the file that the user 602 for his own records or to be referenced or posted. Any user 602 with access to the eBay or other auction website 122 may now select the hyperlink for download of the video file for viewing and/or storage to a database 130. If the user 602 selecting the file for download does not have a video player 128, the application server(s) 120 may give the user 602 the option of downloading the player 128. The process of eBay or other auctions users 602 downloading the video file may continue within the constraints set up by the posting user's 602 control parameters, which may be set from the requirements of the end time for the item as set by eBay.

In an alternative embodiment, a user may be provided with a video file submission template to manage the process of delivering the video file and link(s) to the video file to the appropriate places. For example, a template may be provided that automatically directs the location of the video file (e.g. location on the content delivery network) and the location of the link (e.g. the space on the website). The template may also have fields for meta data, personal data or the like. The individual sending eBay or other auction site a video file for an item may be able to request the template from eBay or other auction site that allows them to provide the video, along with information about the video, directly to eBay or other auction site. EBay or other auction site then utilizes the browser-enabled video manipulation and posting facility 100 to store the video file on the content delivery network 124 and hyperlink to the item file on the eBay or other auction website 122.

In addition to the improvement in visual insight provided by the availability of a video file during the sale of the item, straightforward access to a video file posting facility for the sake of possible return of the item is also extremely advantageous. Network 118 auctions do not generally allow the buyer to view the item directly, and the item requires packing and shipping. In the event of an item being defective in some way upon receiving by the purchaser, the user of a browser-enabled video manipulation and posting facility 100 may create a video file of the defective item with a video enabled recording/storage device 102 and make the video file available to the seller though a hyperlink provided by the application server(s) 120. The buyer and seller may now make a more informed informational exchange prior to the buyer insisting on the item being shipped back to the seller.

In embodiments, the publisher 112, as a browser plug-in embedded into a browser enabled processor platform 104, may be utilized to post video files for non-network based auctions. Auctions for the police, from estates, or from repossessions are often limited in the information about the items for auction. The creation and posting of a network viewable video file for walking through the items to be auctioned would be very effective. A user of a browser-enabled video manipulation and posting facility 100 may take a video of the auction site and items for sale and provide a hyperlink to potential buyers prior to the auction day. The individual or auction agent transfers a video file from a video enabled recording/ storage device 102, or from a local database 130, edit the file as desired, and send to the content delivery network 124 via publisher 112 and the application server(s) 120. To begin the process of posting the video file to the desired page, the user may select the target space and initiate the process. If the publisher is already loaded on the user's client computing facility, the capture, editing, and transcoding processes may take place through the use of the publisher and then the transcoded file may be posted to the target space. In embodiments, the posting may involve transferring the video file to a content delivery network and posting an associated link (e.g. possibly associated with a player) on the target space. The link may also contain a snippet or other representation identifying the video. In embodiments, the application server(s) 120 may send the user 602 a link to the file that the user 602 for his own records or to be referenced or posted. Any user 602 with access to the web site may now select the hyperlink for download of the video file for viewing and/or storage to a database 130. If the user 602 selecting the file for download does not have a video player 128, the application server(s) 120 may give the user 602 the option of downloading the player 128. The process involving the users 602 downloading the video file may continue within the constraints set up by the posting user's 602 control parameters. In embodiments, the 'link' that is supplied on the website may be a media player (e.g. a web enabled video player, or a browser plug-in style player). In embodiments, the 'link' provides connection to the video file and facilitates playback of the video.

In embodiments, the publisher 112, as a browser plug-in embedded into a browser enabled processor platform 104, may be utilized to post video files for non-network based auctions such as a cattle auction. The creation and posting of a network viewable video file for walking through the cattle to be auctioned may be a very effective means of connecting the seller and the buyer. A user of a browser-enabled video manipulation and posting facility 100 may take a video of the cattle and provide a hyperlink to potential buyers prior to the auction day. The individual or auction agent transfers a video file from a video enabled recording/storage device 102, or from a local database 130, edit the file as desired, and send to the content delivery network 124 via publisher 112 and the application server(s) 120. To begin the process of posting the video file to the desired page, the user may select the target space and initiate the process. If the publisher is already loaded on the user's client computing facility, the capture, editing, and transcoding processes may take place through the use of the publisher and then the transcoded file may be posted to the target space. In embodiments, the posting may involve transferring the video file to a content delivery network and posting an associated link (e.g. possibly associated with a player) on the target space. The link may also contain a snippet or other representation identifying the video. In embodiments, the application server(s) 120 may send the user 602 a link to the file that the user 602 for his own records or to be referenced or posted. Any user 602 with access to the action web site may now select the hyperlink for download of the video file for viewing and/or storage to a database 130. If the user 602 selecting the file for download does not have a video player 128, the application server(s) 120 may give the user 602 the option of downloading the player 128. The process involving the users 602 downloading the video file may continue within the constraints set up by the posting user's 602 control parameters. In embodiments, the 'link' that is supplied on the website may be a media player (e.g. a web enabled video player, or a browser plug-in style player). In embodiments, the 'link' provides connection to the video file and facilitates playback of the video.

In embodiments, the publisher 112, as a browser plug-in embedded into a browser enabled processor platform 104, may be utilized to post video for the sale of Real Estate. The process of searching for a home to purchase is very time-consuming, involving physically driving to the Real Estate of interest and walking around to determine whether the Real Estate is desirable. Still images from a digital camera 102A are very limited in projecting a large property and/or a dwelling, and a video file would greatly improve the perspective provided to the potential customer about properties. This may save time of the Real Estate agent, the buyers, and the sellers by reducing the time spent physically visiting unsuitable properties.

In embodiments, a user of a browser-enabled video manipulation and posting facility 100 may take a video of a tour of the property and provide a hyperlink to potential buyers prior to physically visiting the site. The Real Estate agent transfers a video file from a video enabled recording/storage device 102, or from a local database 130, edit the file as desired, and send to the content delivery network 124 via publisher 112 and the application server(s) 120. To begin the process of posting the video file to the desired page, the user may select the target space and initiate the process. If the publisher is already loaded on the user's client computing facility, the capture, editing, and transcoding processes may take place through the use of the publisher and then the transcoded file may be posted to the target space. In embodiments, the posting may involve transferring the video file to a content delivery network and posting an associated link (e.g. possibly associated with a player) on the target space. The link may also contain a snippet or other representation identifying the video. In embodiments, the application server(s) 120 may send the user 602 a link to the file that the user 602 for his own records or to be referenced or posted. Any potential buyer with access to the web site may now select the hyperlink for download of the video file for viewing and/or storage to a database 130. If the potential buyer selecting the file for download does not have a video player 128, the application server(s) 120 may give them the option of downloading the player 128. The process of potential buyers downloading the video file may continue within the constraints set up by the posting user's 602 control parameters. In embodiments, the 'link' that is supplied on the website may be a media player (e.g. a web enabled video player, or a browser plug-in style player). In embodiments, the 'link' provides connection to the video file and facilitates playback of the video.

In embodiments, the publisher 112, as a browser plug-in embedded into a browser enabled processor platform 104, may be utilized to post video of virtual tours of historic, public, private, or personal sites. Still images from a digital camera 102A are very limited in projecting a perspective of a place, which is normally meant to be physically visited. A virtual tour, by way of a video file, allows the virtual visitor to better absorb the environment of the site, either in lieu of an actual visit or in the planning of a potential visit. A user of a browser-enabled video manipulation and posting facility 100 may take a video of a tour of the property and provide a hyperlink to potential buyers prior to physically visiting the site. The Real Estate agent transfers a video file from a video enabled recording/storage device 102, or from a local database 130, edit the file as desired, and send to the content delivery network 124 via publisher 112 and the application server(s) 120. To begin the process of posting the video file to the desired page, the user may select the target space and initiate the process. If the publisher is already loaded on the user's client computing facility, the capture, editing, and transcoding processes may take place through the use of the publisher and then the transcoded file may be posted to the target space. In embodiments, the posting may involve transferring the video file to a content delivery network and posting an associated link (e.g. possibly associated with a player) on the target space. The link may also contain a snippet or other representation identifying the video. In embodiments, the application server(s) 120 may send the user 602 a link to the file that the user 602 for his own records or to be referenced or posted. Any potential buyer with access to the web site may now select the hyperlink for download of the video file for viewing and/or storage to a database 130. If the potential buyer selecting the file for download does not have a video player 128, the application server(s) 120 may give them the option of downloading the player 128. The process of potential buyers downloading the video file may continue within the constraints set up by the posting user's 602 control parameters. In embodiments, the 'link' that is supplied on the website may be a media player (e.g. a web enabled video player, or a browser plug-in style player). In embodiments, the 'link' provides connection to the video file and facilitates playback of the video.

In embodiments, the publisher 112, as a browser plug-in embedded into a browser enabled processor platform 104 and integrated with a video enabled recording/storage device 102, may be utilized to create, edit, and post video files on personal websites 122. In addition, if the user's 602 network interface 110A were wireless, the user 602 may perform this task remotely. A user of a browser-enabled video manipulation and posting facility 100 may post video files with little technical knowledge. The user 602 may record the video file with the video enabled recording/storage device 102, drags the video file into publisher 112, edit the file as desired, and send to the content delivery network 124 via publisher 112, the network 118, and the application server(s) 120. Any user 602 with access to the personal web site may now select the hyperlink for download of the video file for viewing and/or storage to a database 130. If the user 602 selecting the file for download does not have a video player 128, the application server(s) 120 may give the user 602 the option of downloading the player 128. The process involving the users 602 downloading the video file may continue within the constraints set up by the posting user's 602 control parameters. In embodiments, the 'link' that is supplied on the website may be a media player (e.g. a web enabled video player, or a browser plug-in style player). In embodiments, the 'link' provides connection to the video file and facilitates playback of the video.

An example of this process may be a user 602 on vacation or away from home for the weekend, recording video files, and uploading these video files through the network to a personal website 122. Family members may now view the user's 602 video files while the user is still away from home. This ability to immediately post video files to a personal website 122 may be made through the integration of a video enabled recording/storage device 102 into a browser-enabled video manipulation and posting facility 100. In addition, the process may be performed remotely if the user's 602 network connection is wireless. The user may perform this process in two steps, first uploading the video file to the content delivery network 124 and receiving back a link to said video file, and second, to connect to the user's 602 personal website 122 and manually hyperlink to the video file. Alternatively, the user 602 may utilize some form of template provided by a service to perform the process in a single step. The template may enable the user to submit the video file along with the web address where the file is to be linked. In this case the service may be a user on the browser-enabled video manipulation and posting facility 100.

In embodiments, the publisher 112, as a browser plug-in embedded into a browser enabled processor platform 104, and integrated with a video enabled recording/storage device 102, may be utilized to create, edit, and post video files on personal networking websites 122 such as MySpace.com, bebo.com, tagged.com, tagwolrd.com, Xanga.com, bolt.com, orkut.com, piczo.com, myyearbook.com, hi5.com or other such sites. In addition, if the user's 602 network interface 110A were wireless, the user 602 may perform this task remotely. These personal networking websites 122 can be generally described as commercial websites 122 through which individuals may post pictures and information about themselves, or of people and things that are a part of their lives, as a part of a personal network of individuals. Amongst the many features of a personal networking website is an individual may profile themselves (e.g. often including linked pictures, etc), search or browse for other members profiles, and invite others to join a personal network.

A primary feature of the personal profile of a personal networking website is the digital photograph(s) of the individual. Digital still images are very limited in their ability to convey personality, and video images are far superior in this regard. Users 602 of the browser-enabled video manipulation and posting facility 100 may provide a personal networking website 122 with a link to a personal video that has been previously stored in the content delivery network 124. The link may be associated with a player and one interacting with the link may initiate playback of the associated video file. The user 602 may record the video file with the video enabled recording/storage device 102, drags the video file into publisher 112, edit the file as desired, and send to the content delivery network 124 via publisher 112, the network 118, and the application server(s) 120. The process of posting the video may begin with the user's selection of a space to post to and the posting may occur in an automatic or background fashion such that the user does not have to participate in the interactions. Any user 602 with access to the website 122 may now select the hyperlink for download of the video file for viewing and/or storage to a database 130. If the user 602 selecting the file for download does not have a video player 128, the application server(s) 120 may give the user 602 the option of downloading the player 128. The process users 602 downloading the video file may continue within the constraints set up by the posting user's 602 control parameters. In embodiments, the 'link' that is supplied on the website may be a media player (e.g. a web enabled video player, or a browser plug-in style player). In embodiments, the 'link' provides connection to the video file and facilitates playback of the video.

An example of this process may be a user 602 on vacation or away from home for the weekend, recording video files, and uploading these video files through the network to the personal networking website 122. Family members may now view the user's 602 video files while the user is still away from home. This facility to immediately post video files to a personal website 122 may be made through the integration of a video enabled recording/storage device 102 into a browser-enabled video manipulation and posting facility 100. In addition, the process may be performed remotely if the user's 602 network connection is wireless. The user may perform this process in two steps, first uploading the video file to the content delivery network 124 and receiving back a link to said video file, and second, to connect to the user's 602 personal profile on the personal networking website 122 and manually hyperlink to the video file. Alternatively, the user 602 may utilize some form of template provided by the personal networking website or other service to perform the process in a single step. The template may enable the user to submit the video file along with the web address where the file is to be linked. In this case personal networking website or the service may be a user on the browser-enabled video manipulation and posting facility 100.

In embodiments, the publisher 112, as a browser plug-in embedded into a browser enabled processor platform 104, and integrated with a video enabled recording/storage device video enabled recording/storage device 102, may be utilized to create, edit, and post video files on business websites 122 for internal company use. In addition, if the user's 602 network interface 110A were wireless, the user 602 may perform this task remotely. A company may provide a decentralized means of providing access to the posting of video files linked to the company's public Internet site or restricted intranet site. A user of a browser-enabled video manipulation and posting facility 100 may post video files with little technical knowledge. The user 602 may record the video file with the video enabled recording/storage device 102, drags the video file into publisher 112, edit the file as desired, and send to the content delivery network 124 via publisher 112, the network 118, and the application server(s) 120. To begin the process of posting the video file to the desired page, the user may select the target space and initiate the process. If the publisher is already loaded on the user's client computing facility, the capture, editing, and transcoding processes may take place through the use of the publisher and then the transcoded file may be posted to the target space. In embodiments, the posting may involve transferring the video file to a content delivery network and posting an associated link (e.g. possibly associated with a player) on the target space. The link may also contain a snippet or other representation identifying the video. In embodiments, the application server(s) 120 may send the user 602 a link to the file that the user 602 for his own records or to be referenced or posted. Any user 602 with access to the business web site may now select the hyperlink for download of the video file for viewing and/or storage to a database 130. If the user 602 selecting the file for download does not have a video player 128, the application server(s) 120 may give the user 602 the option of downloading the player 128. The process involving the users 602 downloading the video file may continue within the constraints set up by the posting user's 602 control parameters. In embodiments, the 'link' that is supplied on the website may be a media player (e.g. a web enabled video player, or a browser plug-in style player). In embodiments, the 'link' provides connection to the video file and facilitates playback of the video.

An example of this process may be an employee at a remote work site and needing to upload video files to the company website. Other members of the company may now view the employee's video files taken on site, while the employee is still at the remote site. This facility to immediately post video files to a personal website 122 may be made through the integration of a video enabled recording/storage device 102 into a browser-enabled video manipulation and posting facility 100. In addition, the process may be performed remotely if the user's 602 network connection is wireless. The employee may perform this process in two steps, first uploading the video file to the content delivery network 124 and receiving back a link to said video file, and second, to connect to the employee's company website 122 and manually hyperlink to the video file. Alternatively, the employee may utilize some form of template provided by the company or other service to perform the process in a single step. The template may enable the employee to submit the video file along with the web address where the file is to be linked to the company's webmaster. In this case the company or the service may be a user on the browser-enabled video manipulation and posting facility 100. In embodiments, to begin the process of posting the video file to the desired page, the user may select the target space and initiate the process. If the publisher is already loaded on the user's client computing facility, the capture, editing, and transcoding processes may take place through the use of the publisher and then the transcoded file may be posted to the target space. In embodiments, the posting may involve transferring the video file to a content delivery network and posting an associated link (e.g. possibly associated with a player) on the target space. The link may also contain a snippet or other representation identifying the video. In embodiments, the application server(s) 120 may send the user 602 a link to the file that the user 602 for his own records or to be referenced or posted.

In embodiments, the publisher 112, as a browser plug-in embedded into a browser enabled processor platform 104 and integrated with a video enabled recording/storage device 102, may be utilized to create, edit, and post video files for inter-business purposes. In addition, if the user's 602 network interface 110A were wireless, the user 602 may perform this task remotely. A company may provide a decentralized means of conducting company-to-company exchanges for contractual or advertisement purposes. For instance, a business may need to supply video files to satisfy or verify a contractual requirement. A business may also need to supply a video to another business for marketing purposes. Through the use of a browser-enabled video manipulation and posting facility 100 the business may only need to supply another company a link to the previously stored video file. An employee, as a user 602, records the video file with the video enabled recording/storage device video enabled recording/storage device 102, drags the video file into publisher 112, edit the file as desired, and send to the content delivery network 124 via publisher 112, the network 118, and the application server(s) 120. To begin the process of posting the video file to the desired page, the user may select the target space and initiate the process. If the publisher is already loaded on the user's client computing facility, the capture, editing, and transcoding processes may take place through the use of the publisher and then the transcoded file may be posted to the target space. In embodiments, the posting may involve transferring the video file to a content delivery network and posting an associated link (e.g. possibly associated with a player) on the target space. The link may also contain a snippet or other representation identifying the video. In embodiments, the application server(s) 120 may send the user 602 a link to the file that the user 602 for his own records or to be referenced or posted. The other company may now select the hyperlink for download of the video file for viewing and/or storage to a database 130. If the employee of the other company 602 selecting the file for download does not have a video player 128, the application server(s) 120 may give the user 602 the option of downloading the player 128. Access to the video file continues within the constraints set up by the posting user's 602 control parameters. In embodiments, the 'link' that is supplied on the website may be a media player (e.g. a web enabled video player, or a browser plug-in style player). In embodiments, the 'link' provides connection to the video file and facilitates playback of the video.

An example of this process may be an employee working on a contract at a remote site for an extended time period. The employee may need to conveniently provide video files to a contracting company or agency in partial fulfillment of the contract. The contracting company or agency may now view the user's 602 video files while the user is still on site. This facility to immediately post video files to a website 122 may be made through the integration of a video enabled recording/storage device 102 into a browser-enabled video manipulation and posting facility 100. In addition, the process may be performed remotely if the user's 602 network connection is wireless. The user may perform this process in two steps, first uploading the video file to the content delivery network 124 and receiving back a link to said video file, and second, to connect to a user's 602 website 122 and manually hyperlink to the video file. Alternatively, the user 602 may utilize some form of template provided by the company or a service to perform the process in a single step. The template may enable the user to submit the video file along with the web address where the file is to be linked. In this case the company or the service may be a user on the browser-enabled video manipulation and posting facility 100. In embodiments, to begin the process of posting the video file to the desired page, the user may select the target space and initiate the process. If the publisher is already loaded on the user's client computing facility, the capture, editing, and transcoding processes may take place through the use of the publisher and then the transcoded file may be posted to the target space. In embodiments, the posting may involve transferring the video file to a content delivery network and posting an associated link (e.g. possibly associated with a player) on the target space. The link may also contain a snippet or other representation identifying the video. In embodiments, the application server(s) 120 may send the user 602 a link to the file that the user 602 for his own records or to be referenced or posted.

In embodiments, the publisher 112, as a browser plug-in embedded into a browser enabled processor platform 104 and integrated with a video enabled recording/storage device 102, may be utilized by businesses to create, edit, and post video files for interactions with customers. In addition, if the user's 602 network interface 110A were wireless, the user 602 may perform this task remotely. Video files would be a great improvement over the limited descriptiveness of a digital still image, and it is essential that interactions between companies and customers be clear and concise. A browser-enabled video manipulation and posting facility 100 may provide a business a straightforward, decentralized means of conducting interactions with customers. For instance, a business may need to supply video files to a customer as a part of assistance with a product. When assisting the customer the employee records the video file with the video enabled recording/storage device 102, drags the video file into publisher 112, edit the file as desired, and send to the content delivery network 124 via publisher 112, the network 118, and the application server(s) 120. To begin the process of posting the video file to the desired page, the user may select the target space and initiate the process. If the publisher is already loaded on the user's client computing facility, the capture, editing, and transcoding processes may take place through the use of the publisher and then the transcoded file may be posted to the target space. In embodiments, the posting may involve transferring the video file to a content delivery network and posting an associated link (e.g. possibly associated with a player) on the target space. The link may also contain a snippet or other representation identifying the video. In embodiments, the application server(s) 120 may send the user 602 a link to the file that the user 602 for his own records or to be referenced or posted. The customer may now access the business web site to select the hyperlink for download of the video file for viewing and/or storage to a database 130. If the customer selecting the file for download does not have a video player 128, the application server(s) 120 may give the customer the option of downloading the player 128. Customer access to downloading the video file may continue within the constraints set up by the posting user's 602 control parameters. In embodiments, the 'link' that is supplied on the website may be a media player (e.g. a web enabled video player, or a browser plug-in style player). In embodiments, the 'link' provides connection to the video file and facilitates playback of the video.

An example of this process may be a customer who wishes to supply the company with a video file in support of a product issue while at some remote location. The company may now view the customer's video files while the customer is still on site. This facility to immediately post video files between a customer and a company may be made through the integration of a video enabled recording/storage device 102 into a browser-enabled video manipulation and posting facility 100. In addition, the process may be performed remotely if the user's 602 network connection is wireless. The user may perform this process in two steps, first uploading the video file to the content delivery network 124 and receiving back a link to said video file, and second, to connect to a user's 602 website 122 and manually hyperlink to the video file. Alternatively, the user 602 may utilize some form of template provided by a company or a service to perform the process in a single step. The template may enable the user to submit the video file along with the web address where the file is to be linked. In this case the company or the service may be a user on the browser-enabled video manipulation and posting facility 100. In embodiments, to begin the process of posting the video file to the desired page, the user may select the target space and initiate the process. If the publisher is already loaded on the user's client computing facility, the capture, editing, and transcoding processes may take place through the use of the publisher and then the transcoded file may be posted to the target space. In embodiments, the posting may involve transferring the video file to a content delivery network and posting an associated link (e.g. possibly associated with a player) on the target space. The link may also contain a snippet or other representation identifying the video. In embodiments, the application server(s) 120 may send the user 602 a link to the file that the user 602 for his own records or to be referenced or posted.

In embodiments, the publisher 112, as a browser plug-in embedded into a browser enabled processor platform 104 and integrated with a video enabled recording/storage device 102, may be utilized to post video files on an e-commerce auction website 122 such as eBay, Yahoo auctions, or Amazon.com auctions. In addition, if the user's 602 network interface 110A were wireless, the user 602 may perform this task remotely. EBay, for instance, is a commercial website 122 through which individuals buy and sell items such as antiques, art, cameras cars, clothing, collectibles, crafts, movies, home & garden equipment, Jewelry, watches, music, real estate, sporting goods, stamps, toys, travel tickets, and like.

A primary feature in the purchase or sale of something through a network 118 may be a visual image of the item. Views of the items, taken with a digital still camera 102A provide a limited projection of the item, and a video file showing the item would be a significant improvement. Users 602 of a browser-enabled video manipulation and posting facility 100 may provide a video file to the item description as provided for each item on eBay. The user 602 may record the video file with the video enabled recording/storage device 102, drags the video file into publisher 112, edit the file as desired, and send to the content delivery network 124 via publisher 112, the network 118, and the application server(s) 120. To begin the process of posting the video file to the desired page, the user may select the target space and initiate the process. If the publisher is already loaded on the user's client computing facility, the capture, editing, and transcoding processes may take place through the use of the publisher and then the transcoded file may be posted to the target space. In embodiments, the posting may involve transferring the video file to a content delivery network and posting an associated link (e.g. possibly associated with a player) on the target space. The link may also contain a snippet or other representation identifying the video. In embodiments, the application server(s) 120 may send the user 602 a link to the file that the user 602 for his own records or to be referenced or posted. Any user 602 with access to the eBay or other website 122 may now select the hyperlink for download of the video file for viewing and/or storage to a database 130. If the user 602 selecting the file for download does not have a video player 128, the application server(s) 120 may give the user 602 the option of downloading the player 128. The process of eBay users 602 downloading the video file may continue within the constraints set up by the posting user's 602 control parameters, which may be set from the requirements of the end time for the item as set by eBay or other auction site. In embodiments, the 'link' that is supplied on the website may be a media player (e.g. a web enabled video player, or a browser plug-in style player). In embodiments, the 'link' provides connection to the video file and facilitates playback of the video.

An example of this process may be a user who purchases an item at an auction or at a garage sale, and wishes to put it immediately up for sale on eBay or other auction site. The user may create a video file of the item with a video enabled recording/storage device 102, edit the video clip as desired, and upload the video clip to the content delivery network 124 through the browser-enabled video manipulation and posting facility 100. The user then receives a link to the video file, which the user sends to eBay or other auction site as a part of a new item for sale. Potential buyers may now view the user's 602 new submission to eBay or other auction site, with a video file of the item, while the user is still away from home. This facility to immediately post video files to a personal website 122 may be made through the integration of a video enabled recording/storage device 102 into a browser-enabled video manipulation and posting facility 100. In addition, the process may be performed remotely if the user's 602 network connection is wireless. The user may also perform this process in a single step by utilizing some form of video submission template provided by eBay or other auction site. The template may enable the user to submit the video file along with the standard information supplied to eBay other auction site, all in a single step. In this case the service may be a user on the browser-enabled video manipulation and posting facility 100.

In embodiments, the publisher 112 and player 128, as browser plug-ins embedded into a browser enabled processor platform 104, may be integrated into a single device. The user 602 may have the capability to receive video files for editing from a video enabled recording/storage device 102. Editing of the video file may be done on the device. The user may also have the capability to download video files from the network through the player 128, either from the browser-enabled video manipulation and posting facility 100 or from some other network location 122, and edited with publisher 112. This video may be edited in the same way as video transferred from the video enabled recording/storage device 102. With a single device the user 602 may receive video clips from different sources for editing and subsequent posting to through the browser-enabled video manipulation and posting facility 100. Editing may consist of cutting and concatenating video from multiple sources, adding audio from multiple sources, and producing a final product ready for posting. For example, a student may transfer video files from a video enabled recording/storage device 102 and from other sources, cut and combine the video files, adding text and effects, and create a final product for presentation. The final product may now be uploaded to the browser-enabled video manipulation and posting facility 100 or transferred to a video enabled playback device 132 for subsequent presentation. In embodiments, the 'link' that is supplied on the website may be a media player (e.g. a web enabled video player, or a browser plug-in style player). In embodiments, the 'link' provides connection to the video file and facilitates playback of the video.

In embodiments, the publisher 112 and player 128, as browser plug-ins embedded into a browser enabled processor platform 104 with a video enabled playback device 132, may be integrated into a single device. The user 602 may have the capability to receive video files for editing from a video enabled recording/storage device 102. Editing of the video file may be done on the device. The user may also have the capability to download video files from the network through the player 128, either from the browser-enabled video manipulation and posting facility 100 or from some other network location 122, and edited with publisher 112 or played back through a video enabled playback device 132. This video may be edited in the same way as video transferred from the video enabled recording/storage device 102. With a single device the user 602 may receive video clips from different sources for editing and subsequent posting to through the browser-enabled video manipulation and posting facility 100. Editing may consist of cutting and concatenating video from multiple sources, adding audio from multiple sources, and producing a final product ready for posting. For example, a student may transfer video files from a video enabled recording/storage device 102 and from other sources, cut and combine the video files, adding text and effects, and create a final product for presentation. The final product may now be presented through the player 128 to a video enabled playback device 132. In embodiments, the 'link' that is supplied on the website may be a media player (e.g. a web enabled video player, or a browser plug-in style player). In embodiments, the 'link' provides connection to the video file and facilitates playback of the video.

In embodiments, the publisher 112 and player 128, as browser plug-ins embedded into a browser enabled processor platform 104, may be integrated with a video enabled recording/storage device 102 into a single device. The user 602 may create video files for editing through an integrated video enabled recording/storage device 102. Editing of the video file may be done on the device. The user may also have the capability to download video files from the network through the player 128, either from the browser-enabled video manipulation and posting facility 100 or from some other network location 122, and edited with publisher 112. This video may be edited in the same way as video transferred from the video enabled recording/storage device 102. With a single device the user 602 may receive video clips from different sources for editing and subsequent posting to through the browser-enabled video manipulation and posting facility 100. Editing may consist of cutting and concatenating video from multiple sources, adding audio from multiple sources, and producing a final product ready for posting. For example, a student may create video files through the video enabled recording/storage device 102, transfer video files from other sources, cut and combine the video files adding text and effects, and create a final product ready for presentation. In embodiments, the 'link' that is supplied on the website may be a media player (e.g. a web enabled video player, or a browser plug-in style player). In embodiments, the 'link' provides connection to the video file and facilitates playback of the video.

In embodiments, the publisher 112, as a browser plug-in embedded into a browser enabled processor platform 104, may be integrated with a video enabled playback device 132. The user 602 may edit video files through the publisher 112 that have been previously transferred from a video enabled recording/storage device 102, or retrieved from local database 114. Editing of the video file may be done directly on the device. Editing may consist of cutting and concatenating video, adding audio, and producing a final product ready for posting to a network. By having publisher 112 as an integral function within the device, the user 602 need only drag the video file into publisher 112 and the video is transcoded into a common file format of the browser-enabled video manipulation and posting facility 100, and is made available for editing. The user 602 may view the video file at any stage of the process though the video enabled playback device 132. The final edited version of the video file may now be a final product ready for posting onto the browser-enabled video manipulation and posting facility 100 for other users 602 to view. An example of this integrated facility may be a video display and manipulation device for viewing video files, integrated with a browser enabled processor platform 104 and the hosted browser 108 and publisher 112 browser plug-in. This video display and manipulation device now may have the capability to edit, view, and produce a final product for web posting while away from a network connection. When the user 602 establishes a network connection, the user 602 may now simply upload the video file through the browser-enabled video manipulation and posting facility 100 for access to other users 602. In embodiments, the 'link' that is supplied on the website may be a media player (e.g. a web enabled video player, or a browser plug-in style player). In embodiments, the 'link' provides connection to the video file and facilitates playback of the video.

In embodiments, the publisher 112, as a browser plug-in embedded into a browser enabled processor platform 104, may be integrated with a video enabled recording/storage device 102 and video enabled playback device 132. The user 602 may create video files for editing through an integrated video enabled recording/storage device 102 and played back on the video enabled playback device 132. Editing of the video file may be done directly on the device. Editing may consist of cutting and concatenating video, adding audio, and producing a final product ready for posting to a network. By having publisher 112 as an integral function within the device, the user 602 need only drag the video file into publisher 112 and the video is transcoded into a common file format of the browser-enabled video manipulation and posting facility 100, and is made available for editing. The final edited version of the video file may now be a final product ready for posting onto the browser-enabled video manipulation and posting facility 100 for other users 602 to view. An example of this integrated facility may be a digital video camera 102B with a display for viewing video files, integrated with a browser enabled processor platform 104 and the hosted browser 108 and publisher 112 browser plug-in. This enhanced digital video camera 102B now may have the capability to edit and produce a final product for web posting while away from a network connection. When the user 602 establishes a network connection, the user 602 may now simply upload the video file through the browser-enabled video manipulation and posting facility 100 for access to other users 602. In embodiments, the 'link' that is supplied on the website may be a media player (e.g. a web enabled video player, or a browser plug-in style player). In embodiments, the 'link' provides connection to the video file and facilitates playback of the video.

In embodiments, the publisher 112, as a browser plug-in embedded into a browser enabled processor platform 104 with an integrated video enabled playback device, may be utilized to post video files on websites 122. Types of websites 122 may include personal websites 122; personal networking websites 122 such as personal networking websites; Business websites 122 for intra-business, inter-business, or customer interactions; e-commerce websites 122 such as e-Bay, personals, auction sites, or real estate; organizational or governmental sites such as tours of historical locations or tours of facilities; or enterprise websites 122 such as over the intranet, extranet, or internet. A user of a browser-enabled video manipulation and posting facility 100 may post video files with little technical knowledge. The user 602 may transfer a video file from a video enabled recording/storage device 102, or from a local database 130, views the pre-edited video file on the video enabled playback device 132, edits the file as desired, views the post-edited video file on the video enabled playback device video enabled playback device 132, and sends the file to the content delivery network 124 via publisher 112 and the application server(s) 120. To begin the process of posting the video file to the desired page, the user may select the target space and initiate the process. If the publisher is already loaded on the user's client computing facility, the capture, editing, and transcoding processes may take place through the use of the publisher and then the transcoded file may be posted to the target space. In embodiments, the posting may involve transferring the video file to a content delivery network and posting an associated link (e.g. possibly associated with a player) on the target space. The link may also contain a snippet or other representation identifying the video. In embodiments, the application server(s) 120 may send the user 602 a link to the file that the user 602 for his own records or to be referenced or posted. Any user 602 with access to the personal web site may now select the hyperlink for download of the video file for viewing and/or storage to a database 130. If the user 602 selecting the file for download does not have a video player 128, the application server(s) 120 may give the user 602 the option of downloading the player 128. The process involving the users 602 downloading the video file may continue within the constraints set up by the posting user's 602 control parameters. In embodiments, the 'link' that is supplied on the website may be a media player (e.g. a web enabled video player, or a browser plug-in style player). In embodiments, the 'link' provides connection to the video file and facilitates playback of the video.

In embodiments, the publisher 112 and player 128, as browser plug-ins embedded into a browser enabled processor platform 104 with an integrated video enabled playback device, may be utilized to post video files on websites 122. Types of websites 122 may include personal websites 122; personal networking websites 122; Business websites 122 for intra-business, inter-business, or customer interactions; e-commerce websites 122 such as e-Bay, personals, auction sites, or real estate; organizational or governmental sites such as tours of historical locations or tours of facilities; or enterprise websites 122 such as over the intranet, extranet, or internet. A user of a browser-enabled video manipulation and posting facility 100 may post video files with little technical knowledge. The user 602 may transfer a video file from a video enabled recording/storage device 102, or from a local database 130, views the pre-edited video file on the video enabled playback device 132, edits the file as desired, views the post-edited video file on the video enabled playback device 132, and sends the file to the content delivery network 124 via publisher 112 and the application server(s) 120. To begin the process of posting the video file to the desired page, the user may select the target space and initiate the process. If the publisher is already loaded on the user's client computing facility, the capture, editing, and transcoding processes may take place through the use of the publisher and then the transcoded file may be posted to the target space. In embodiments, the posting may involve transferring the video file to a content delivery network and posting an associated link (e.g. possibly associated with a player) on the target space. The link may also contain a snippet or other representation identifying the video. In embodiments, the application server(s) 120 may send the user 602 a link to the file that the user 602 for his own records or to be referenced or posted. Any user 602 with access to the personal web site may now select the hyperlink for download of the video file for viewing utilizing the player 128 and a video enabled playback device 132, and/or storage to a database 130. If the user 602 selecting the file for download does not have a video player 128, the application server(s) 120 may give the user 602 the option of downloading the player 128. The process involving the users 602 downloading the video file may continue within the constraints set up by the posting user's 602 control parameters. In embodiments, the 'link' that is supplied on the website may be a media player (e.g. a web enabled video player, or a browser plug-in style player). In embodiments, the 'link' provides connection to the video file and facilitates playback of the video.

In embodiments, the publisher 112 and player 128, as browser plug-ins embedded into a browser enabled processor platform 104 with an integrated video enabled recording/ storage device 102, may be utilized to post video files on websites 122. Types of websites 122 may include personal websites 122; personal networking websites 122; Business websites 122 for intra-business, inter-business, or customer interactions; e-commerce websites 122 such as e-Bay, personals, auction sites, or real estate; organizational or governmental sites such as tours of historical locations or tours of facilities; or enterprise websites 122 such as over the intranet, extranet, or internet. A user of a browser-enabled video manipulation and posting facility 100 may post video files with little technical knowledge. The user 602 may create a video file with the video enabled recording/storage device 102, transfer the video file from a local database 130, or download a previously stored video file utilizing the player 128; edit the file as desired; and send the file to the content delivery network 124 via publisher 112 and the application server(s) 120. To begin the process of posting the video file to the desired page, the user may select the target space and initiate the process. If the publisher is already loaded on the user's client computing facility, the capture, editing, and transcoding processes may take place through the use of the publisher and then the transcoded file may be posted to the target space. In embodiments, the posting may involve transferring the video file to a content delivery network and posting an associated link (e.g. possibly associated with a player) on the target space. The link may also contain a snippet or other representation identifying the video. In embodiments, the application server(s) 120 may send the user 602 a link to the file that the user 602 for his own records or to be referenced or posted. Any user 602 with access to the web site may now select the hyperlink for download of the video file for viewing utilizing the player 128 and a video enabled playback device 132, and/or storage to a database 130. If the user 602 selecting the file for download does not have a video player 128, the application server(s) 120 may give the user 602 the option of downloading the player 128. The process involving the users 602 downloading the video file may continue within the constraints set up by the posting user's 602 control parameters. In embodiments, the 'link' that is supplied on the website may be a media player (e.g. a web enabled video player, or a browser plug-in style player). In embodiments, the 'link' provides connection to the video file and facilitates playback of the video.

In embodiments, the publisher 112, as a browser plug-in embedded into a browser enabled processor platform 104 with an integrated video enabled recording/storage device 102 and video enabled playback device 132, may be utilized to post video files on websites 122. Types of websites 122 may include personal websites 122; personal networking websites 122; Business websites 122 for intra-business, inter-business, or customer interactions; e-commerce websites 122 such as e-Bay, personals, auction sites, or real estate; organizational or governmental sites such as tours of historical locations or tours of facilities; or enterprise websites 122 such as over the intranet, extranet, or internet. A user of a browser-enabled video manipulation and posting facility 100 may post video files with little technical knowledge. The user 602 may create a video file with the video enabled recording/storage device 102, transfer the video file from a local database 130, view the pre-edited video file with a video enabled playback device, edit the file as desired, view the post-edited video file with a video enabled playback device, and send the file to the content delivery network 124 via publisher 112 and the application server(s) 120. To begin the process of posting the video file to the desired page, the user may select the target space and initiate the process. If the publisher is already loaded on the user's client computing facility, the capture, editing, and transcoding processes may take place through the use of the publisher and then the transcoded file may be posted to the target space. In embodiments, the posting may involve transferring the video file to a content delivery network and posting an associated link (e.g. possibly associated with a player) on the target space. The link may also contain a snippet or other representation identifying the video. In embodiments, the application server(s) 120 may send the user 602 a link to the file that the user 602 for his own records or to be referenced or posted. Any user 602 with access to the web site may now select the hyperlink for download of the video file for viewing utilizing the player 128 and a video enabled playback device 132, and/or storage to a database 130. If the user 602 selecting the file for download does not have a video player 128, the application server(s) 120 may give the user 602 the option of downloading the player 128. The process involving the users 602 downloading the video file may continue within the constraints set up by the posting user's 602 control parameters. In embodiments, the 'link' that is supplied on the website may be a media player (e.g. a web enabled video player, or a browser plug-in style player). In embodiments, the 'link' provides connection to the video file and facilitates playback of the video.

In embodiments, the publisher 112 and player 128, as browser plug-ins embedded into a browser enabled processor platform 104, may be integrated with a video enabled recording/storage device 102 and video enabled playback device 132. The user 602 may create video files for editing through an integrated video enabled recording/storage device video enabled recording/storage device 102, and played back on the video enabled playback device 132. Editing of the video file may be done directly on the device. Editing may consist of cutting and concatenating video, adding audio, and producing a final product ready for posting to a network. By having publisher 112 as an integral function within the device, the user 602 need only drag the video file into publisher 112 and the video is transcoded into a common file format of the browser-enabled video manipulation and posting facility 100, and is made available for editing. In addition, the user 602 may have utilized the player 128 to access previously stored files on the browser-enabled video manipulation and posting facility 100 for inclusion with the new video as recorded by the video enabled recording/storage device 102. Publisher 112 may be used to combine video files producing a final edited version for subsequent upload to the browser-enabled video manipulation and posting facility 100. An example of this integrated facility may be a digital video camera 102B with a display for viewing video files, integrated with a browser enabled processor platform 104 and the hosted browser 108 with the publisher 112 and player 128 browser plug-ins. This enhanced digital video camera 102B now may have the capability to edit and produce a final product for web posting while away from a network connection. When the user 602 establishes a network connection, the user 602 may now simply upload the video file through the browser-enabled video manipulation and posting facility 100 for access to other users 602. In embodiments, the 'link' that is supplied on the website may be a media player (e.g. a web enabled video player, or a browser plug-in style player). In embodiments, the 'link' provides connection to the video file and facilitates playback of the video.

In embodiments, the publisher 112 and player 128, as browser plug-ins embedded into a browser enabled processor platform 104 with an integrated video enabled recording/storage device 102 and video enabled playback device 132, may be utilized to post video files on websites 122. Types of websites 122 may include personal websites 122; personal networking websites 122; Business websites 122 for intra-business, inter-business, or customer interactions; e-commerce websites 122 such as e-Bay, personals, auction sites, or real estate; organizational or governmental sites such as tours of historical locations or tours of facilities; or enterprise websites 122 such as over the intranet, extranet, or internet. A user of a browser-enabled video manipulation and posting facility 100 may post video files with little technical knowledge. The user 602 may create a video file with the video enabled recording/storage device 102, transfer the video file from a local database 130, view the pre-edited video file with a video enabled playback device, edit the file as desired, view the post-edited video file with a video enabled playback device, and send the file to the content delivery network 124 via publisher 112 and the application server(s) 120. In addition, the user 602 may utilize the player 128 to access previously stored files on the browser-enabled video manipulation and posting facility 100 for inclusion with the new video as recorded by the video enabled recording/storage device 102. Publisher 112 may be used to combine video files producing a final edited version for subsequent upload to the browser-enabled video manipulation and posting facility 100. To begin the process of posting the video file to the desired page, the user may select the target space and initiate the process. If the publisher is already loaded on the user's client computing facility, the capture, editing, and transcoding processes may take place through the use of the publisher and then the transcoded file may be posted to the target space. In embodiments, the posting may involve transferring the video file to a content delivery network and posting an associated link (e.g. possibly associated with a player) on the target space. The link may also contain a snippet or other representation identifying the video. In embodiments, the application server(s) 120 may send the user 602 a link to the file that the user 602 for his own records or to be referenced or posted. Any user 602 with access to the web site may now select the hyperlink for download of the video file for viewing utilizing the player 128 and a video enabled playback device 132, and/or storage to a database 130. If the user 602 selecting the file for download does not have a video player 128, the application server(s) 120 may give the user 602 the option of downloading the player 128. The process involving the users 602 downloading the video file may continue within the constraints set up by the posting user's 602 control parameters. In embodiments, the 'link' that is supplied on the website may be a media player (e.g. a web enabled video player, or a browser plug-in style player). In embodiments, the 'link' provides connection to the video file and facilitates playback of the video.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A method for enabling a user to edit one or more clips displayed within a user interface of a browser application, comprising the steps of:

retrieving a clip among the one or more clips from a memory facility of a browser enabled processor platform including a display;

presenting the clip to the user through the user interface of the browser application displayed on the display, the browser application including a clip manipulation and posting publisher having an editing tool and operating on the browser enabled processor platform;

presenting the editing tool to the user through the user interface;

editing the clip with the editing tool based on an input from the user to alter an appearance of the clip and resulting in an edited clip;

storing the edited clip in the memory facility;

receiving a set of network location control parameters that are unique to a network location among a plurality of network locations;

transcoding the edited clip with the clip manipulation and posting publisher according to the set of network location control parameters to create a transcoded clip; and uploading the transcoded clip to the network location according to the set of network location control parameters with the clip manipulation and posting publisher.

2. The method of claim 1, wherein the clip is selected from a group consisting of a video clip, an audio clip, a multimedia clip, a podcast clip, an advertisement clip, and an interactive clip.

3. The method of claim 1, wherein the editing tool is an integrated component of the clip manipulation and posting publisher that includes a plurality of components.

4. The method of claim 1, wherein the clip is associated with a format.

5. The method of claim 1, further comprising the steps of receiving the clip from one of a plurality of sources and storing the clip in the memory facility.

6. The method of claim 1, wherein the step of retrieving the clip includes the step of allowing the user to drag the clip into the user interface for presentation to the user and editing with the editing tool.

7. The method of claim 1, wherein the editing tool includes one or more editing functions.

8. The method of claim 1, further comprising the steps of:
- retrieving a second clip among the one or more clips from the memory facility;
- presenting the second clip to the user through the user interface; and
- enabling the user to alter an appearance of the second clip with the editing tool and resulting in a second edited clip; and
- storing the second edited clip in the memory facility.

9. A system for editing one or more clips within a user interface of a browser application comprising:
- a browser enabled processor platform including a display and a memory facility, the memory facility storing software code executed by the browser enabled processor platform to operate a clip manipulation and posting publisher operating in conjunction with the browser application, the clip manipulation and posting publisher retrieving a clip among the one or more clips from the memory facility and displaying on the display the clip to a user through the user interface, the clip manipulation and posting publisher including an editing tool responding to a user command input through the user interface to alter an appearance of the clip within the memory facility to create an edited clip, including a transcoder transcoding the edited clip according to a set of network location control parameters received by the clip manipulation and posting publisher and that are unique to a network location among a plurality of network locations, the clip manipulation and posting publisher including a publisher uploading the edited clip to the network location in accordance with the set of network location control parameters.

10. The system of claim 9, wherein the clip is selected from a group consisting of a video clip, an audio clip, a multimedia clip, a podcast clip, an advertisement clip, and an interactive clip.

11. The system of claim 9, wherein the editing tool is an integrated component of the clip manipulation and posting publisher that includes and controls a plurality of components.

12. The system of claim 9, wherein the clip is associated with a format.

13. The system of claim 9, wherein the clip is received by the browser enabled processor platform from a plurality of sources and stored in the memory facility.

14. The system of claim 9, wherein the clip manipulation and posting publisher enables the user to drag the clip into the user interface for editing with the editing tool.

15. The system of claim 9, wherein the editing tool includes one or more editing functions.

16. The system of claim 9, wherein the clip manipulation and posting publisher retrieves a second clip among the one or more clips from the memory facility and displays on the display the second clip to the user through the user interface, and wherein the editing tool responds to the user command input through the user interface to alter an appearance of the second clip within the memory facility.

\* \* \* \* \*